(12) United States Patent
Miyake et al.

(10) Patent No.: US 9,851,839 B2
(45) Date of Patent: Dec. 26, 2017

(54) DISPLAY SYSTEM

(71) Applicant: Semiconductor Energy Laboratory Co., Ltd., Atsugi-shi, Kanagawa-ken (JP)

(72) Inventors: Hiroyuki Miyake, Tochigi (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/053,468

(22) Filed: Feb. 25, 2016

(65) Prior Publication Data

US 2016/0260396 A1    Sep. 8, 2016

(30) Foreign Application Priority Data

Mar. 3, 2015 (JP) .................................. 2015-040869
Mar. 3, 2015 (JP) .................................. 2015-040870

(51) Int. Cl.
*G09G 3/36* (2006.01)
*G06F 3/041* (2006.01)
(Continued)

(52) U.S. Cl.
CPC ...... *G06F 3/0416* (2013.01); *G02F 1/134363* (2013.01); *G06F 3/0485* (2013.01); *G06F 3/04855* (2013.01); *G09G 3/20* (2013.01); *G02F 2001/134372* (2013.01); *G09G 2310/0224* (2013.01); *G09G 2320/066* (2013.01);
(Continued)

(58) Field of Classification Search
CPC combination set(s) only.
See application file for complete search history.

(56) References Cited

U.S. PATENT DOCUMENTS 6,573,819 B1 *    6/2003    Oshima ............ G11B 20/00007
                                                                    348/51
2004/0246363 A1 *  12/2004    Kim ..................... H04N 5/2252
                                                                    348/335
(Continued)

FOREIGN PATENT DOCUMENTS

JP    2014-115641 A    6/2014

OTHER PUBLICATIONS

Burr, "Impulse-response functions for chromatic and achromatic stimuli", J. Opt. Soc. Am. A(Journal of the Optical Society of America A: Optical Physics), Aug. 1, 1993, vol. 10, No. 8, pp. 1706-1713, OSA(The Optical Society of America).

*Primary Examiner* — Wesner Sajous
(74) *Attorney, Agent, or Firm* — Robinson Intellectual Property Law Office

(57) ABSTRACT

Eye-friendly display that can reduce eye strain on a user is achieved. A display system includes a display portion, an input portion, and a control portion. The display portion is configured to display an image. The input portion is configured to sense an input from a user and output a signal to the control portion. The control portion is configured to execute a first mode and a second mode. In the first mode executed by the control portion, an image is displayed on the display portion by an interlace method. In the second mode executed by the control portion, an image is displayed on the display portion by a progressive method. The control portion is configured to switch between the first mode and the second mode in accordance with the signal.

14 Claims, 43 Drawing Sheets

(51) Int. Cl.
*G06F 3/048* (2013.01)
*G09G 3/20* (2006.01)
*G06F 3/0485* (2013.01)
*G02F 1/1343* (2006.01)

(52) U.S. Cl.
CPC ............ *G09G 2320/0626* (2013.01); *G09G 2320/0686* (2013.01); *G09G 2320/10* (2013.01)

(56) References Cited

U.S. PATENT DOCUMENTS

| | | | |
|---|---|---|---|
| 2011/0043707 A1* | 2/2011 | Umezu | H04N 21/4122 348/723 |
| 2012/0319102 A1* | 12/2012 | Yamazaki | H01L 29/7869 257/43 |
| 2014/0110705 A1* | 4/2014 | Koezuka | H01L 21/022 257/43 |
| 2014/0111558 A1* | 4/2014 | Ishitani | G09G 5/10 345/690 |
| 2014/0132643 A1 | 5/2014 | Yamazaki et al. | |
| 2014/0152533 A1* | 6/2014 | Imada | G09G 3/3648 345/89 |
| 2014/0152685 A1 | 6/2014 | Iwaki | |
| 2015/0364073 A1* | 12/2015 | Ogawa | G06F 3/0485 345/690 |
| 2016/0260396 A1* | 9/2016 | Miyake | G06F 3/0416 |
| 2016/0260400 A1* | 9/2016 | Yamazaki | G09G 3/3648 |

* cited by examiner

Second mode

First mode

Second mode

First mode

First mode

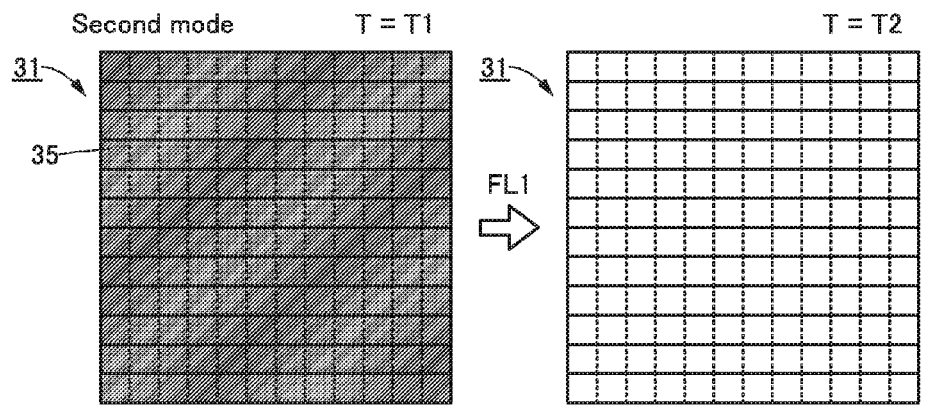
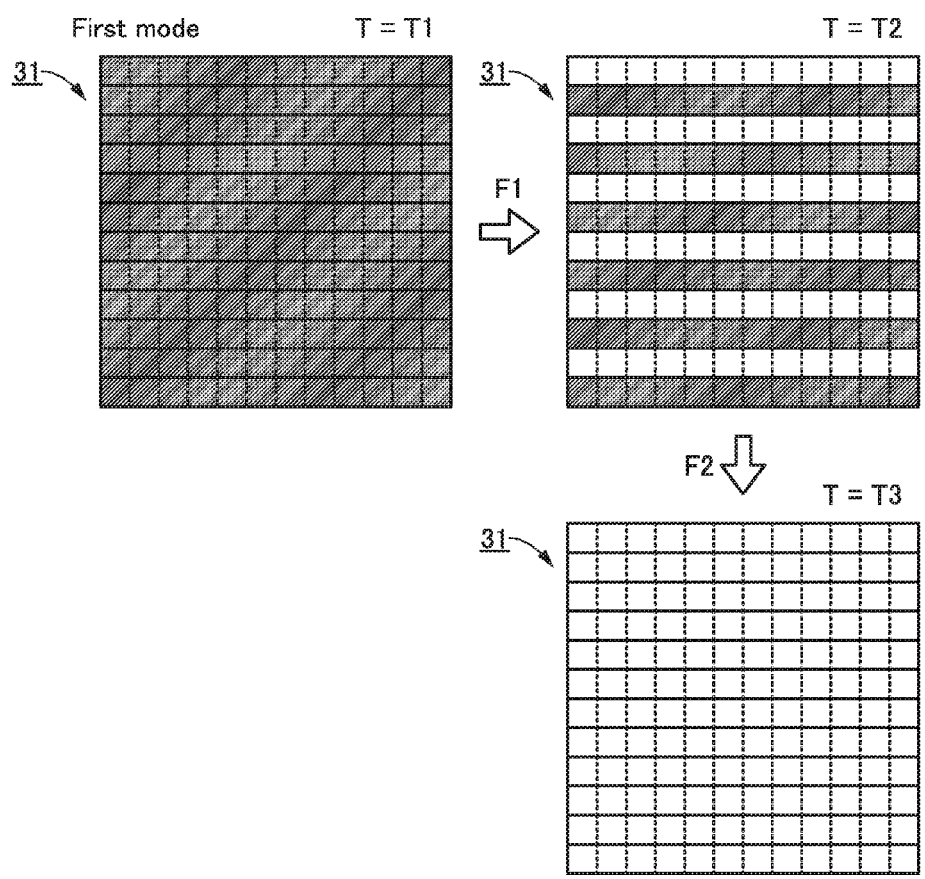

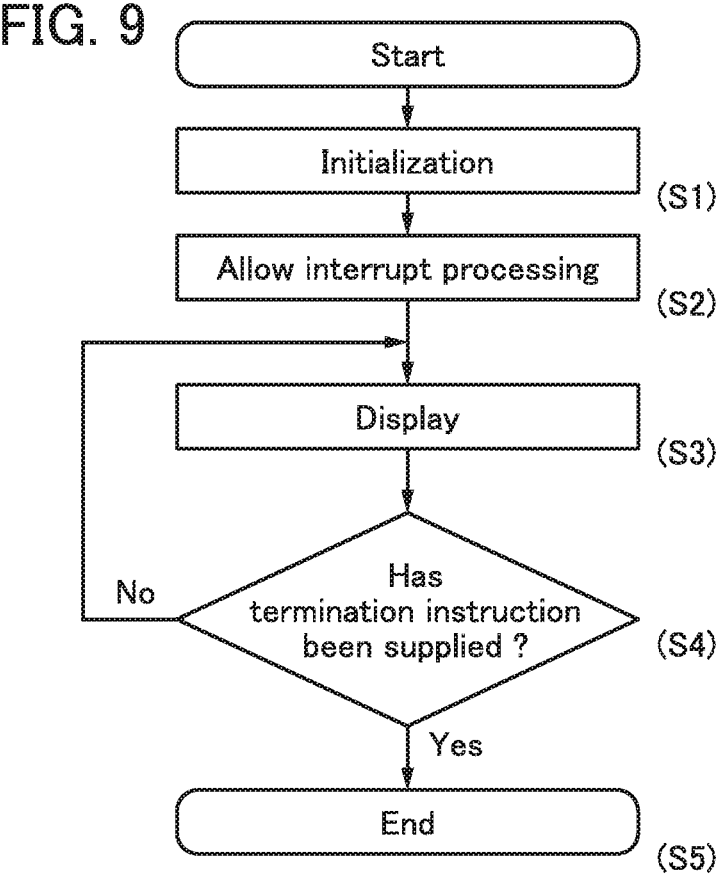

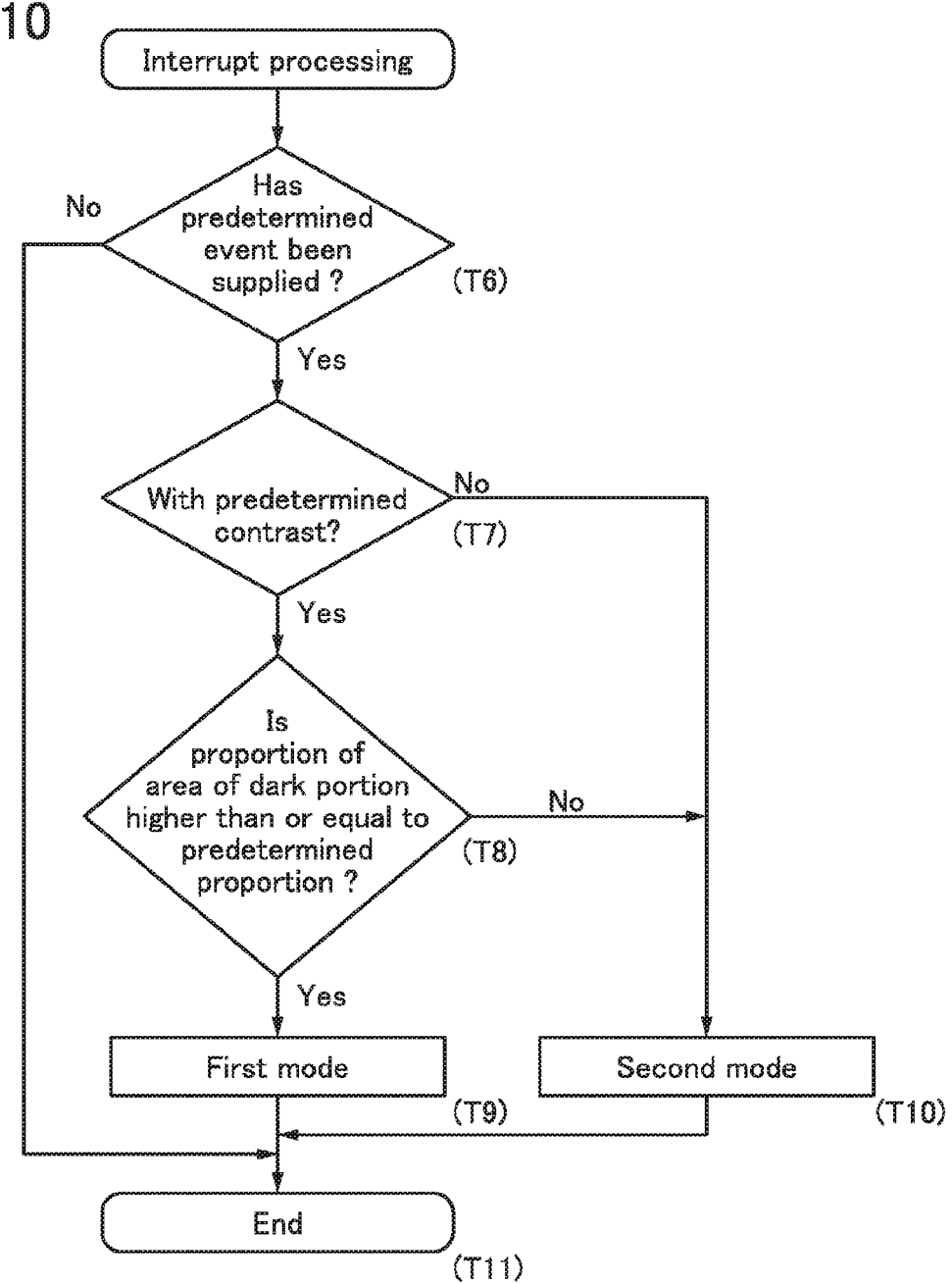

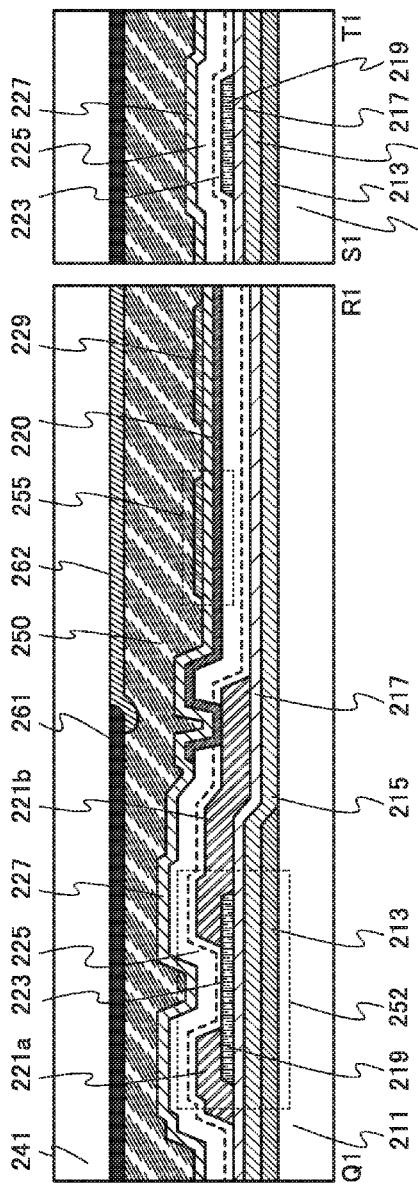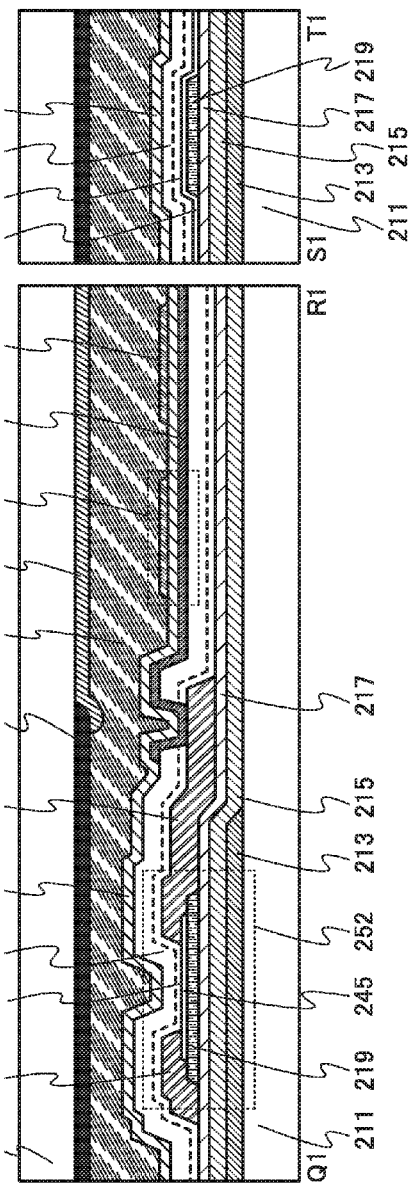

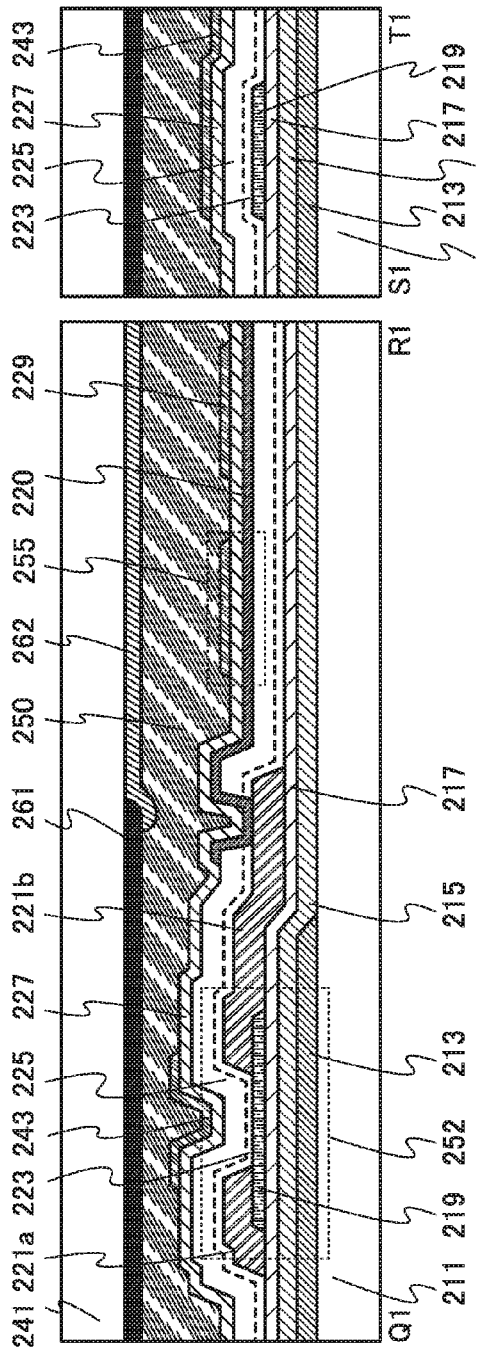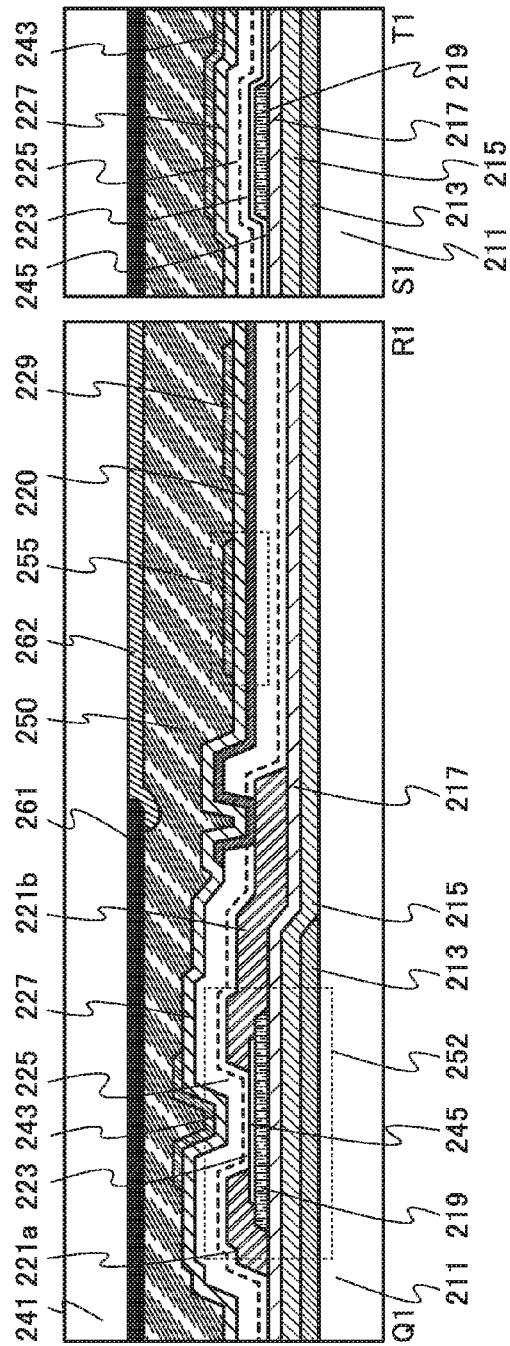

Writing period

Sensing period

DISPLAY SYSTEM

BACKGROUND OF THE INVENTION

1. Field of the Invention

One embodiment of the present invention relates to a display device. One embodiment of the present invention relates to a display system including a display device. One embodiment of the present invention relates to a method for driving a display device.

Note that one embodiment of the present invention is not limited to the above technical field. Examples of the technical field of one embodiment of the present invention disclosed in this specification include a semiconductor device, a display device, a light-emitting device, a lighting device, a power storage device, a memory device, a method for driving any of them, and a method for manufacturing any of them.

2. Description of the Related Art

Nowadays, information processing devices each provided with an input unit, a display unit, and an arithmetic portion are prevalent.

As the display unit, a variety of display units such as a liquid crystal display device, a display device including an organic electroluminescent (EL) element, or electronic paper is used.

A method is known in which an information processing device including a display unit and an input unit is driven in the following steps: a first step of acquiring an input signal with the input unit, a second step of starting the movement of an image displayed on the display unit in accordance with the input signal, a third step of reducing the luminance of the image, a fourth step of judging whether the image has reached predetermined coordinates or not, a fifth step of increasing the luminance of the image when it is determined that the image has reached the predetermined coordinates, and a sixth step of stopping the movement of the image. This method can reduce eye fatigue of a user and achieve eye-friendly display (Patent Document 1).

REFERENCE

Patent Document

[Patent Document 1] Japanese Published Patent Application No. 2014-115641

SUMMARY OF THE INVENTION

An object is to provide a novel display device or display system which is highly convenient or reliable. Another object is to achieve eye-friendly display that can reduce eye strain on a user.

Another object is to provide a novel display device, a novel display system, or a novel semiconductor device.

Note that the description of these objects does not disturb the existence of other objects. One embodiment of the present invention does not necessarily achieve all the objects. Other objects can be derived from the description of the specification and the like.

In a first step of a method or program of one embodiment of the present invention, the setting is initialized.

In a second step, interrupt processing is allowed.

In a third step, image information is displayed in a predetermined mode selected in the first step or in the interrupt processing.

In a fourth step, the next step is determined as follows: a fifth step is selected when a termination instruction has been supplied, whereas the third step is selected when the termination instruction has not been supplied.

In the fifth step, processing is terminated.

The interrupt processing includes the following sixth to eleventh steps.

In the sixth step, the processing proceeds to the seventh step when a predetermined event has been supplied, whereas the processing proceeds to the eleventh step when the predetermined event has not been supplied.

In the seventh step, the processing proceeds to the eighth step when image information to be displayed next has a predetermined contrast, whereas the processing proceeds to the tenth step when the image information to be displayed next does not have the predetermined contrast.

In the eighth step, the processing proceeds to the ninth step when the proportion of the area of a dark portion in the image information to be displayed next is higher than or equal to a predetermined proportion, whereas the processing proceeds to the tenth step when the proportion of the area of the dark portion is lower than the predetermined proportion.

In the ninth step, a first mode is selected.

In the tenth step, a second mode is selected.

In the eleventh step, the processing returns from the interrupt processing.

In this manner, eye strain on a user at the time of switching displayed image information in accordance with a predetermined event such as scrolling can be reduced, whereby eye-friendly display for the user can be achieved. Thus, a novel program which is highly convenient or reliable can be provided.

One embodiment of the present invention is a display system including a display portion, an input portion, and a control portion. The display portion is configured to display an image. The input portion is configured to sense an input from a user and output a signal to the control portion. The control portion is configured to execute a first mode and a second mode. In the first mode executed by the control portion, an image is displayed on the display portion by an interlace method. In the second mode executed by the control portion, an image is displayed on the display portion by a progressive method. The control portion is configured to switch between the first mode and the second mode in accordance with the signal.

In the above display system, it is preferable that the control portion execute the first mode when the input is a first input which corresponds to screen switching or screen scrolling and that the control portion execute the second mode when there is no input or the input is not the first input.

The above display system preferably has the following configuration. The control portion includes an arithmetic portion and a memory portion. The memory portion is configured to temporarily store image data every time the image data is input. The image data includes data of one frame including 2n lines (n is a natural number). In the second mode, the arithmetic portion is configured to sequentially read out data from first to 2n-th lines of first image data and output the data to the display portion in a first frame period, and sequentially read out data from first to 2n-th lines of second image data and output the data to the display portion in a second frame period following the first frame period. In the first mode, a third frame period includes a first field period and a second field period. The arithmetic portion is configured to sequentially read out data from odd-numbered lines of third image data and output the data to the display portion in the first field period, and sequentially read out data from even-numbered lines of fourth image data and output the data to the display portion in the second field period.

Alternatively, the above display system preferably has the following configuration. The control portion includes an arithmetic portion and a memory portion. The memory portion is configured to temporarily store image data every time the image data is input. The image data includes data of one frame including 2n lines (n is a natural number). In the second mode, the arithmetic portion is configured to sequentially read out data from first to 2n-th lines of first image data and output the data to the display portion in a first frame period, and sequentially read out data from first to 2n-th lines of second image data and output the data to the display portion in a second frame period following the first frame period. In the first mode, a third frame period includes a field periods (a is an integer of 2 or more and 2n or less). The arithmetic portion is configured to sequentially read out data from $\{a\times(m-1)+k\}$-th lines (k is an integer of 1 or more and a or less; m is an integer of 1 or more and n or less) of k-th image data and output the data to the display portion in a k-th field period.

The above display system preferably has the following configuration. The display portion includes a liquid crystal element or a light-emitting element. The display portion includes a plurality of pixels. The pixels each include a transistor. A semiconductor of the transistor in which a channel is formed includes an oxide semiconductor.

Alternatively, the above display system preferably has the following configuration. The display portion includes a liquid crystal element or a light-emitting element. The display portion includes a plurality of pixels. The pixels each include a transistor. A semiconductor of the transistor in which a channel is formed includes silicon. In particular, the semiconductor is amorphous silicon or polycrystalline silicon.

The input portion preferably includes at least one of a keyboard, a hardware button, a pointing device, a touch sensor, an imaging device, an audio input device, a viewpoint input device, and a pose detection device.

The display portion and the input portion preferably form a touch panel.

Another embodiment of the present invention is a program including first to eleventh steps. In the first step, the setting is initialized. In the second step, interrupt processing is allowed. In the third step, image information is displayed in a predetermined mode selected in the first step or in the interrupt processing. In the fourth step, processing proceeds to the fifth step when a termination instruction has been supplied in the interrupt processing, whereas the processing proceeds to the third step when the termination instruction has not been supplied in the interrupt processing. In the fifth step, the processing is terminated. The interrupt processing includes the sixth to eleventh steps. In the sixth step, the processing proceeds to the seventh step when a predetermined event has been supplied, whereas the processing proceeds to the eleventh step the predetermined event has not been supplied. In the seventh step, the processing proceeds to the eighth step when image information to be displayed next has a predetermined contrast, whereas the processing proceeds to the tenth step when the image information to be displayed next does not have the predetermined contrast. In the eighth step, the processing proceeds to the ninth step when the proportion of the area of a dark portion in the image information to be displayed next is higher than or equal to a predetermined proportion, whereas the processing proceeds to the tenth step when the proportion of the area of the dark portion is lower than the predetermined proportion. In the ninth step, a first mode is selected. In the tenth step, a second mode is selected. In the eleventh step, the processing returns from the interrupt processing. In the first mode, the image information is displayed by an interlace method. In the second mode, the image information is displayed by a progressive method.

According to one embodiment of the present invention, a novel display device or display system which is highly convenient or reliable can be provided. Furthermore, eye-friendly display that can reduce eye strain on a user can be achieved.

Furthermore, a novel display device, a novel display system, or a novel semiconductor device can be provided.

Note that the description of these effects does not disturb the existence of other effects. One embodiment of the present invention does not necessarily achieve all the effects. Other effects can be derived from the description of the specification, the drawings, the claims, and the like.

BRIEF DESCRIPTION OF THE DRAWINGS

FIGS. 5A and 5B illustrate examples of image display according to an embodiment.

FIG. 9 is a flow chart illustrating a program according to an embodiment.

FIG. 10 is a flow chart illustrating a program according to an embodiment.

FIGS. 17A and 17B each illustrate a structure example of a display device according to an embodiment.

FIGS. 18A and 18B each illustrate a structure example of a display device according to an embodiment.

DETAILED DESCRIPTION OF THE INVENTION

One embodiment of the present invention includes, for example, a step of selecting a first mode or a second mode and a step of performing display in the selected mode.

For example, one embodiment of the present invention can include a step of selecting the first mode or the second mode when a scroll event occurs, in accordance with the contrast between a dark portion and a bright portion or the proportion of the area of the dark portion in image information to be displayed.

<<First Mode>>

In the case where the first mode is selected, image information to be displayed next is displayed by the following method to reduce visual stimulation.

For example, the image information to be displayed next is displayed such that an influence of lateral inhibition caused by presently displayed image information may be avoided.

In the first mode, for example, an image is displayed by an interlace method.

<<Second Mode>>

In the case where the second mode is selected, image information is displayed by the following method.

In the second mode, for example, an image is displayed by a progressive method.

In this manner, eye strain on a user at the time of switching displayed image information in accordance with a predetermined event such as scrolling can be reduced, whereby eye-friendly display for the user can be achieved. Thus, a novel program which is highly convenient or reliable can be provided.

<Display Method in which Influence of Lateral Inhibition is Avoided>

A display method in which an influence of lateral inhibition is avoided will be described with reference to FIGS. 7A to 7D and FIGS. 8A to 8D.

Figure 7A:
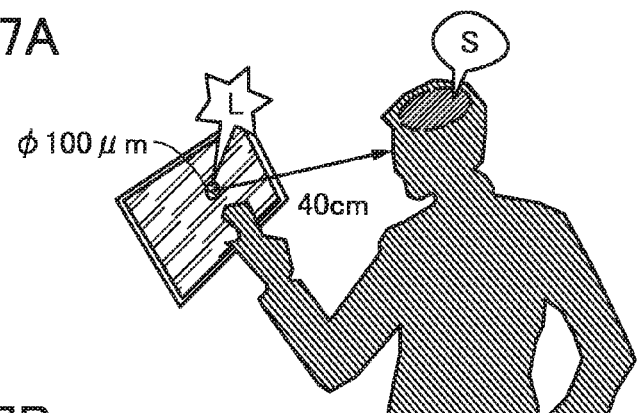
FIGS. 7A to 7D schematically illustrate an optic nerve and a transfer function according to an embodiment.
Figure 7B:
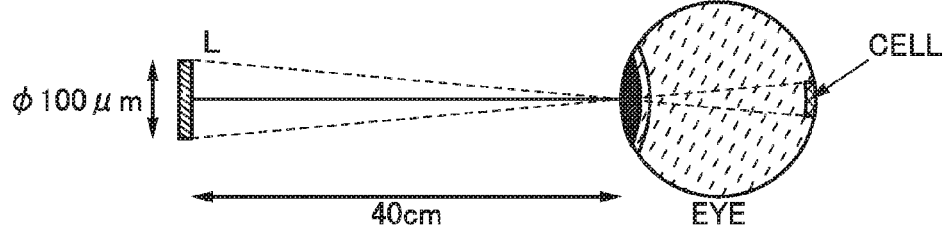
Figure 7C:
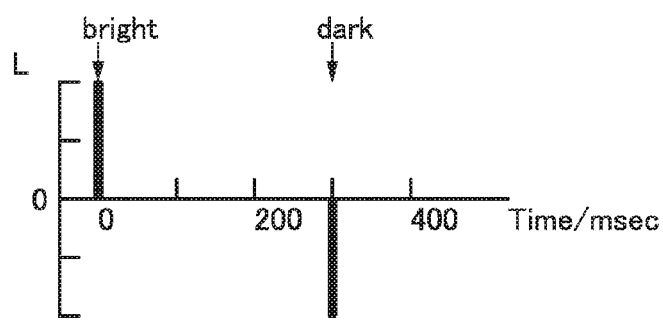
Figure 7D:
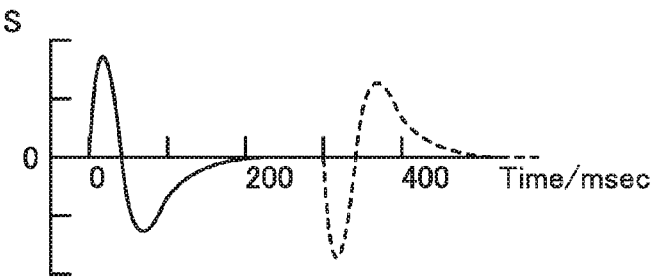

FIGS. 7A to 7D schematically illustrate an optic nerve and a visual transfer function. FIGS. 7A and 7B schematically illustrate a positional relation between a display device and a user of the display device. FIG. 7C schematically illustrates an example of stimuli applied to an optic nerve when image information is switched from one to another. FIG. 7D schematically illustrates responses to the applied stimuli which are transformed in accordance with the visual transfer function. Note that the vertical axis L in FIG. 7C represents the brightness, where the brightness to which the eyes are adapted is assumed to be 0. The vertical axis S in FIG. 7D represents the intensity of a response.

Figure 8A:
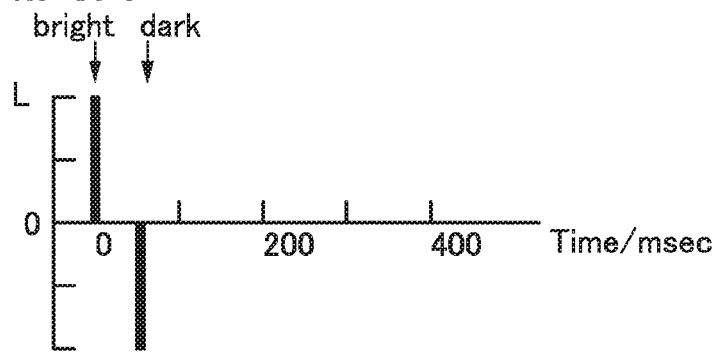
FIGS. 8A to 8D schematically illustrate a visual transfer function according to an embodiment.
Figure 8B:
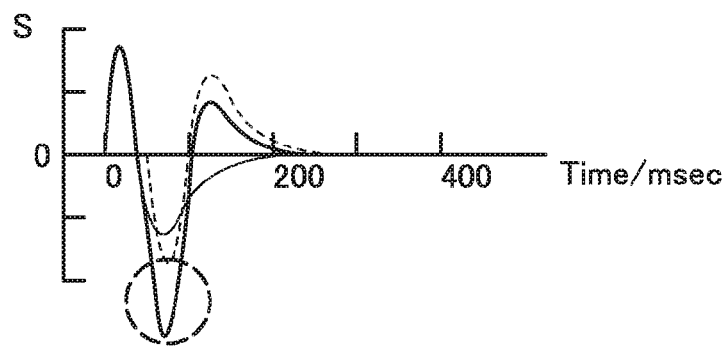
Figure 8C:
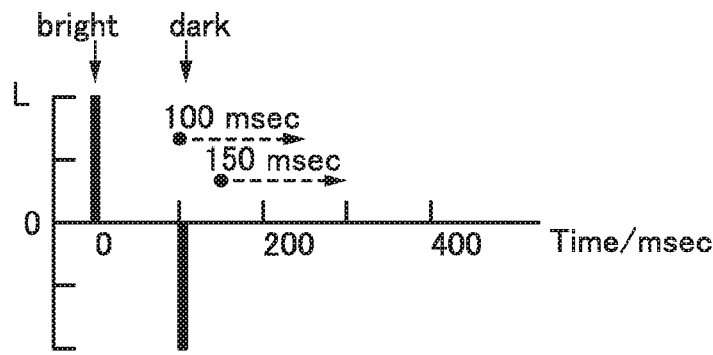
Figure 8D:
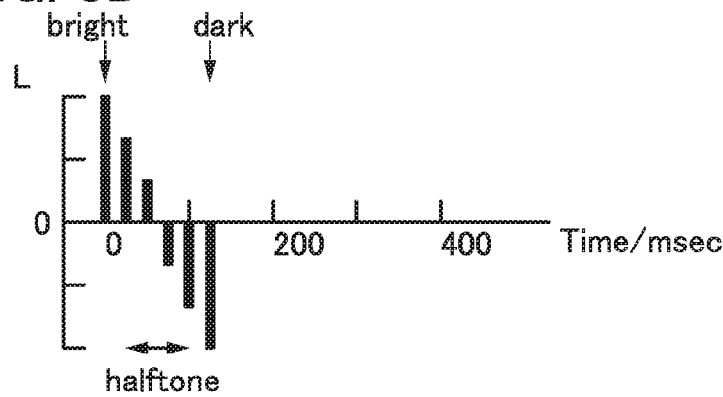

FIGS. 8A to 8D schematically illustrate an optic nerve and a visual transfer function. FIG. 8A schematically illustrates an example of stimuli applied to an optic nerve when image information is switched from one to another. FIG. 8B schematically illustrates responses to the applied stimuli which are transformed in accordance with the visual transfer function. FIGS. 8C and 8D each schematically illustrate the display method of one embodiment of the present invention, in which amplification of responses to applied stimuli can be suppressed.

In the first mode, for example, image information is switched from one to another at a time interval of 100 msec or longer, preferably 150 msec or longer, whereby an influence of lateral inhibition can be avoided. Thus, amplification of responses to visual stimuli can be suppressed.

<<Lateral Inhibition>>

A neuron of a stimulated optic nerve is capable of inhibiting activities of adjacent other neurons. This phenomenon may cause transformation of responses to a pulsed visual stimulus.

For example, a bright image and a dark image are displayed in a pulsed manner in a region which is on a plane at a distance of 40 cm from the user's eye and has a diameter of 100 μm (see FIG. 7C). Note that the size of one photoreceptor cell (CELL) corresponds to that of a region which is on a plane at a distance of 40 cm from the user's eye and has a diameter of approximately 100 μm (see FIGS. 7A and 7B).

In some cases, a pulsed stimulus is transformed into wave-shaped responses in accordance with the visual transfer function (see FIGS. 7C and 7D). Specifically, a pulsed positive visual stimulus is transformed into a positive response accompanied with a negative response, whereas a pulsed negative visual stimulus is transformed into a negative response accompanied with a positive response (David C. Burr and M. Concetta Morrone, "Impulse-response functions for chromatic and achromatic stimuli," Journal of Optical Society of America, 1993, Vol. 10, No. 8, p. 1706).

When a bright image and a dark image are sequentially displayed at a sufficiently short time interval, for example, a response to the preceding stimulus and a response to the following stimulus are both wave-shaped. Accordingly, these waves may be superimposed on each other to increase the amplitude.

For example, pulsed bright first image information is displayed, and 50 msec later, pulsed dark second image information is displayed. In this case, a negative response which follows a positive response to the displayed first image information may be superimposed on a negative response to the displayed second image information. Accordingly, a significantly amplified negative response may be formed (see FIGS. 8A and 8B).

In the first mode, for example, displayed image information from one to another at a time interval of 100 msec or longer, preferably 150 msec or longer, whereby an influence of wave-shaped responses caused by the visual transfer function can be avoided. Thus, amplification of responses to visual stimuli can be suppressed (see FIG. 8C).

As another example, in the first mode, displayed image information is switched from one to another with intermediate image information displayed therebetween. Specifically, a gray image or an image with a gray level between that of the preceding image information and that of the following image information (a halftone image) can be used for the intermediate image information (see FIG. 8D). Thus, wave-shaped responses to the preceding stimulus can be canceled by wave-shaped responses to the following stimulus, thereby weakening in amplitude.

Alternatively, intermediate image information can be obtained by displaying images in such a manner that the preceding image information fades out while the following image information fades in (this technique is also referred to as cross-fade).

In this manner, an influence of lateral inhibition can be avoided. Thus, amplification of responses to visual stimuli can be suppressed.

As another example, a display element may be overdriven in the second mode, whereas the overdrive may be turned down or stopped in the first mode. Specifically, the overdrive of a liquid crystal element may be stopped in the first mode, whereas the liquid crystal element may be overdriven in the second mode.

<Program Example>

One embodiment of the present invention will be described using a program of one embodiment of the present invention with reference to FIG. 9 and FIG. 10.

FIG. 9 is a flow chart illustrating main processing of the program of one embodiment of the present invention. FIG. 10 is a flow chart illustrating interrupt processing of the program of one embodiment of the present invention.

The program of one embodiment of the present invention includes the following eleven steps (see FIG. 9 and FIG. 10).

In a first step (S1), the setting is initialized. For example, the first mode or the second mode is set as initial setting, and a predetermined image is loaded.

In a second step (S2), interrupt processing is allowed. Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

In a third step (S3), image information is displayed in a predetermined mode selected in the first step (S1) or in the interrupt processing.

In a fourth step (S4), the next step is determined as follows: a fifth step (S5) is selected when a termination instruction has been supplied, whereas the third step (S3) is selected when the termination instruction has not been supplied.

In the fifth step (S5), processing is terminated.

The interrupt processing includes the following sixth to eleventh steps (T6 to T11) (see FIG. 10).

In the sixth step (T6), the processing proceeds to the seventh step (T7) when a predetermined event has been supplied, whereas the processing proceeds to the eleventh step (T11) when the predetermined event has not been supplied.

In the seventh step (T7), the processing proceeds to the eighth step (T8) when image information to be displayed next has a predetermined contrast, whereas the processing proceeds to the tenth step (T10) when the image information to be displayed next does not have the predetermined contrast.

In the eighth step (T8), the processing proceeds to the ninth step (T9) when the proportion of the area of a dark portion in the image information to be displayed next is higher than or equal to a predetermined proportion, whereas the processing proceeds to the tenth step (T10) when the proportion of the area of the dark portion is lower than the predetermined proportion.

In the ninth step (T9), the first mode is selected.

In the tenth step (T10), the second mode is selected.

In the eleventh step (T11), the processing returns from the interrupt processing.

<<Predetermined Event>>

A variety of instructions can be associated with a variety of events.

The following instructions can be given as examples: "page-turning instruction" for switching displayed image information from one to another and "scroll instruction" for moving the display position of part of image information and displaying another part continuing from that part.

For example, the following events can be used: events supplied using a pointing device such as a mouse (e.g., "click" and "drag") and events supplied to a touch panel with a finger or the like used as a pointer (e.g., "tap", "drag" and "swipe").

For example, the position of a thumb (also referred to as a handle or knob) of a scroll bar pointed by a pointer, the swipe speed, and the drag speed can be used as parameters assigned to various instructions.

Specifically, a parameter that determines the page-turning speed or the like can be used to execute the "page-turning instruction" and a parameter that determines the moving speed of the display position or the like can be used to execute the "scroll instruction."

Furthermore, the display brightness or contrast may be changed in accordance with the page-turning speed and/or the scroll speed, for example. Specifically, in the case where the page-turning speed and/or the scroll speed are/is higher than the speed at which user's eyes can follow displayed images, the display brightness or contrast may be decreased in synchronization with the page-turning speed and/or the scroll speed.

<<Scroll Instruction>>

Examples of a scroll instruction for moving the display position of image information at various speeds will be described with reference to FIGS. 11A-1, 11A-2, 11B-1, 11B-2, 11C-1, and 11C-2. In the scroll instruction, for example, the speed at which a touch panel is swiped can be used to determine the moving speed of the display position.

FIGS. 11A-1, 11B-1, and 11C-1 each schematically illustrate a scroll instruction for moving the display position of image information at a time-varying speed V.

Figures 1, 11A:
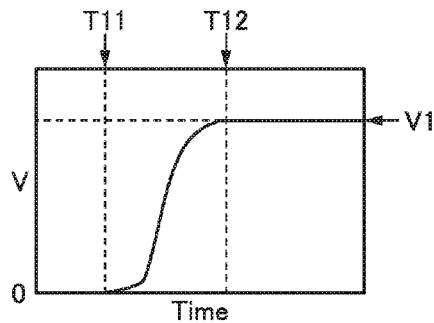
FIGS. 11A-1, 11A-2, 11B-1, 11B-2, 11C-1, and 11C-2 schematically illustrate examples of a scroll instruction according to an embodiment.
Figures 2, 11A:
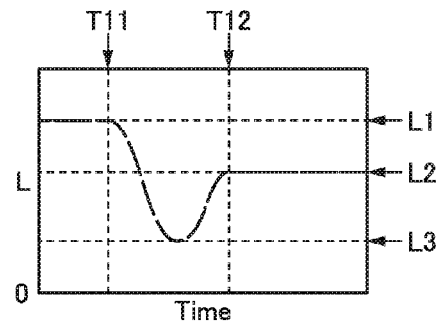

FIG. 11A-2 illustrates a method for adjusting the brightness L of a bright portion of the image information whose display position is moved at the speed shown in FIG. 11A-1.

Figures 1, 11B:
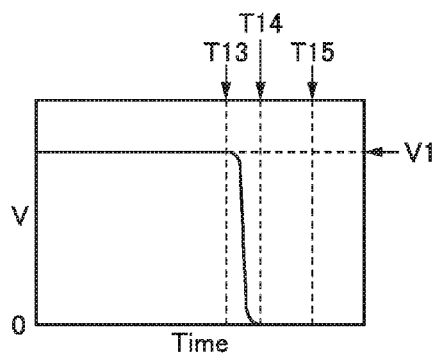
Figures 2, 11B:
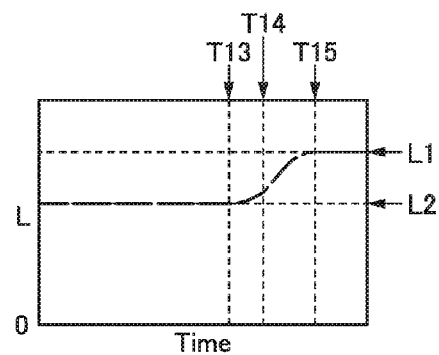

FIG. 11B-2 illustrates a method for adjusting the brightness L of the bright portion of the image information whose display position is moved at the speed shown in FIG. 11B-1.

Figures 1, 11C:
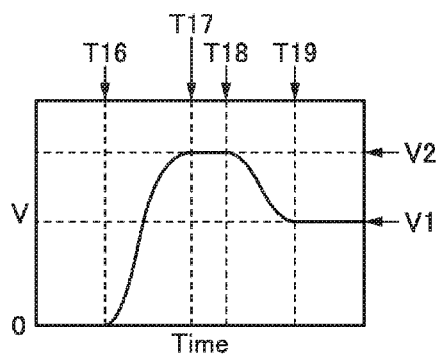
Figures 2, 11C:
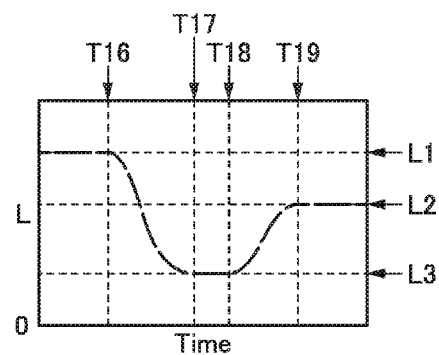

FIG. 11C-2 illustrates a method for adjusting the brightness L of the bright portion of the image information whose display position is moved at the speed shown in FIG. 11C-1.

<<Example 1 of Scroll Instruction>>

Described will be an example of a scroll instruction in which the moving speed of the display position of the image information is increased from 0 to V1 in a period from Time T11 to Time T12 (see FIGS. 11A-1 and 11A-2).

For example, in a period until Time T11, in which the display position of the image information does not change, the bright portion is displayed at Brightness L1.

In the period from Time T11 to Time T12, in which the display position of the image information is moved at an increasing speed, the bright portion is displayed at a brightness changing between Brightness L1 and Brightness L3, which is lower than Brightness L1.

In a period after Time T12, in which the display position of the image information is moved constantly at Speed V1, the bright portion is displayed at Brightness L2, which is lower than Brightness L1 and higher than Brightness L3.

<<Example 2 of Scroll Instruction>>

Described will be an example of a scroll instruction in which the moving speed of the display position of the image information is decreased from V1 to 0 in a period from Time T13 to Time T14 (see FIGS. 11B-1 and 11B-2).

For example, in a period until Time T13, in which the display position of the image information is moved constantly at Speed V1, the bright portion is displayed at Brightness L2.

In the period from Time T13 to Time T14, in which the display position of the image information is moved at a decreasing speed, the bright portion is displayed at a brightness increasing from Brightness L2.

In a period from Time T14 to Time T15, in which the display position of the image information is fixed, the bright portion is displayed at a brightness increasing to predetermined Brightness L1, which is higher than Brightness L2. Note that the length of the period from Time T14 to Time T15 is preferably 0 or longer.

<<Example 3 of Scroll Instruction>>

The following scroll instruction will be described as an example. The display position of the image information is moved at a speed increasing from 0 to V2 in a period from Time T16 to Time T17 and moved at Speed V2 in a period from Time T17 to Time T18. Then, the display position of the image information is moved at a speed decreasing from V2 to V1 in a period from Time T18 to Time T19 and moved at Speed V1 in a period after Time T19 (see FIGS. 11C-1 and 11C-2).

For example, in a period until Time T16, in which the display position of the image information does not change, the bright portion is displayed at Brightness L1.

In the period from Time T16 to Time T17, in which the display position of the image information is moved at an increasing speed, the bright portion is displayed at a brightness changing from Brightness L1 to Brightness L3, which is lower than Brightness L1.

In the period from Time T17 to Time T18, in which the display position of the image information is moved constantly at Speed V2, the bright portion is displayed at Brightness L3.

In the period from Time T18 to Time T19, in which the display position of the image information is moved at a decreasing speed, the bright portion is displayed at a brightness increasing from Brightness L3.

In the period after Time T19, in which the display position of the image information is moved constantly at Speed V1, which is lower than Speed V2, the bright portion is displayed at Brightness L2, which is lower than Brightness L1 and higher than Brightness L3.

<<Condition for Mode Selection>>

A method in which characteristics of image information to be displayed next are used as conditions for mode selection will be described with reference to FIGS. 12A to 12C.

Figure 12A:
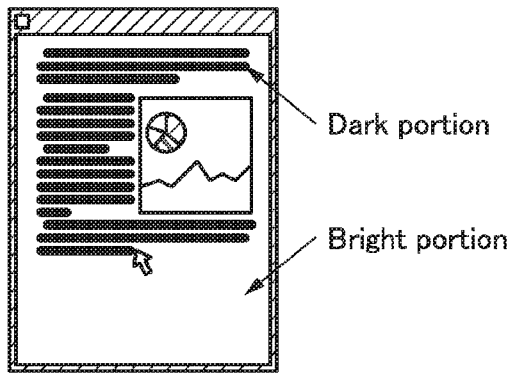
FIGS. 12A to 12C schematically illustrate a configuration of image information according to an embodiment.

FIG. 12A schematically illustrates image information including a dark portion and a bright portion.

Figure 12B:
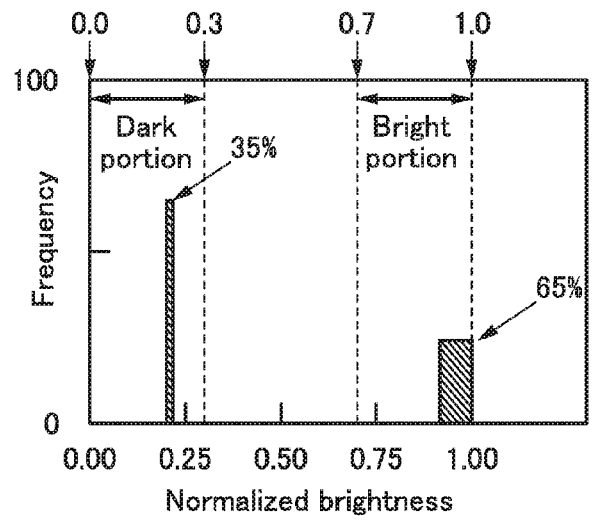

FIG. 12B schematically illustrates the area ratio in terms of brightness (or luminance, light intensity, or the like) in the image information to be displayed next. Note that the horizontal axis represents the normalized brightness, where the lowest brightness and the highest brightness of the display device are 0 and 1, respectively.

Figure 12C:
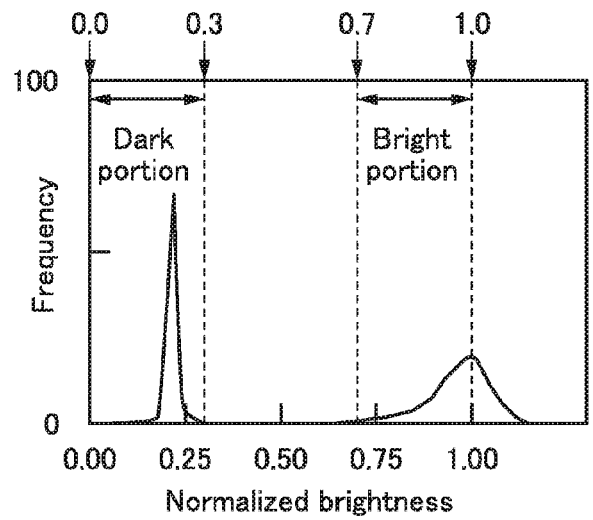

FIG. 12C is a diagram (or a histogram) showing the results of determining the area ratio in terms of brightness in a general document in which, for example, texts are printed on white paper. Note that the horizontal axis represents the normalized brightness, where the brightness at which the proportion of the area of the bright portion peaks is 1.

Specifically, the case where the contrast or the proportion of the area of the dark portion in the image information to be displayed next is used as a condition for mode selection will be described.

<<Contrast>>

For example, the first mode can be selected depending on whether the contrast in the image information to be displayed next exceeds a predetermined value or not.

Specifically, in the image information, a region with a normalized brightness higher than or equal to 0 and lower than or equal to 0.3 is defined as a dark portion, and a region with a normalized brightness higher than or equal to 0.7 and lower than or equal to 1.0 is defined as a bright portion. The mode can be selected depending on whether the image information includes both the bright portion and the dark portion or not.

For example, image information including a region with a normalized brightness of 0.2 and a region with a normalized brightness of 0.95 satisfies the condition for mode selection (see FIG. 12B).

In the case where the contrast in the image information to be displayed next is lower than that in a general document in which, for example, texts are printed on white paper (see FIG. 12C), the second mode may be selected because only a little visual stimulation is caused by display change.

<<Proportion of Area of Dark Portion>>

As a condition for mode selection, for example, it is also possible to use the proportion of the area of the dark portion in the image information to be displayed next.

Specifically, the mode can be selected depending on whether the dark portion occupies 30% or more of the image information or not.

For example, image information in which the proportion of the area of a region with a normalized brightness of 0.2 is 35% satisfies the condition for mode selection (see FIG. 12B).

In the case where the proportion of the area of the dark portion in the image information to be displayed next is lower than that in a general document in which, for example, texts are printed on white paper (see FIG. 12C), the second mode may be selected because only a little visual stimulation is caused by display change.

Embodiments will be described in detail with reference to drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments.

In the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

In each drawing described in this specification, the size, the layer thickness, or the region of each component is exaggerated for clarity in some cases. Therefore, embodiments of the present invention are not limited to such scales.

In this specification and the like, ordinal numbers such as "first" and "second" are used in order to avoid confusion among components and do not limit the components numerically.

A transistor is a kind of semiconductor element and enables amplification of current or voltage, a switching operation for controlling conduction or non-conduction, or the like. A transistor in this specification includes an insulated-gate field-effect transistor (IGFET) and a thin film transistor (TFT).

Embodiment 1

In this embodiment, a display system of one embodiment of the present invention will be described with reference to drawings.

Configuration Example

Figure 1A:
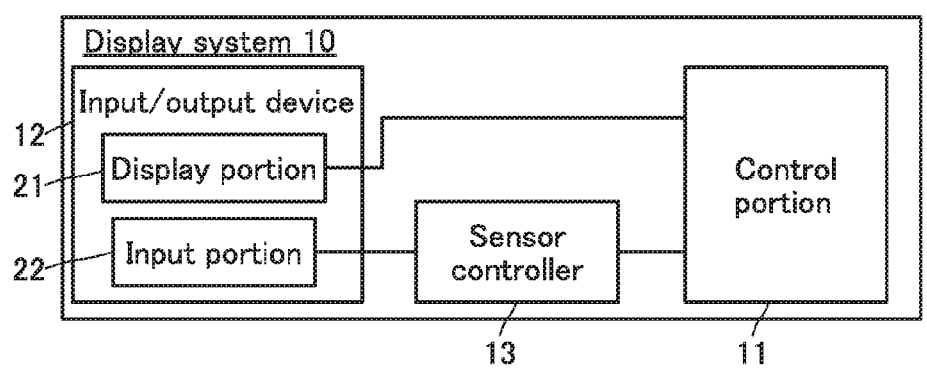
FIGS. 1A and 1B illustrate a configuration example of a display system according to an embodiment.

FIG. 1A is a block diagram illustrating the configuration of a display system 10 of one embodiment of the present invention.

The display system 10 includes a control portion 11, an input/output device 12, a sensor controller 13, and the like. The input/output device 12 includes a display portion 21 and an input portion 22.

The display portion 21 has a function of displaying an image. As the display portion 21, typically, a display device including an optical element such as a liquid crystal element or a MEMS element, a display device including a light-emitting element such as an organic electroluminescent (EL) element, or the like can be used.

A device which detects an input from a user can be used as the input portion 22. For example, an input device such as a keyboard, a hardware button, a pointing device, a touch sensor, an imaging device, an audio input device, a viewpoint input device, or a pose detection device can be used. The input portion 22 may include two or more of these input devices. With a touch sensor or the like, a variety of gestures (e.g., tap, drag, swipe, and pinch in) can be detected. When an acceleration sensor is used as a pose detection device, the pose (e.g., inclination, displacement, or deformation) of a device including the display system 10 can be detected as input motion.

In particular, a touch panel which includes the display portion 21 and the input portion 22 is preferably used as the input/output device 12. For example, a touch panel in which a touch sensor is mounted on a display device (or a display panel) is preferably used.

The sensor controller 13 has functions of driving the input portion 22 and outputting an output signal of the input portion 22 to the control portion 11. In the case where the input portion 22 has the above functions of the sensor controller 13, the sensor controller 13 may be omitted and a signal may be directly output from the input portion 22 to the control portion 11.

The control portion 11 has a function of generating an image to be displayed on the display portion 21. The control portion 11 also has a function of outputting an image signal to the display portion 21. The display portion 21 can display an image in accordance with the image signal.

Image signals may be sequentially input from an image output device to the control portion 11. For example, a reproducing device or a recording/reproducing device for a memory medium such as a Blu-ray Disc, a digital versatile disc (DVD), a flash memory, or the like, or a recording/reproducing device including a memory device such as a hard disk drive (HDD) or a solid state drive (SSD) can be used as the image output device. As the image signal, for example, an output signal of a tuner which receives broadcasting or image data such as streaming images delivered via a network can be used. The control portion 11 can convert an input image signal into an image to be displayed on the display portion 21 and can output the converted image signal.

The control portion 11 has functions of analyzing a signal which is input from the input portion 22 through the sensor controller 13 and executing the first mode or the second mode which is switched in accordance with the signal.

In the first mode executed by the control portion 11, an image is displayed on the display portion 21 by an interlace method. In the second mode executed by the control portion 11, an image is displayed on the display portion 21 by a progressive method.

Figure 1B:
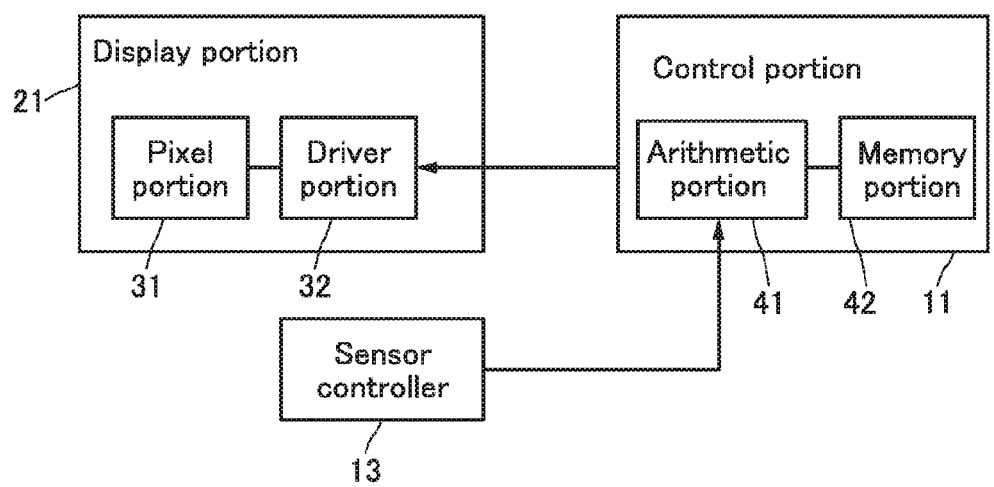

FIG. 1B illustrates a specific configuration example of the control portion 11 and the display portion 21. The control portion 11 includes an arithmetic portion 41 and a memory portion 42. The display portion 21 includes a pixel portion 31 and a driver portion 32.

The memory portion 42 has a function of temporarily storing data of an image (hereinafter also referred to as image data) generated by the arithmetic portion 41. The arithmetic portion 41 temporarily stores the memory portion 42 with image data generated by rendering processing or the like, reads out the image data, and outputs it to the display portion 21. In other words, the memory portion 42 has a buffer function. During the rendering processing or the like by the arithmetic portion 41, the memory portion 42 may also be used to temporarily store data for the processing or data in processing.

As the memory portion 42, typically, a video random access memory (VRAM) can be used. Alternatively, part of a main memory included in the control portion 11 may be used as the memory portion 42. For example, a static RAM (SRAM) or a dynamic RAM (DRAM) is preferably used as the memory portion 42 because a high-speed operation can be achieved.

As the memory portion 42, it is also possible to use a memory device including a memory element in which data is written and held as follows: a potential is supplied to a capacitor through a transistor including an oxide semiconductor in a semiconductor layer in which a channel is formed, and then, the transistor is turned off, so that the potential is held. Such a transistor in the memory element has extremely low leakage current; accordingly, leakage current during the data holding period can be suppressed, the frequency of refresh operations can be very low, or storage capacity can be reduced. Therefore, power consumption can be extremely low compared with the case of using an SRAM or a DRAM.

A plurality of pixels is arranged in a matrix in the pixel portion 31 of the display portion 21. The driver portion 32 has a function of driving the pixels in the pixel portion 31 in accordance with signals from the control portion 11. In other words, the driver portion 32 has functions of converting a signal input from the control portion 11 into a signal for driving the pixel portion 31 and outputting the converted signal to the pixel portion 31.

For the driver portion 32, for example, a scan line driver circuit and a signal line driver circuit can be used. The driver portion 32 may further include a buffer circuit, an amplifier circuit, or the like. The amplifier circuit has a function of amplifying a signal from the control portion 11.

The arithmetic portion 41 can analyze a signal which is input from the input portion 22 through the sensor controller 13 and execute the first mode in which an image is displayed on the display portion 21 by an interlace method or the second mode in which an image is displayed by a progressive method, which is switched in accordance with the analysis result. Furthermore, the arithmetic portion 41 can read out image data stored in the memory portion 42 in different manners corresponding to these two methods. Note that specific methods for reading out image data will be described later.

In the case where a user's input to the input portion 22 corresponds to screen switching motion or screen scrolling motion, for example, the control portion 11 executes the first mode. In the case where there is no user's input or the user's input does not correspond to the motion given above, the control portion 11 executes the second mode. The screen switching or screen scrolling is often accompanied with an abrupt change in luminance; thus, such an operation of the control portion 11 can achieve eye-friendly display in which an image including such an abrupt change in luminance is not displayed on the display portion 21.

Figure 2A:
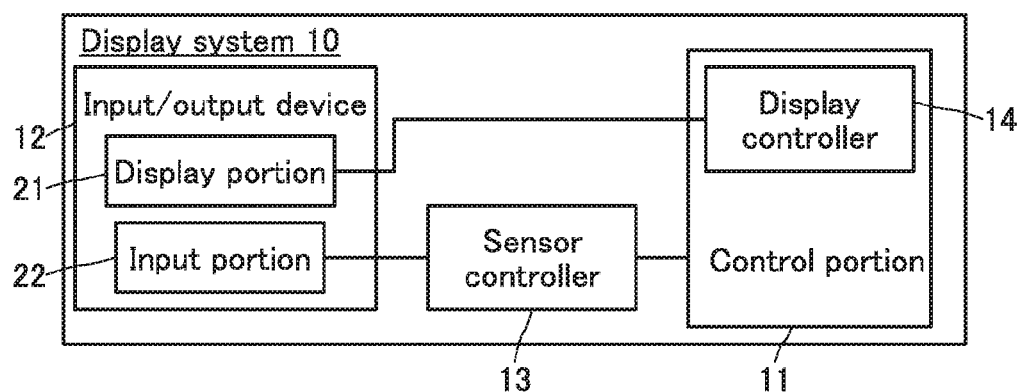
FIGS. 2A and 2B illustrate a configuration example of a display system according to an embodiment.
Figure 2B:
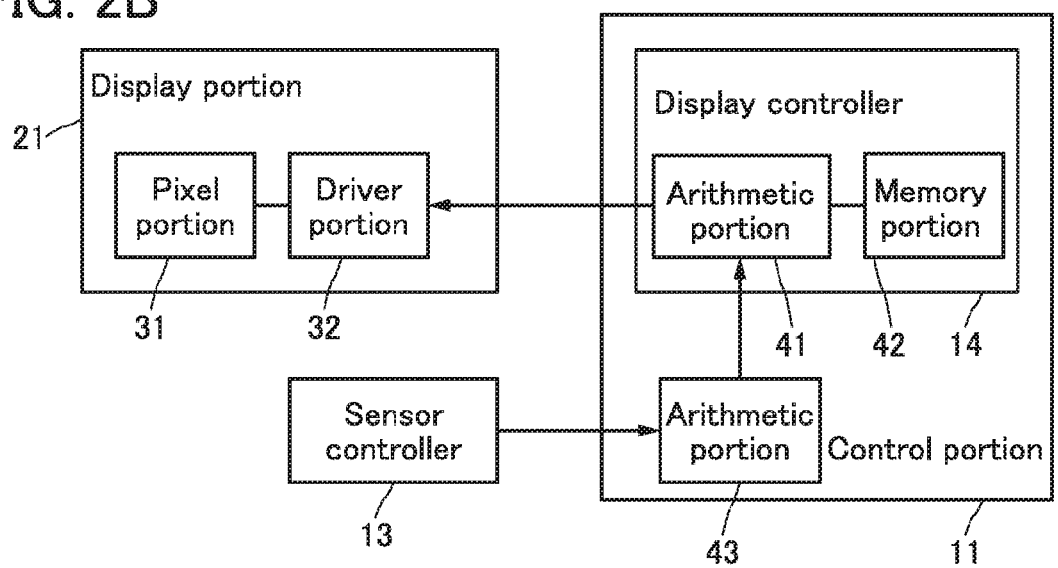

As illustrated in FIGS. 2A and 2B, the control portion 11 may include two arithmetic portions (the arithmetic portion 41 and an arithmetic portion 43). The arithmetic portion 41 and the memory portion 42 form a display controller 14. The display controller 14 in the control portion 11 is specialized for processing relating to image display, such as image processing or output of image data. Such a configuration can reduce the processing load on the arithmetic portion 43 and achieve a higher operating speed than a configuration including one arithmetic portion. In addition, the control portion 11 preferably includes, besides the memory portion 42, a memory portion which can be used for processing of the arithmetic portion 43.

[Method for Reading Out Image Data]

Next, the operation of the arithmetic portion 41 in the first mode and the second mode will be described with reference to FIGS. 3A to 3C.

Figure 3A:
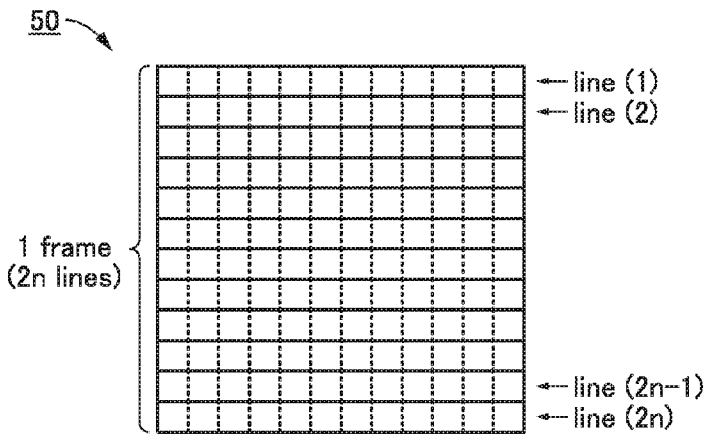
FIGS. 3A to 3C illustrate data reading methods according to an embodiment.
Figure 3B:
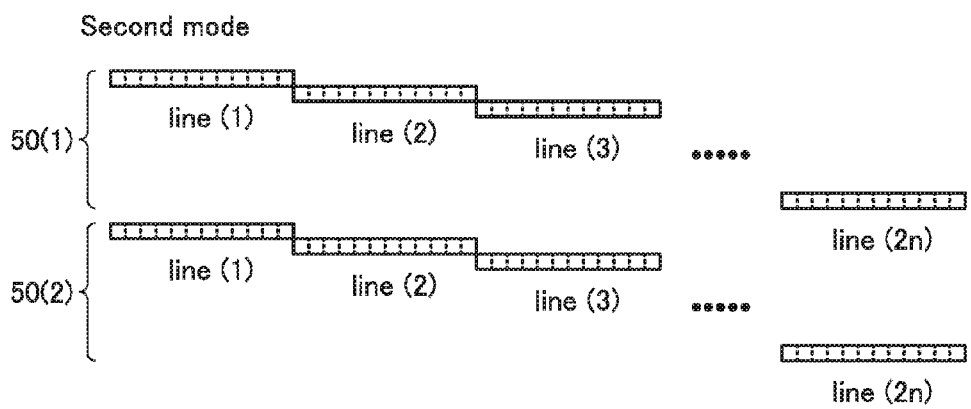
Figure 3C:
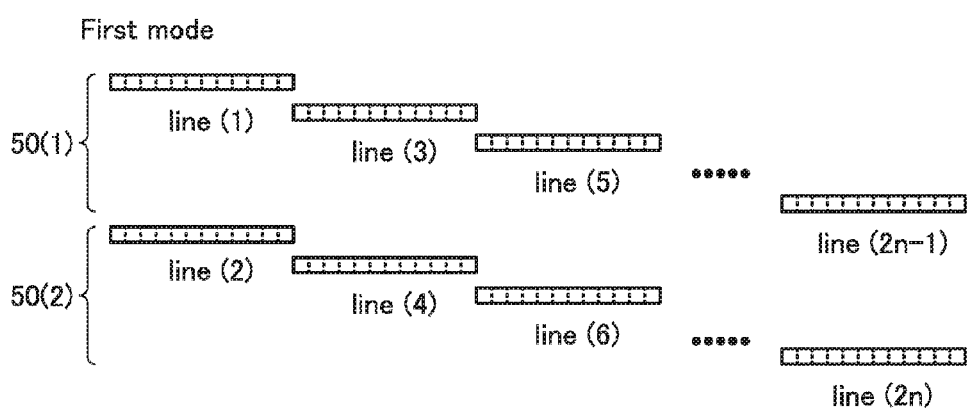

FIG. 3A schematically illustrates image data 50 which is temporarily stored in the memory portion 42. Note that the image data 50 corresponds to image data of one frame.

As illustrated in FIG. 3A, the image data 50 includes 2n lines (n is an integer), namely, a first line (line (1)) to a 2n-th line (line (2n)). For example, one line includes data for pixels in one scan line of the pixel portion 31.

[Second Mode (Progressive Method)]

First, a method by which the arithmetic portion 41 reads out data from the memory portion 42 in the second mode will be described with reference to FIG. 3B.

Here, the image data 50 to be displayed first at a certain point in time is referred to as first image data 50(1), and the image data 50 to be displayed next is referred to as second image data 50(2).

The arithmetic portion 41 sequentially reads out data from the first line (line (1)) to the 2n-th line (line (2n)) of the first image data 50(1) stored in the memory portion 42 at a certain point in time. After reading out data from one line, the arithmetic portion 41 outputs the data read out from the line to the display portion 21.

Completion of the output of data read out from the 2n-th line (line (2n)) of the first image data 50(1) of one frame is followed by reading of the second image data 50(2) stored in the memory portion 42. The second image data 50(2) is sequentially read out in a manner similar to that described above.

Through the above-described operation, reading of the image data of two frames (the image data 50(1) and the image data 50(2)) is completed.

In the second mode, the arithmetic portion 41 repeats such a reading operation.

This reading method enables the arithmetic portion 41 to output image data of one frame to the display portion 21 in one frame period. That is, rewriting of the screen is completed in one frame period. Such an operation can provide smooth moving images, for example.

Note that the arithmetic portion 41 does not necessarily need to perform the reading operation and the output operation alternately and may perform these operations concurrently or in parallel.

At a certain point in time, the image data 50 of at least one frame is stored in the memory portion 42. When the memory portion 42 has a capacity enough to store image data which is larger than that of one frame at a certain point in time, processing speed can be increased. In a line of the image data 50 which has been subjected to the reading, data may be deleted or overwritten with part of the next image data 50. When the reading operation and the writing operation of image data are performed concurrently or in parallel, processing speed can be increased. Alternatively, the memory portion 42 may include two regions each capable of storing image data of one frame, and while image data stored in one of the regions is read out, image data stored in the other region may be updated (rewritten).

[First Mode (Interlace Method)]

Next, a method by which the arithmetic portion 41 reads out data from the memory portion 42 in the first mode will be described with reference to FIG. 3C.

The arithmetic portion 41 sequentially reads out data from the odd-numbered lines of the first image data 50(1) stored in the memory portion 42 at a certain point in time. Specifically, data is read out from the (2m−1)-th lines (m is an integer of 1 or more and n or less) of the first image data 50(1) in ascending order of m.

Completion of the reading of data from the (2n−1)-th line (line (2n−1)) of the first image data 50(1) of one frame is followed by reading of the second image data 50(2) stored in the memory portion 42.

The arithmetic portion 41 sequentially reads out data from the even-numbered lines of the second image data 50(2). Specifically, data is read out from the 2m-th lines in ascending order of m.

A set of data which includes data read out from a plurality of lines of the first image data 50(1) or the second image data 50(2) can be referred to as data of one field. In some cases, the data extracted from the first image data 50(1) and the data extracted from the second image data 50(2) are referred to as first field data and second field data, respectively.

Through the above-described operation, reading of the image data of two fields from the image data 50(1) and the image data 50(2) is completed.

In the first mode, the arithmetic portion 41 repeats such a reading operation. That is, reading of data from odd-numbered lines of image data stored at a certain point in time and reading of data from even-numbered lines of different image data stored at the next point in time are repeated.

This reading method enables the arithmetic portion 41 to output image data of one field to the display portion 21 in one field period. That is, a half of the screen can be rewritten in one field period, and rewriting of the entire screen can be completed in the next one field period. Consequently, the length of one frame period can be twice or more of that in the second mode. Such an operation can suppress an abrupt change in luminance caused by image switching, thereby achieving eye-friendly display for a user.

In the above description, the odd-numbered lines are subjected to the reading first; however, the even-numbered lines may be subjected to the reading first.

Modification Example

In the above-described example, one frame period includes two field periods; however, provision of more than two field periods can further suppress an abrupt change in luminance caused by image switching, thereby achieving eye-friendly display for a user.

Note that the interlace method in this specification and the like includes, besides the display method in which one frame period includes two field periods, a display method in which one frame period includes three or more field periods.

The case where one frame period includes a field periods (a is an integer of 2 or more and 2n or less) will be described. Note that the previously described example corresponds to the case where a is 2.

When k-th image data 50(k) (k is an integer of 1 or more and a or less) to be displayed for the k-th place is stored in the memory portion 42, the arithmetic portion 41 reads out data from {a×(m−1)+k}-th lines of the k-th image data 50(k) in ascending order of m. Note that the maximum value of m, that is, the number of lines included in one field data is 2n/a.

When a is 3, for example, field data of the first image data 50(1) is extracted from the first line (line (1)), the fourth line (line (4)), the seventh line (line (7)), . . . , and the (2n−2)-th line (line (2n−2)) in this order. Subsequently, field data of the second image data 50(2) is extracted from the second line (line (2)), the fifth line (line (5)), the eighth line (line (8)), . . . , and the (2n−1)-th line (line (2n−1)) in this order. Subsequently, field data of third image data 50(3) is extracted from the third line (line (3)), the sixth line (line (6)), the ninth line (line (9)), . . . , and the 2n-th line (line (2n)) in this order.

When a is 4, for example, field data of the first image data 50(1) is extracted from the first line (line (1)), the fifth line (line (5)), the ninth line (line (9)), . . . , and the (2n−3)-th line (line (2n−3)) in this order. Subsequently, field data of the second image data 50(2) is extracted from the second line (line (2)), the sixth line (line (6)), the tenth line (line (10)), . . . , and the (2n−2)-th line (line (2n−2)) in this order. Subsequently, field data of the third image data 50(3) is extracted from the third line (line (3)), the seventh line (line (7)), the eleventh line (line (11)), . . . , and the (2n−1)-th line (line (2n−1)) in this order. Subsequently, field data of fourth image data 50(4) is extracted from the fourth line (line (4)), the eighth line (line (8)), the twelfth line (line (12)), . . . , and the 2n-th line (line (2n)) in this order.

The above is the description of the modification example.

[Image Rewriting]

Next, methods by which the driver portion 32 drives the pixels in the pixel portion 31 in accordance with signals from the control portion 11 will be described with reference to FIGS. 4A to 4C.

[Second Mode]

Figure 4A:
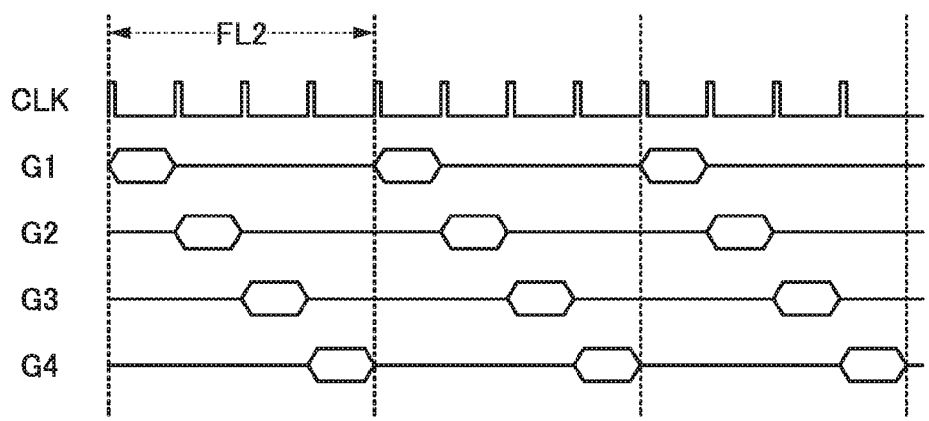
FIGS. 4A to 4C each illustrate image rewriting timing according to an embodiment.

FIG. 4A is a timing chart in the second mode. For simplicity, an example in which the pixel portion 31 includes four scan lines (scan lines G1 to G4) will be described. A clock signal CLK in FIG. 4A is a signal for specifying the timing at which a transition to data writing to the next scan line is made (writing is started).

In the second mode, the driver portion 32 sequentially selects the scan lines G1 to G4 to write data. In the second mode, a second frame period FL2 corresponds to a period from the time at which data writing to the scan line G1 is started to the time at which next data writing to the scan line G1 is started. That is, in the second mode, rewriting of the screen is completed in the second frame period FL2.

[First Mode]

Figure 4B:
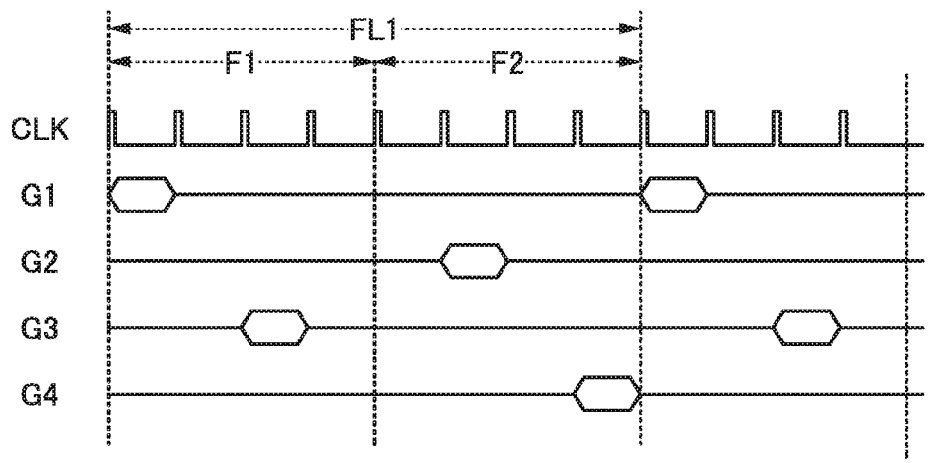

FIG. 4B is a timing chart in the first mode. Here, the case where one frame period includes two field periods (i.e., a=2) will be described.

A first frame period FL1 includes two field periods (a first field period F1 and a second field period F2).

In the first field period F1, data writing to the first scan line G1 and data writing to the third scan line G3 are performed in this order.

In the following second field period F2, data writing to the second scan line G2 and data writing to the fourth scan line G4 are performed in this order.

At this point in time, rewriting of the screen is completed.

Figure 4C:
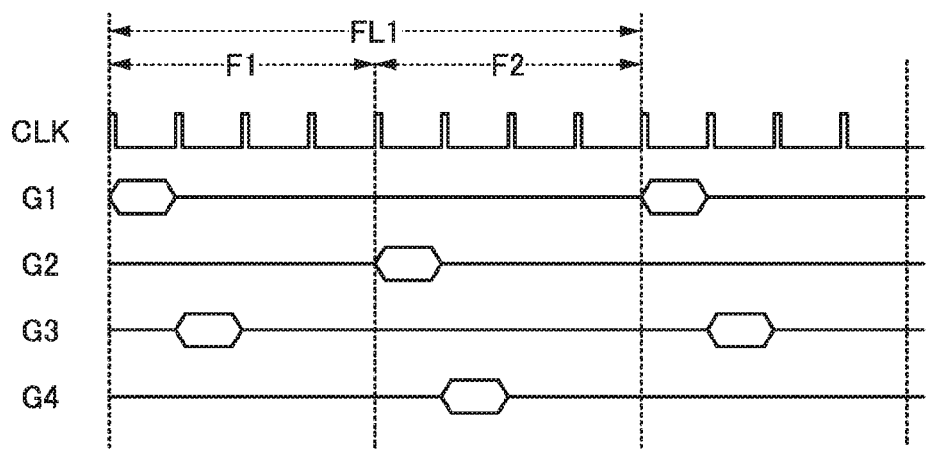

In the example described here, a period corresponding to one cycle of the clock signal CLK is provided between data writing to a scan line and the following data writing to another scan line; as illustrated in FIG. 4C, data writing to a scan line and the following data writing to another scan line may be consecutively performed. The latter method can shorten the image rewriting period in one field period; accordingly, even in a long frame period, display can be performed without causing a feeling of strangeness.

[Display Operation]

Next, an image displayed on the pixel portion 31 of the display portion 21 driven by the above-described method will be described.

[Second Mode]

FIG. 5A schematically illustrates the pixel portion 31. Here, the pixel portion 31 includes a plurality of pixels 35 arranged in a matrix of 12×12. In the drawing, the horizontal direction corresponds to the scan line direction, and the vertical direction corresponds to the signal line direction.

FIG. 5A illustrates an image displayed at Time T1 and an image displayed at Time T2 when one frame period has passed since Time T1. A hatching pattern is applied to pixels which have not been subjected to data rewriting and not to pixels which have been subjected to data rewriting.

In the second mode, data of all the pixels 35 can be rewritten in one frame period as illustrated in FIG. 5A. Therefore, moving images can displayed smoothly.

[First Mode]

FIG. 5B schematically illustrates the pixel portion 31 at Time T1, Time T2, and Time T3. At Time T2, the first field period F1 has passed since Time T1. At Time T3, the second field period F2 has passed since Time T2. FIG. 5B illustrates the case where one frame period includes two field periods (i.e., a=2).

As illustrated in FIG. 5B, data rewriting of the pixels 35 in the odd-numbered scan lines is completed at Time T2. At this time, the pixels 35 in the even-numbered scan lines are not subjected to data rewriting and display the same image as at Time T1.

Subsequently, data rewriting of the pixels 35 in the even-numbered scan lines is completed at Time T3. At this time, the pixels 35 in the odd-numbered scan lines are not subjected to data rewriting and display the same image as at Time T2. At Time T3, data rewriting of all the pixels is completed.

Figure 6:
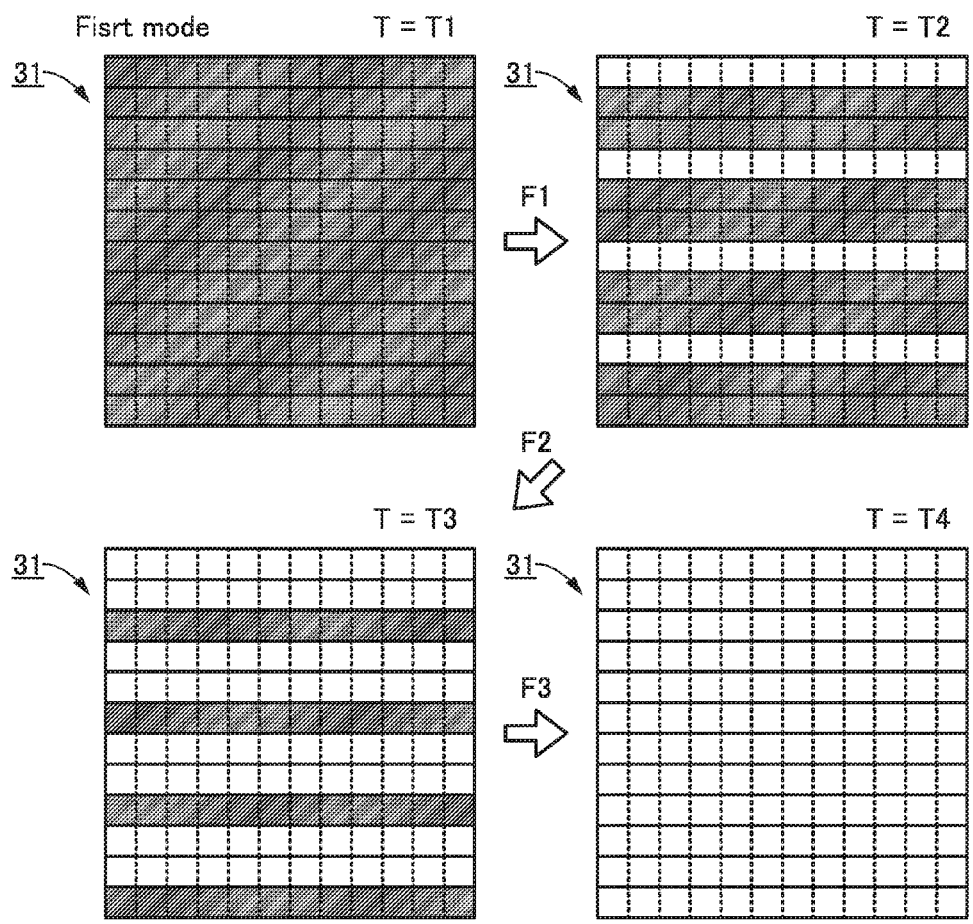
FIG. 6 illustrates an example of image display according to an embodiment.

FIG. 6 illustrates an example in which one frame period includes three field periods (i.e., a=3).

As illustrated in FIG. 6, data rewriting of the pixels 35 in the first, fourth, seventh, and tenth scan lines is completed at Time T2 when the first field period F1 has passed since Time 1. Subsequently, data rewriting of the pixels 35 in the second, fifth, eighth, and eleventh scan lines is completed at Time T3 when the second field period F2 has passed since Time T2. Then, data rewriting of the pixels 35 in the third, sixth, ninth, and twelfth scan lines is completed at Time T4 when a third field period F3 has passed since Time T3. At Time T4, data rewriting of all the pixels is completed.

Thus, in the case where the frame frequency is the same, the time for rewriting the screen in the first mode can be made longer than that in the second mode.

An example in which the display is switched from an image with a uniformly low luminance to an image with a uniformly high luminance will be described. In the case where two field periods are provided as in FIG. 5B, the luminance of the entire screen at Time T2 is about a half of the luminance of the entire screen at Time T3, at which rewriting of the screen is completed. In the case where three field periods are provided as in FIG. 6, the luminance of the entire screen at Time T2 is about one third of the luminance at Time T4, at which rewriting of the screen is completed. The luminance of the entire screen at Time T3 is about two thirds of the luminance at Time T4.

In this manner, the first mode is employed particularly when screen switching may cause an abrupt change in luminance, whereby the luminance can be gradually changed and thus eye-friendly display can be achieved.

It is particularly preferable that the screen switching in the first mode take 100 msec or longer, further preferably 150 msec or longer, because an influence of lateral inhibition can be avoided. For example, a plurality of field periods may be provided such that the length of the frame period FL1 in the first mode is 100 msec or longer, preferably 150 msec or longer. The number of field periods may be determined in accordance with the field frequency.

The field period in the first mode may be longer than the frame period in the second mode. That is, the frame frequency in the second mode may be made different from the field frequency in the first mode by varying the cycle of the clock signal CLK output from the arithmetic portion 41, for example. In this manner, the screen can be switched over a long time even when the number of field periods is smaller. Moreover, processing load on the arithmetic portion 41 can be reduced.

The above is the description of the display operation.

This embodiment can be implemented in appropriate combination with any of the other embodiments described in this specification.

Embodiment 2

In this embodiment, a structural example of a display device that can be used for the display system described in the above embodiment will be described. A display device 200 will be described below with reference to FIGS. 13A and 13B, FIG. 14, FIG. 15, FIG. 16, FIGS. 17A and 17B, FIGS. 18A and 18B, FIG. 19, FIG. 20, FIG. 21, FIG. 22, FIG. 23, FIG. 24, FIG. 25, FIG. 26, FIG. 27, FIG. 28, FIG. 29, FIG. 30, and FIG. 31.

Figure 13A:
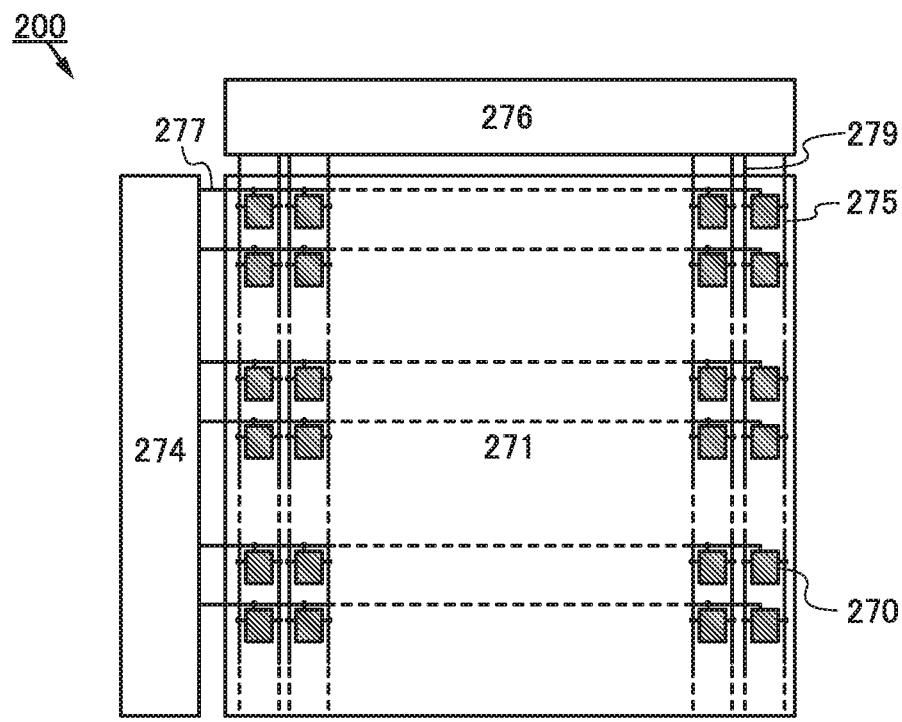
FIGS. 13A and 13B illustrate a configuration example of a display device according to an embodiment.

The display device 200 in FIG. 13A includes a pixel portion 271, a scan line driver circuit 274, a signal line driver circuit 276, m scan lines 277 which are arranged parallel or substantially parallel to each other and whose potentials are controlled by the scan line driver circuit 274, and n signal lines 279 which are arranged parallel or substantially parallel to each other and whose potentials are controlled by the signal line driver circuit 276. Furthermore, the pixel portion 271 includes a plurality of pixels 270 arranged in a matrix. Furthermore, common lines 275 which are arranged parallel or substantially parallel to each other are provided along the signal lines 279. The scan line driver circuit 274 and the signal line driver circuit 276 are collectively referred to as a driver circuit portion in some cases.

Each scan line 277 is electrically connected to n pixels 270 in the corresponding row among the pixels 270 arranged in m rows and n columns in the pixel portion 271. Each signal line 279 is electrically connected to m pixels 270 in the corresponding column among the pixels 270 arranged in m rows and n columns. Note that m and n are each an integer of 1 or more. Each common line 275 is electrically connected to m pixels 270 in the corresponding column among the pixels 270 arranged in m rows and n columns.

Figure 13B:
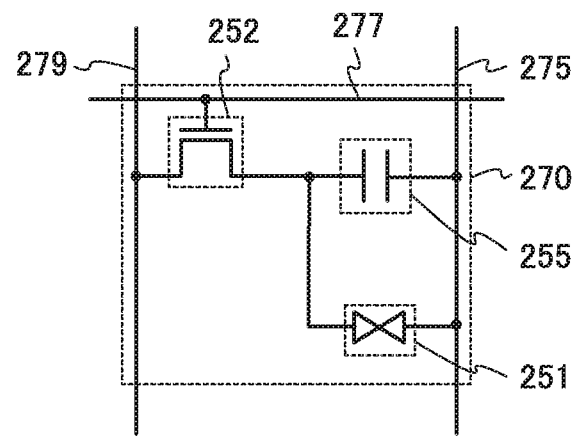

FIG. 13B illustrates an example of the circuit configuration that can be used for the pixel 270 of the display device 200 in FIG. 13A.

The pixel 270 in FIG. 13B includes a liquid crystal element 251, a transistor 252, and a capacitor 255.

One of a pair of electrodes of the liquid crystal element 251 is connected to the transistor 252, and the potential of the electrode is set as appropriate in accordance with the specifications of the pixel 270. The other of the pair of electrodes of the liquid crystal element 251 is connected to the common line 275 and supplied with a common potential. The alignment of liquid crystal included in the liquid crystal element 251 is controlled by data written to the transistor 252.

The liquid crystal element 251 is an element which controls transmission or non-transmission of light by an optical modulation action of liquid crystal. Note that the optical modulation action of liquid crystal is controlled by an electric field applied to the liquid crystal (including a horizontal electric field, a vertical electric field, and an oblique electric field). As the liquid crystal used for the liquid crystal element 251, thermotropic liquid crystal, low-molecular liquid crystal, high-molecular liquid crystal, polymer dispersed liquid crystal, ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

In the case where a horizontal electric field mode is employed, liquid crystal exhibiting a blue phase for which an alignment film is unnecessary may be used. A blue phase is one of liquid crystal phases, which is generated just before a cholesteric phase changes into an isotropic phase when the temperature of cholesteric liquid crystal is increased. Since the blue phase appears only in a narrow temperature range, a liquid crystal composition in which several weight percent or more of a chiral material is mixed is used for a liquid crystal layer in order to improve the temperature range. The liquid crystal composition which includes liquid crystal exhibiting a blue phase and a chiral material has a short response time and optical isotropy. In addition, the liquid crystal composition which includes liquid crystal exhibiting a blue phase and a chiral material does not need alignment treatment and has a small viewing angle dependence. An alignment film does not need to be provided, and rubbing treatment is thus not necessary; accordingly, electrostatic discharge damage caused by the rubbing treatment can be prevented, and defects and damage of a liquid crystal display device in the manufacturing process can be reduced.

As a method for driving the display device 200 including the liquid crystal element 251, a twisted nematic (TN) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an anti-ferroelectric liquid crystal (AFLC) mode, or the like can be used.

Furthermore, the display device 200 may be a normally black liquid crystal display device such as a transmissive liquid crystal display device utilizing a vertical alignment (VA) mode. As the vertical alignment mode, a multi-domain vertical alignment (MVA) mode, a patterned vertical alignment (PVA) mode, an Advanced Super View (ASV) mode, or the like can be used.

In this embodiment, horizontal electric field modes typified by an FFS mode and an IPS mode are mainly described.

In the configuration of the pixel 270 in FIG. 13B, one of a source electrode and a drain electrode of the transistor 252 is electrically connected to the signal line 279, and the other electrode is electrically connected to the one of the pair of electrodes of the liquid crystal element 251. A gate electrode of the transistor 252 is electrically connected to the scan line 277. The transistor 252 has a function of controlling writing of a data signal.

In the pixel 270 in FIG. 13B, one of a pair of electrodes of the capacitor 255 is connected to the other of the source electrode and the drain electrode of the transistor 252. The other of the pair of electrodes of the capacitor 255 is electrically connected to the common line 275. The potential of the common line 275 is set as appropriate in accordance with the specifications of the pixel 270. The capacitor 255 functions as a storage capacitor for storing written data. In the display device 200 driven in the FFS mode, the one of the pair of electrodes of the capacitor 255 corresponds to part or the whole of the one of the pair of electrodes of the liquid crystal element 251, and the other of the pair of electrodes of the capacitor 255 corresponds to part or the whole of the other of the pair of electrodes of the liquid crystal element 251.

<Structure Example of Pixel>

Figure 14:
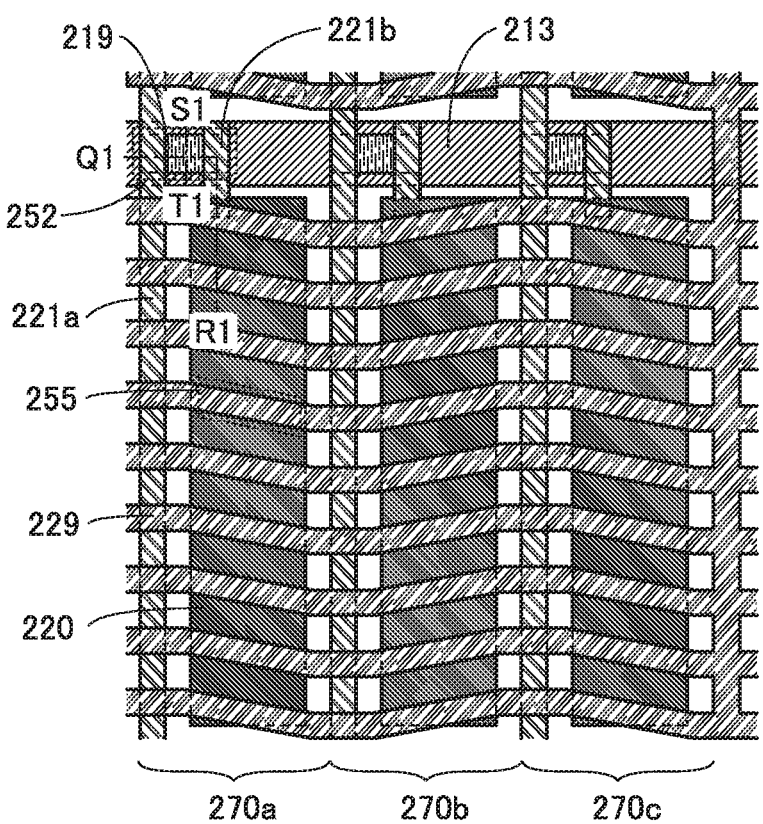
FIG. 14 illustrates a structure example of a display device according to an embodiment.

Next, a specific structure of the pixel included in the display device 200 will be described. FIG. 14 is a top view illustrating pixels 270a, 270b, and 270c included in the display device 200 driven in the FFS mode.

In FIG. 14, a conductive film 213 functioning as a scan line extends substantially perpendicularly to a conductive film 221a (in the horizontal direction in the drawing). The conductive film 221a functioning as a signal line extends substantially perpendicularly to the conductive film 213 (in the vertical direction in the drawing). Note that the conductive film 213 functioning as a scan line is electrically connected to the scan line driver circuit 274, and the conductive film 221a functioning as a signal line is electrically connected to the signal line driver circuit 276 (see FIG. 13A).

The transistor 252 is provided near the intersection of the conductive film 213 and the conductive film 221a. The transistor 252 includes the conductive film 213 which also functions as a gate electrode, a gate insulating film (not illustrated in FIG. 14), a semiconductor film 219 which is formed over the gate insulating film and in which a channel region is formed, and the conductive film 221a and a conductive film 221b which also function as a source electrode and a drain electrode. In the conductive film 213, a region overlapping with the semiconductor film 219 functions as the gate electrode of the transistor 252. In the conductive film 221a, a region overlapping with the semiconductor film 219 functions as the source electrode or the drain electrode of the transistor 252. In FIG. 14, an end portion of the conductive film 213 is on the outer side of an end portion of the semiconductor film 219 when seen from above. Thus, the conductive film 213 functions as a light-blocking film for blocking light from a light source such as a backlight. For this reason, the semiconductor film 219 included in the transistor 252 is not irradiated with light, so that a change in the electrical characteristics of the transistor can be reduced.

The conductive film 221b is electrically connected to a conductive film 220 functioning as a pixel electrode. A conductive film 229 is provided over the conductive film 220 with an insulating film (not illustrated in FIG. 14) positioned therebetween.

The conductive film 229 functions as a common electrode, for example. The conductive film 229 has stripe regions extending in the direction intersecting with the conductive film 221a. The stripe regions are connected to a region extending in the direction parallel or substantially parallel to the conductive film 221a. Therefore, in the plurality of pixels in the display device 200, the stripe regions of the conductive film 229 have the same potential.

The capacitor 255 is formed in a region in which the conductive film 220 and the conductive film 229 overlap with each other. The conductive film 220 and the conductive film 229 transmit light. That is, the capacitor 255 transmits light.

Owing to the light-transmitting property of the capacitor 255, the capacitor 255 can be formed large (in a large area) in the pixel 270. Thus, a display device with increased capacitance and an increased aperture ratio of typically 50% or higher, preferably 60% or higher can be obtained. For example, in a high-resolution display device such as a high-resolution liquid crystal display device, the area of a pixel is small, and accordingly, the area of a capacitor is also small. For this reason, the amount of charge accumulated in the capacitor is small in the high-resolution display device. However, when the capacitor 255 of this embodiment, which transmits light, is provided in each pixel, enough capacitance can be obtained in the pixel and the aperture ratio can be increased. Typically, the capacitor 255 can be favorably used for a high-resolution display device with a pixel density of 200 pixels per inch (ppi) or higher, 300 ppi or higher, or 500 ppi or higher.

In a liquid crystal display device, an increase in the capacitance of a capacitor can increase the period in which the alignment of liquid crystal molecules in a liquid crystal element can be kept constant while an electric field is applied. That period can be made longer when a still image is displayed; accordingly, the number of times of rewriting image data can be reduced, leading to a reduction in power consumption. Furthermore, the structure of this embodiment can increase the aperture ratio even in a high-resolution display device, which makes it possible to use light from a light source such as a backlight efficiently, so that the power consumption of the display device can be reduced.

Figure 15:
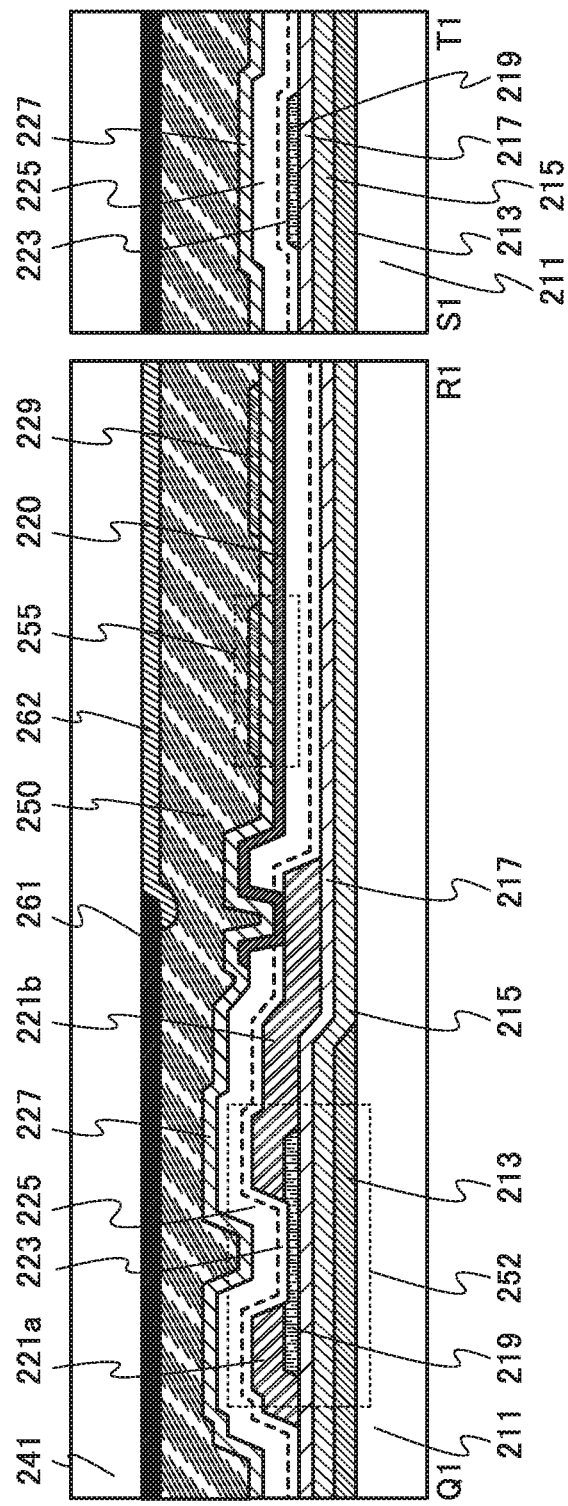
FIG. 15 illustrates a structure example of a display device according to an embodiment.

FIG. 15 shows cross-sectional views taken along dashed-dotted line Q1-R1 and dashed-dotted line S1-T1 in FIG. 14. The transistor 252 in FIG. 15 is a channel-etched transistor. Note that the transistor 252 in the channel length direction and the capacitor 255 are illustrated in the cross-sectional view taken along dashed-dotted line Q1-R1, and the transistor 252 in the channel width direction is illustrated in the cross-sectional view taken along dashed-dotted line S1-T1.

The transistor 252 in FIG. 15 has a single-gate structure and includes the conductive film 213 which is provided over a substrate 211 and functions as a gate electrode. In addition, the transistor 252 includes an insulating film 215 which is formed over the substrate 211 and the conductive film 213 functioning as a gate electrode, an insulating film 217 which is formed over the insulating film 215, the semiconductor film 219 which overlaps with the conductive film 213 functioning as a gate electrode with the insulating film 215 and the insulating film 217 positioned therebetween, and the conductive films 221*a* and 221*b* which are in contact with the semiconductor film 219 and function as a source electrode and a drain electrode. Moreover, an insulating film 223 is formed over the insulating film 217, the semiconductor film 219, and the conductive films 221*a* and 221*b* functioning as a source electrode and a drain electrode, and an insulating film 225 is formed over the insulating film 223. The conductive film 220 is formed over the insulating film 225. The conductive film 220 is electrically connected to one of the conductive films 221*a* and 221*b* functioning as a source electrode and a drain electrode (here, the conductive film 221*b*) through an opening in the insulating film 223 and the insulating film 225. An insulating film 227 is formed over the insulating film 225 and the conductive film 220. The conductive film 229 is formed over the insulating film 227.

FIG. 15 illustrates the case where a liquid crystal layer 250 is positioned between a substrate 241 and the substrate 211. A light-blocking film 261 functioning as a black matrix, a color film 262 functioning as a color filter, and the like are provided on a surface of the substrate 241 facing the substrate 211.

The conductive film 220 may be provided over the insulating film 225 so as to overlap with the semiconductor film 219, in which case the transistor 252 has a double-gate structure in which the conductive film 220 is used as a second gate electrode.

A region in which the conductive film 220, the insulating film 227, and the conductive film 229 overlap with one another functions as the capacitor 255.

Note that a cross-sectional view of one embodiment of the present invention is not limited to FIG. 15. The display device can have a variety of different structures. For example, the conductive film 220 may have a slit. Alternatively, the conductive film 220 may have a comb-like shape.

Figure 16:
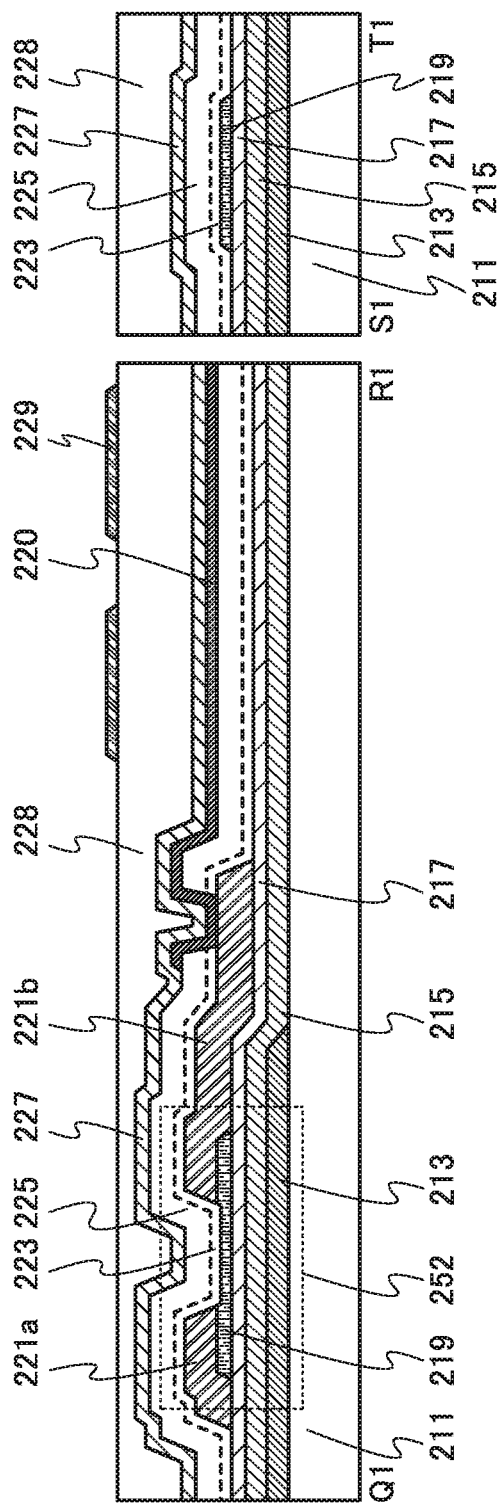
FIG. 16 illustrates a structure example of a display device according to an embodiment.

As illustrated in FIG. 16, the conductive film 229 may be provided over an insulating film 228 over the insulating film 227. The insulating film 228 functions as a planarization film.

In FIG. 15, for example, the thickness of part of the semiconductor film 219 in which the top surface is exposed is reduced by etching; as illustrated in FIG. 17A, the thickness is not necessarily reduced. As illustrated in FIG. 17B, an insulating film 245 which protects the semiconductor film 219 may also be provided.

FIGS. 18A and 18B each illustrate an example in which a conductive film 243 functioning as a second gate electrode is provided. The second gate electrode can be used to control the threshold voltage of the transistor. Furthermore, when the same potential is supplied to the conductive film 243 and the conductive film 213, the field-effect mobility of the transistor can be increased.

<Modification Example of Pixel Structure>

Figure 19:
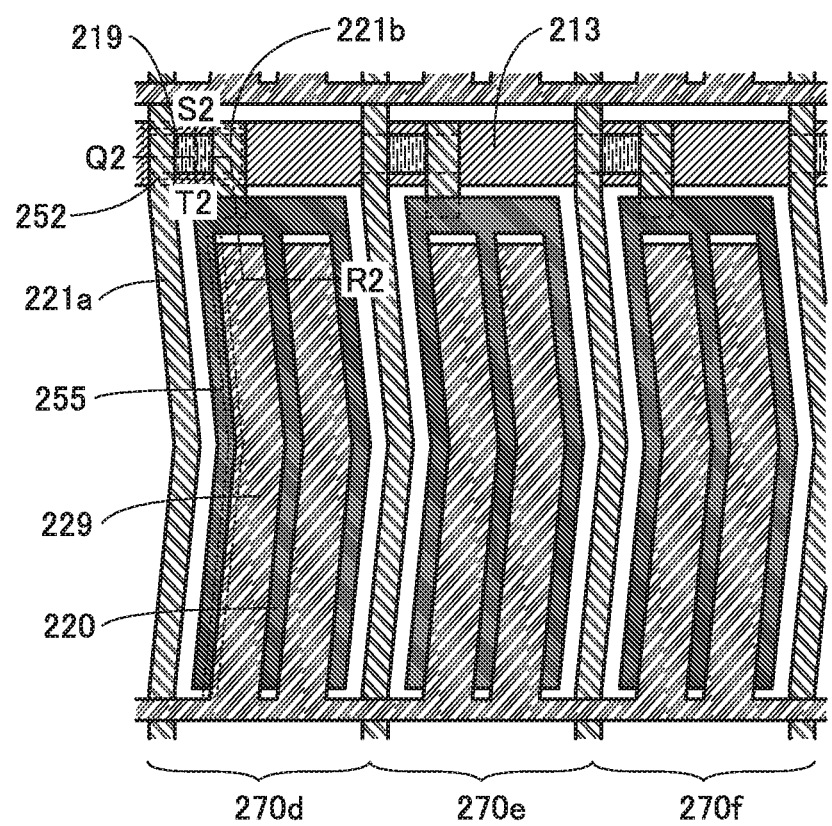
FIG. 19 illustrates a structure example of a display device according to an embodiment.

FIG. 19 is a top view illustrating pixels 270*d*, 270*e*, and 270*f* which are included in the display device 200 and are different from the pixels in FIG. 14.

In FIG. 19, the conductive film 213 functioning as a scan line extends in the horizontal direction in the drawing. The conductive film 221*a* functioning as a signal line extends substantially perpendicularly to the conductive film 213 (in the vertical direction in the drawing) and has a dogleg shape (V-like shape). Note that the conductive film 213 functioning as a scan line is electrically connected to the scan line driver circuit 274, and the conductive film 221*a* functioning as a signal line is electrically connected to the signal line driver circuit 276.

The transistor 252 is provided near the intersection of the conductive film 213 and the conductive film 221*a*. The transistor 252 includes the conductive film 213 which also functions as a gate electrode, a gate insulating film (not illustrated in FIG. 19), the semiconductor film 219 which is formed over the gate insulating film and in which a channel region is formed, and the conductive films 221*a* and 221*b* which also function as a source electrode and a drain electrode. In the conductive film 213, a region overlapping with the semiconductor film 219 functions as the gate electrode of the transistor 252. In the conductive film 221*a*, a region overlapping with the semiconductor film 219 functions as the source electrode or the drain electrode of the transistor 252. In FIG. 19, an end portion of the conductive film 213 is on the outer side of an end portion of the semiconductor film 219 when seen from above. Thus, the conductive film 213 functions as a light-blocking film for blocking light from a light source such as a backlight. For this reason, the semiconductor film 219 included in the transistor is not irradiated with light, so that a change in the electrical characteristics of the transistor can be reduced.

The conductive film 221*b* is electrically connected to the conductive film 220 functioning of a pixel electrode. The conductive film 220 is formed in a comb-like shape. An insulating film (not illustrated in FIG. 19) is provided over the conductive film 220, and the conductive film 229 is provided over the insulating film. The conductive film 229 is formed in a comb-like shape to partly overlap and engage with the conductive film 220 when seen from the above. Tooth regions of the comb-like conductive film 229 are connected to each other in a region extending in the direction parallel or substantially parallel to the conductive film 213. Therefore, in the plurality of pixels in the display device 200, the tooth regions of the conductive film 229 have the same potential. Note that the conductive film 220 and the conductive film 229 each have a dogleg shape (V-like shape) bent along the signal line (the conductive film 221a).

The capacitor 255 is formed in a region in which the conductive film 220 and the conductive film 229 overlap with each other. The conductive film 220 and the conductive film 229 transmit light. That is, the capacitor 255 transmits light.

Figure 20:
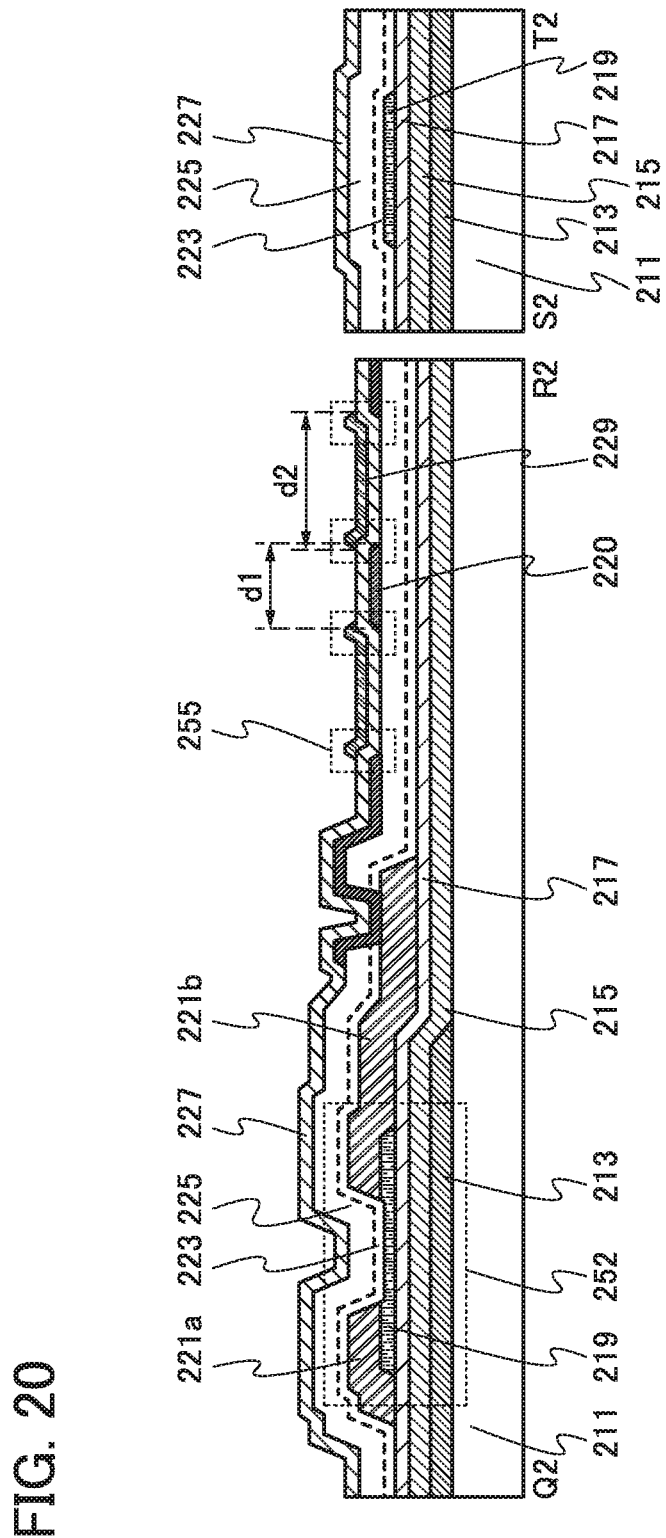
FIG. 20 illustrates a structure example of a display device according to an embodiment.

FIG. 20 shows cross-sectional views taken along dashed-dotted line Q2-R2 and dashed-dotted line S2-T2 in FIG. 19. The transistor 252 in FIG. 20 is a channel-etched transistor. Note that the transistor 252 in the channel length direction and the capacitor 255 are illustrated in the cross-sectional view taken along dashed-dotted line Q2-R2, and the transistor 252 in the channel width direction is illustrated in the cross-sectional view taken along dashed-dotted line S2-T2.

The transistor 252 in FIG. 20 has a single-gate structure and includes the conductive film 213 which is provided over the substrate 211 and functions as a gate electrode. In addition, the transistor 252 includes the insulating film 215 which is formed over the substrate 211 and the conductive film 213 functioning as a gate electrode, the insulating film 217 which is formed over the insulating film 215, the semiconductor film 219 which overlaps with the conductive film 213 functioning as a gate electrode with the insulating film 215 and the insulating film 217 positioned therebetween, and the conductive films 221a and 221b which are in contact with the semiconductor film 219 and function as a source electrode and a drain electrode. Moreover, the insulating film 223 is formed over the insulating film 217, the semiconductor film 219, and the conductive films 221a and 221b functioning as a source electrode and a drain electrode, and the insulating film 225 is formed over the insulating film 223. The conductive film 220 is formed over the insulating film 225. The conductive film 220 is electrically connected to one of the conductive films 221a and 221b functioning as a source electrode and a drain electrode (here, the conductive film 221b) through an opening in the insulating film 223 and the insulating film 225. The insulating film 227 is formed over the insulating film 225 and the conductive film 220. The conductive film 229 is formed over the insulating film 227.

The conductive film 220 may be provided over the insulating film 225 so as to overlap with the semiconductor film 219, in which case the transistor 252 has a double-gate structure in which the conductive film 220 is used as a second gate electrode.

A region in which the conductive film 220, the insulating film 227, and the conductive film 229 overlap with one another functions as the capacitor 255.

In the liquid crystal display device in FIG. 19 and FIG. 20, a capacitor in a pixel is formed in a region in which an end portion of the conductive film 220 and an end portion of the conductive film 229 overlap with each other. With this structure, a capacitor with a suitable size, not a too large size, can be formed in a large liquid crystal display device.

Figure 21:
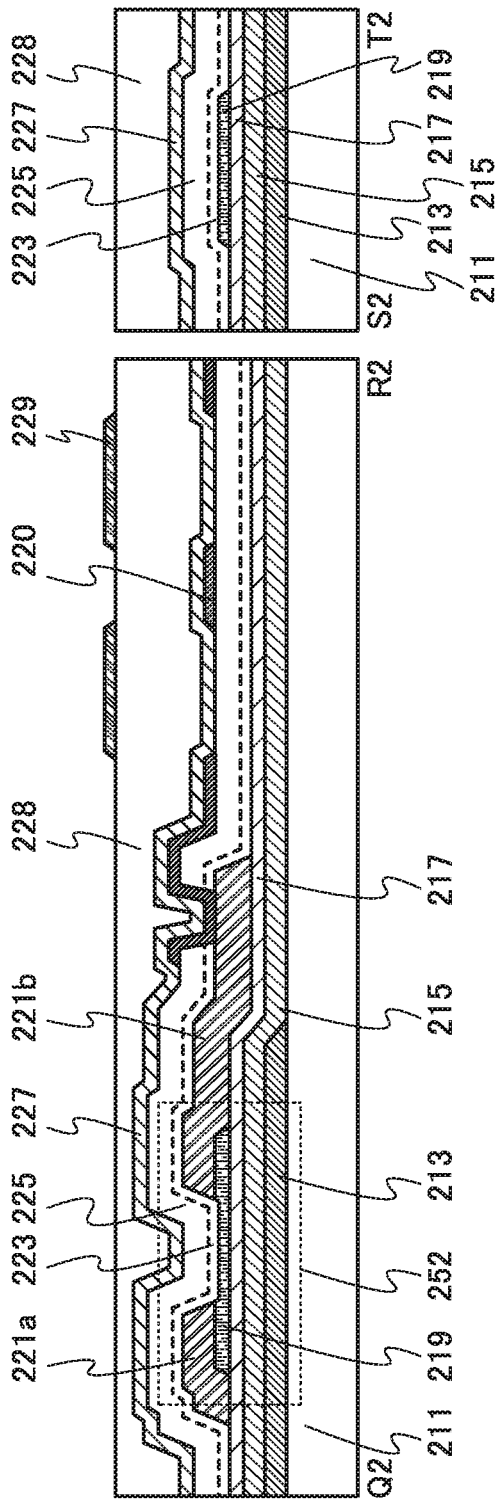
FIG. 21 illustrates a structure example of a display device according to an embodiment.

As illustrated in FIG. 21, the conductive film 229 may be provided over the insulating film 228 over the insulating film 227.

Figure 22:
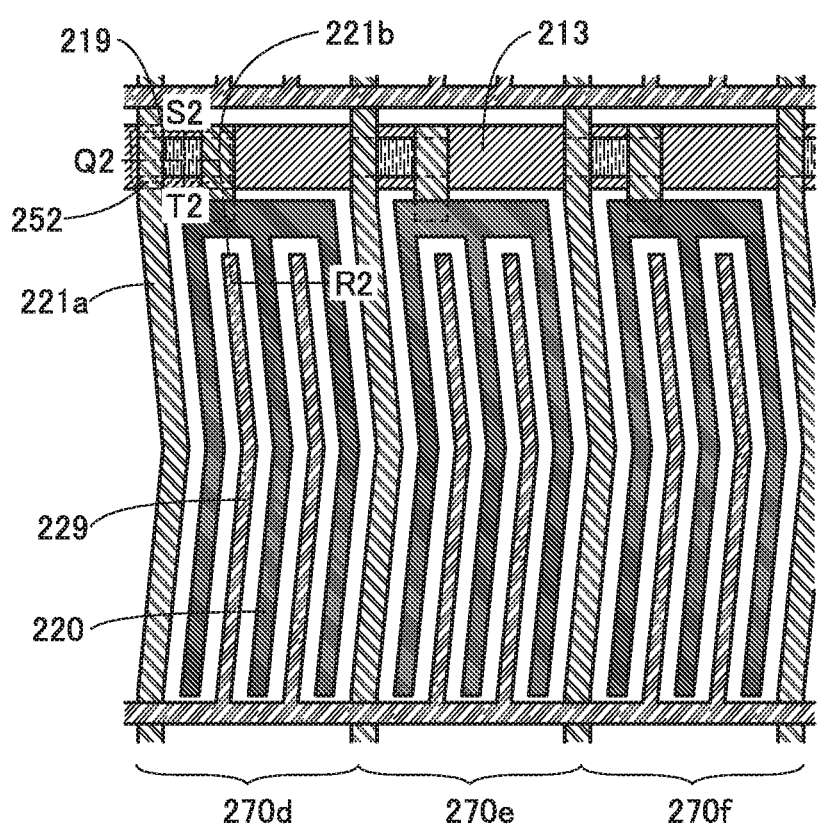
FIG. 22 illustrates a structure example of a display device according to an embodiment.
Figure 23:
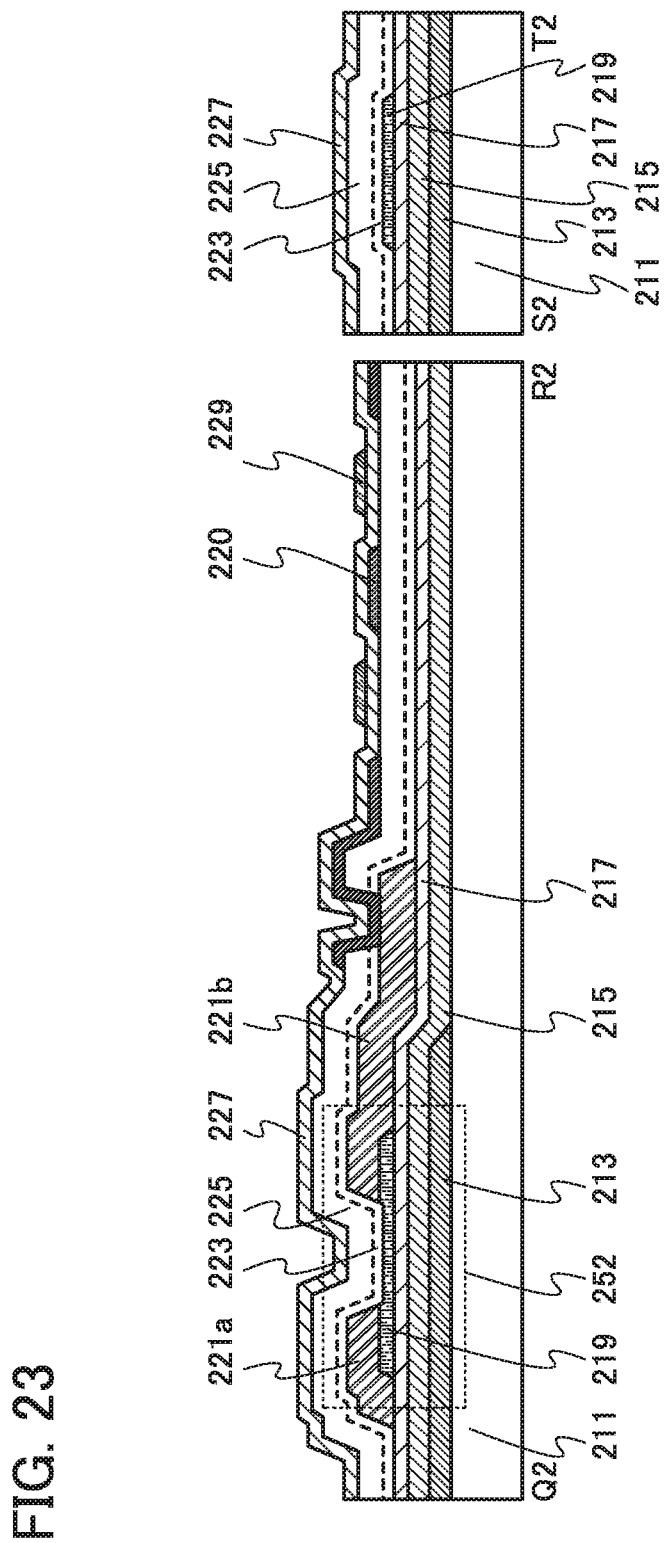
FIG. 23 illustrates a structure example of a display device according to an embodiment.
Figure 24:
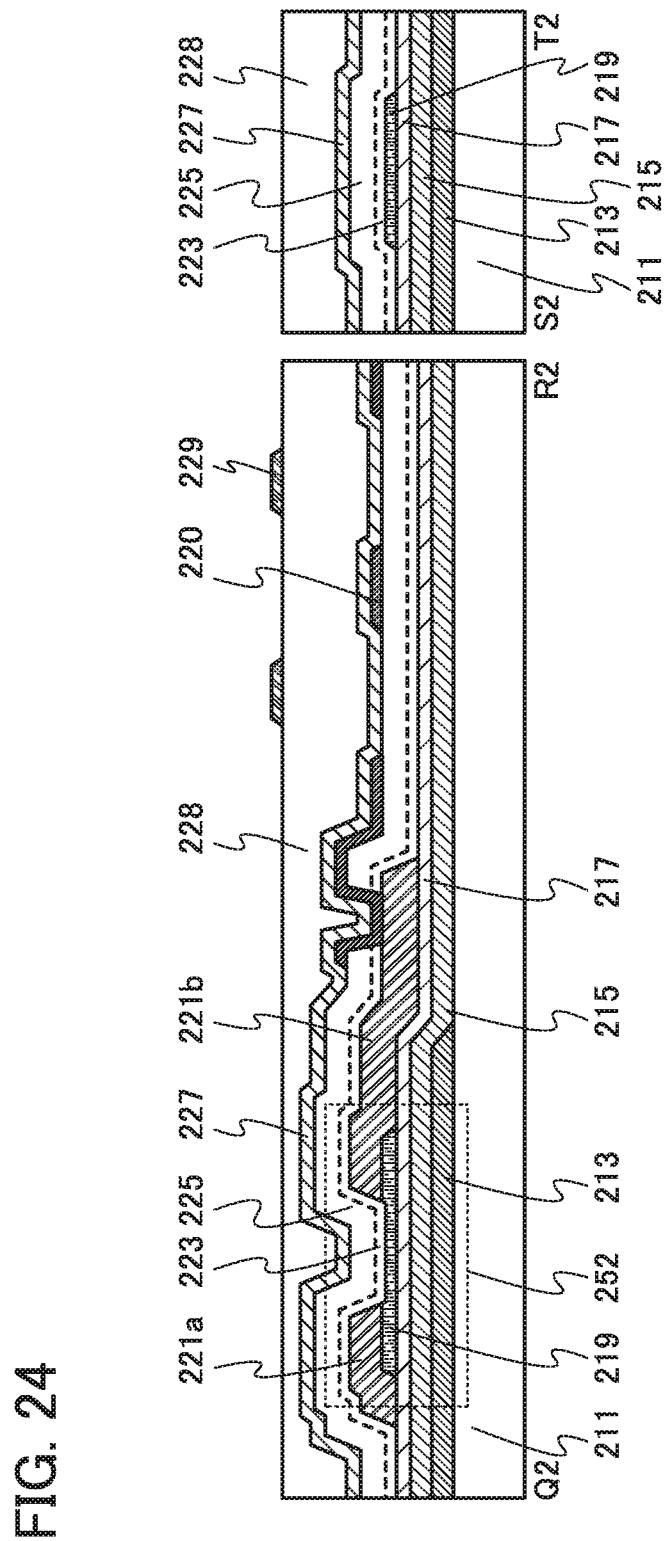
FIG. 24 illustrates a structure example of a display device according to an embodiment.

As illustrated in FIG. 22 and FIG. 23, a structure in which the conductive film 220 and the conductive film 229 do not overlap with each other may be employed. The positions of the conductive film 220 and the conductive film 229 can be set as appropriate depending on the size of the capacitor in accordance with the resolution and driving method of the display device. As in the display device illustrated in FIG. 24, the conductive film 229 may be provided over the insulating film 228 functioning as a planarization film.

Figure 25:
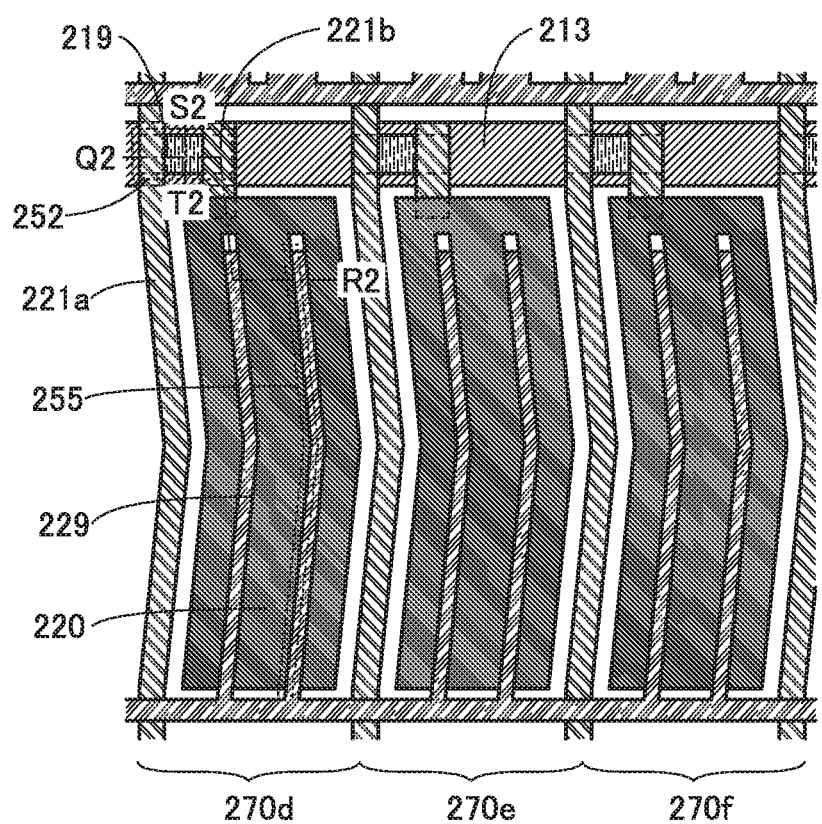
FIG. 25 illustrates a structure example of a display device according to an embodiment.
Figure 26:
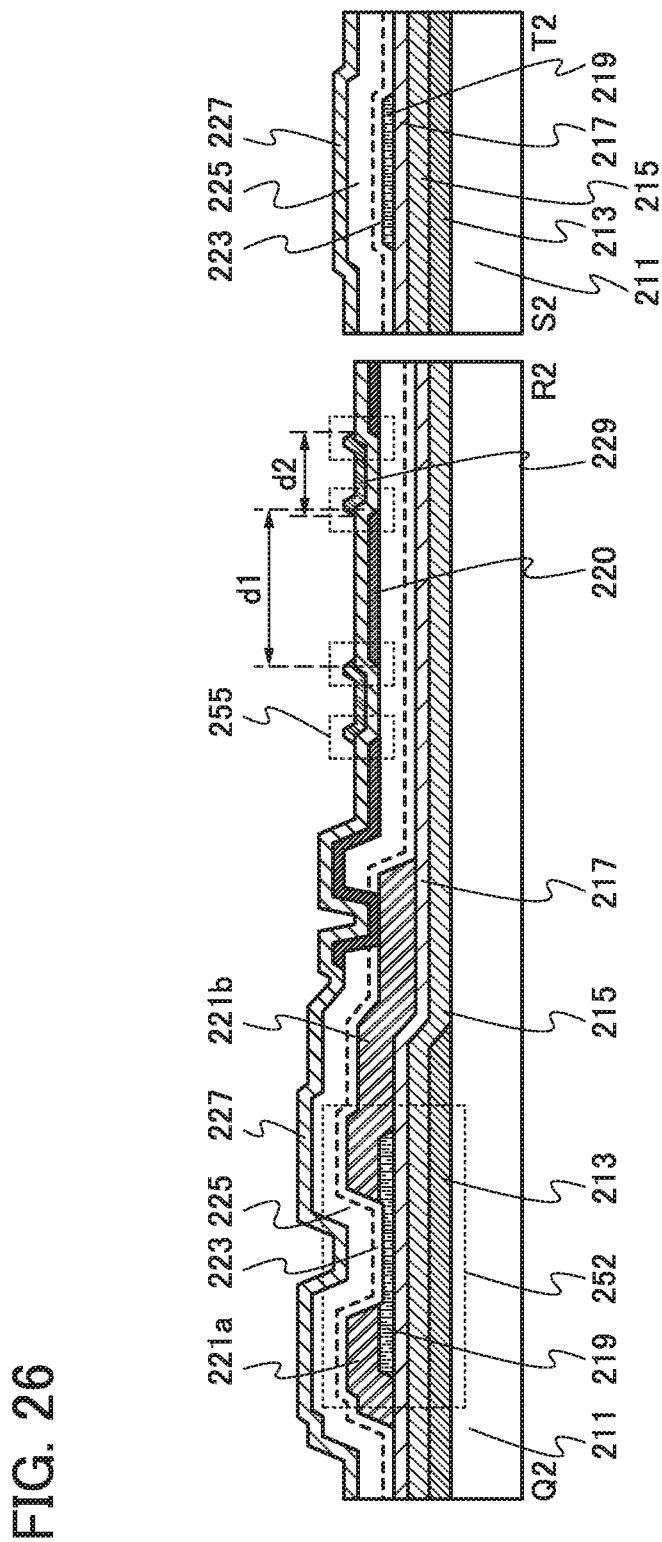
FIG. 26 illustrates a structure example of a display device according to an embodiment.

In the liquid crystal display device in FIG. 19 and FIG. 20, a width (d1) of a region of the conductive film 220 extending in the direction parallel or substantially parallel to the signal line (the conductive film 221a) is smaller than a width (d2) of a region of the conductive film 229 extending in the direction parallel or substantially parallel to the signal line, but the widths are not limited to this relation. As illustrated in FIG. 25 and FIG. 26, the width d1 may be larger than the width d2. Alternatively, the width d1 may be equal to the width d2. Further alternatively, in a pixel (e.g., the pixel 270d), the widths of a plurality of regions of the conductive film 220 and/or the conductive film 229 extending in the direction parallel or substantially parallel to the signal line may be different from one another.

Figure 27:
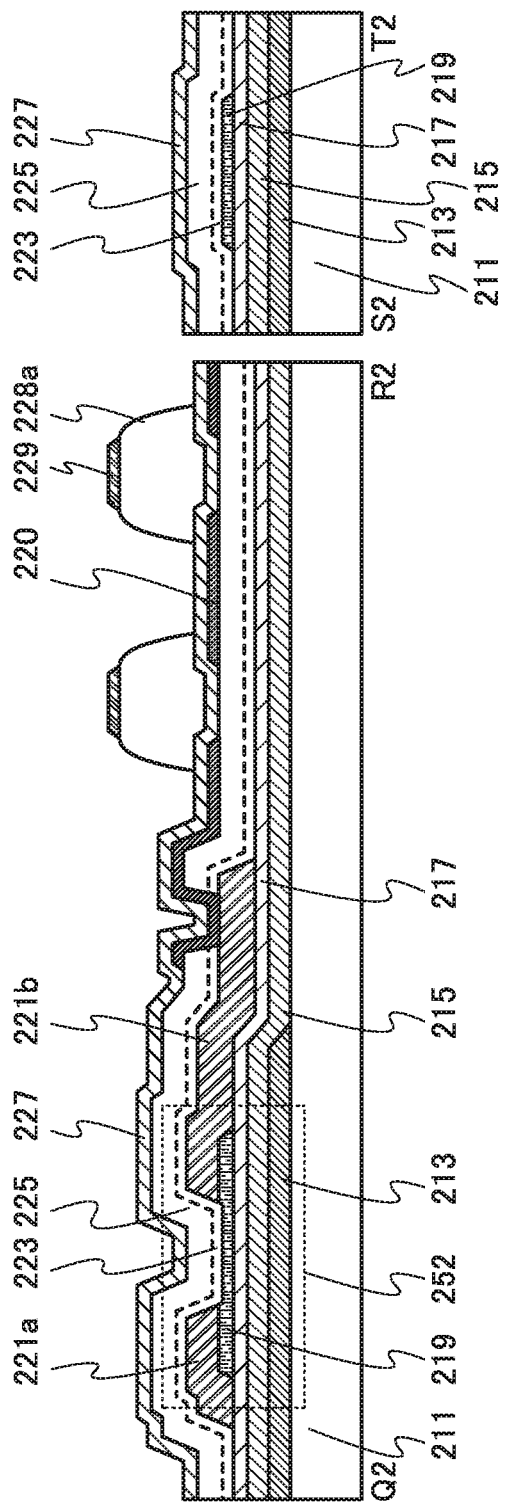
FIG. 27 illustrates a structure example of a display device according to an embodiment.
Figure 28:
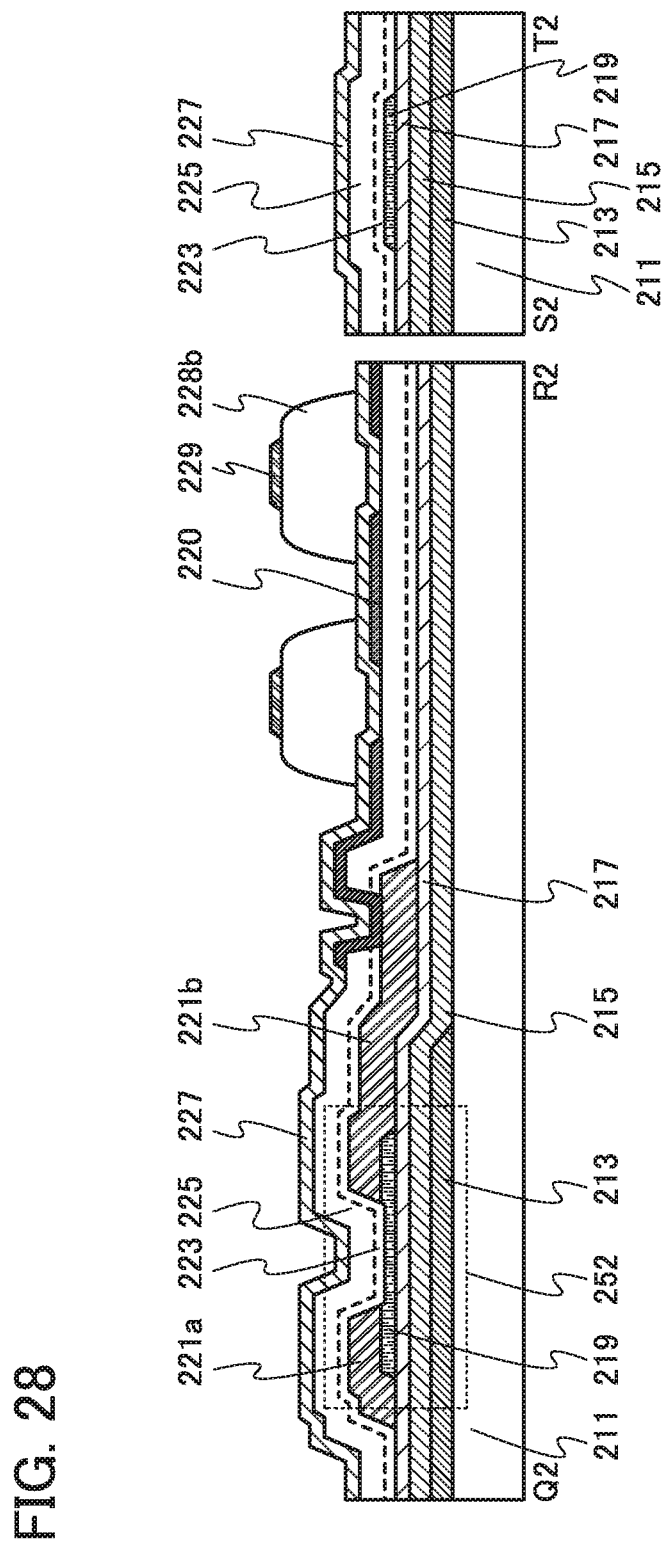
FIG. 28 illustrates a structure example of a display device according to an embodiment.

As illustrated in FIG. 27, a structure in which the insulating film 228 over the insulating film 227 is partially removed such that an insulating film 228a under the conductive film 229 is left may be employed. In this case, the insulating film 228 can be etched using the conductive film 229 as a mask. Unevenness of the conductive film 229 over the insulating film 228 functioning as a planarization film can be suppressed, and the insulating film 228a can have a gentle side surface from an end portion of the conductive film 229 to the insulating film 227. As illustrated in FIG. 28, a structure in which part of a surface of an insulating film 228b parallel to the substrate 211 is not covered with the conductive film 229 may be employed.

Figure 29:
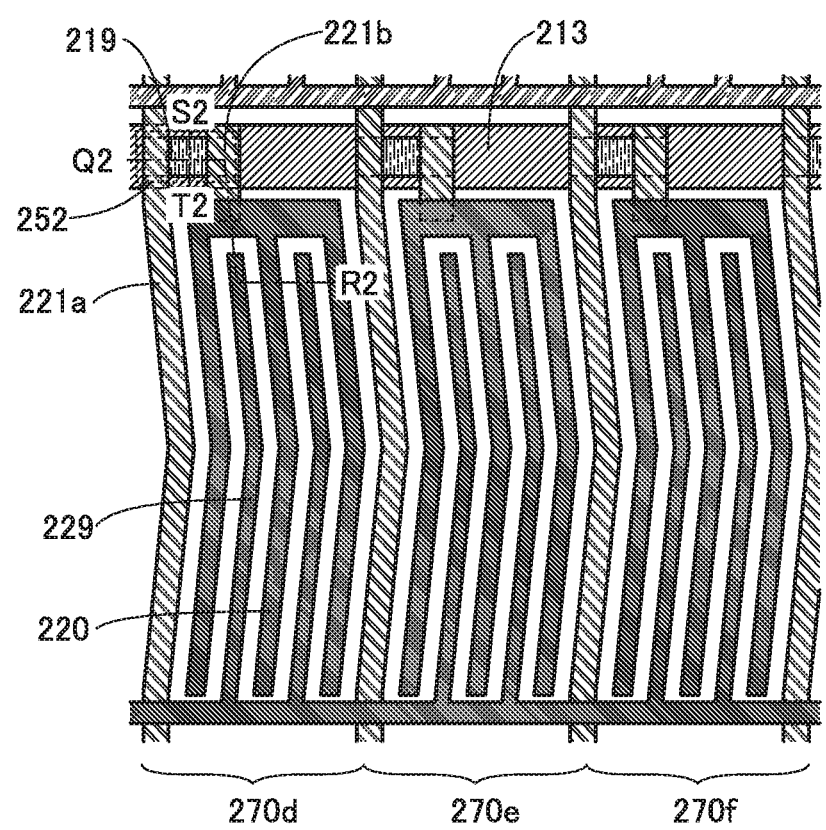
FIG. 29 illustrates a structure example of a display device according to an embodiment.
Figure 30:
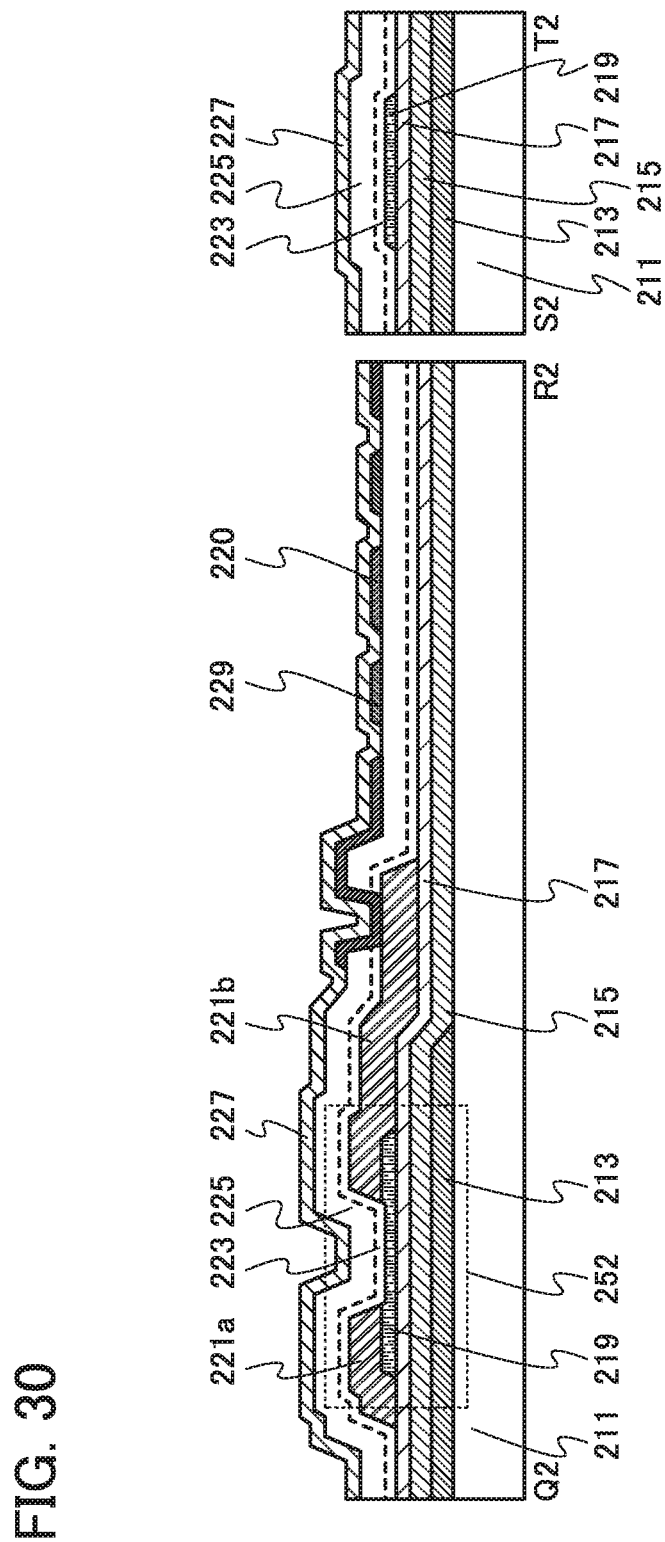
FIG. 30 illustrates a structure example of a display device according to an embodiment.

As illustrated in FIG. 29 and FIG. 30, the conductive film 229 and the conductive film 220 may be formed over the same layer, that is, over the insulating film 225. The conductive film 229 in FIG. 29 and FIG. 30 can be formed with the same material at the same time as the conductive film 220.

Figure 31:
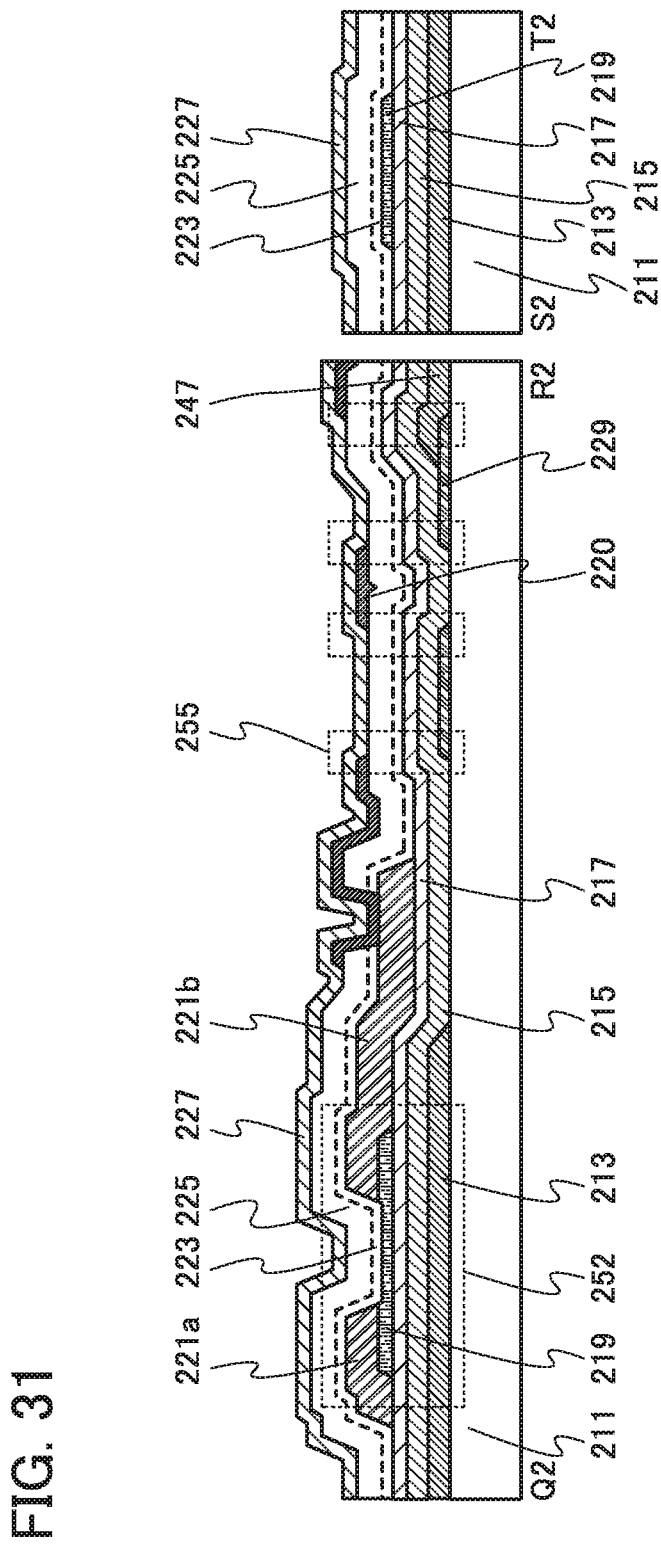
FIG. 31 illustrates a structure example of a display device according to an embodiment.

As illustrated in FIG. 31, the conductive film 229 may be positioned between the insulating film 215 and the substrate 211. In this case, as illustrated in FIG. 31, a conductive film 247 which is formed by processing the same film as the conductive film 213 functioning as the gate electrode of the transistor 252 is preferably used as a wiring.

The display device 200 can employ various modes and include various display elements. Examples of the display element include a liquid crystal element, an electroluminescent (EL) element (an EL element including organic and inorganic materials, an organic EL element, or an inorganic EL element) including an LED (e.g., a white LED, a red LED, a green LED, or a blue LED), a transistor (a transistor that emits light depending on current), an electron emitter, an electrophoretic element, a display element using micro electro mechanical systems (MEMS) such as a grating light valve (GLV), a digital micromirror device (DMD), a digital micro shutter (DMS) element, a MIRASOL (registered trademark) display, an interferometric modulator display (IMOD) element, or a piezoelectric ceramic display, and an electrowetting element. In addition, a display medium whose contrast, luminance, reflectance, transmittance, or the like is changed by electrical or magnetic effect may be included. Alternatively, quantum dots may be used as the display element. Examples of a display device including a liquid crystal element include a liquid crystal display (a transmissive liquid crystal display, a transflective liquid crystal display, a reflective liquid crystal display, a direct-view liquid crystal display, or a projection liquid crystal display). An example of a display device including an EL element is an EL display. Examples of a display device including an electron emitter include a field emission display (FED) and an SED-type flat panel display (SED: surface-conduction electron-emitter display). An example of a display device including quantum dots is a quantum dot display. An example of a display device including electronic ink or an electrophoretic element is electronic paper. In a transflective liquid crystal display or a reflective liquid crystal display, some or all of pixel electrodes function as reflective electrodes. For example, some or all of pixel electrodes contain aluminum, silver, or the like. In such a case, a memory circuit such as an SRAM can be provided under the reflective electrodes. Thus, power consumption can be further reduced.

As a display method of the display device 200, a progressive method, an interlace method, or the like can be employed. Furthermore, color elements controlled in pixels at the time of color display are not limited to three colors: R, G, and B (R, G, and B correspond to red, green, and blue, respectively). For example, four pixels of an R pixel, a G pixel, a B pixel, and a W (white) pixel may be used. Alternatively, a color element may be composed of two colors among R, G, and B as in PenTile layout. The two colors may differ between color elements. Alternatively, one or more colors of yellow, cyan, magenta, and the like may be added to RGB. Note that the size of a display region may differ between dots of color elements. Embodiments of the disclosed invention are not limited to a color display device; the disclosed invention can also be applied to a monochrome display device.

Color films (also referred to as color filters) may be used to obtain a full-color display device in which white light (W) for a backlight (e.g., an organic EL element, an inorganic EL element, an LED, or a fluorescent lamp) is used. For example, a red (R) color film, a green (G) color film, a blue (B) color film, and a yellow (Y) color film may be combined as appropriate. With the use of the color film, higher color reproducibility can be obtained than in the case without the color film. Here, by providing a region with the color film and a region without the color film, white light in the region without the color film may be directly utilized for display. By partly providing the region without the color film, a decrease in the luminance of a bright image due to the color film can be suppressed, and approximately 20% to 30% of power consumption can be reduced in some cases. In the case where full-color display is performed using a self-luminous element such as an organic EL element or an inorganic EL element, elements may emit light in their respective colors R, G, B, Y, and W. By using a self-luminous element, power consumption may be further reduced compared with the case of using the color film.

<Substrate>

There is no particular limitation on a material and the like of the substrate 211 as long as the material has heat resistance high enough to withstand at least heat treatment performed later. For example, a glass substrate, a ceramic substrate, a quartz substrate, or a sapphire substrate may be used as the substrate 211. Alternatively, a single crystal semiconductor substrate or a polycrystalline semiconductor substrate made of silicon, silicon carbide, or the like, a compound semiconductor substrate made of silicon germanium or the like, an SOI substrate, or the like may be used. Still alternatively, any of these substrates provided with a semiconductor element may be used as the substrate 211. In the case where a glass substrate is used as the substrate 211, a large substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured. Alternatively, a flexible substrate may be used as the substrate 211, and the transistor, the capacitor, and the like may be formed directly on the flexible substrate.

Other than the above, a transistor can be formed using various substrates as the substrate 211. The type of the substrate is not limited to a certain type. As the substrate, a plastic substrate, a metal substrate, a stainless steel substrate, a substrate including stainless steel foil, a tungsten substrate, a substrate including tungsten foil, a flexible substrate, an attachment film, paper containing a fibrous material, or a base film can be used, for example. As examples of the glass substrate, a barium borosilicate glass substrate, an alumino-borosilicate glass substrate, and a soda lime glass substrate can be given. For the flexible substrate, a flexible synthetic resin such as plastic typified by polyethylene terephthalate (PET), polyethylene naphthalate (PEN), and polyether sulfone (PES) or acrylic can be used, for example. An example of the attachment film is a film formed using polypropylene, polyester, polyvinyl fluoride, polyvinyl chloride, or the like. An example of the base film is a film formed using polyester, polyamide, polyimide, an inorganic vapor deposition film, paper, or the like. In particular, a transistor formed using a semiconductor substrate, a single crystal substrate, an SOI substrate, or the like can have little variation in characteristics, size, shape, or the like, high current supply capability, and a small size. Such a transistor can achieve lower power consumption or higher integration of a circuit.

A transistor may be formed using one substrate, and then, the transistor may be transferred to another substrate. Examples of a substrate to which a transistor is transferred include, in addition to the above substrates over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. When such a substrate is used, a transistor with excellent characteristics or a transistor with low power consumption can be formed, a device with high durability can be manufactured, high heat resistance can be provided, or a reduction in weight or thickness can be achieved.

<Semiconductor Film>

Examples of a material that can be used for the semiconductor film 219 include silicon, germanium, an organic semiconductor, and an oxide semiconductor.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of transistor characteristics can be suppressed.

In particular, the semiconductor film 219 preferably contains silicon. As silicon, for example, amorphous silicon or silicon having crystallinity is preferably used. As silicon having crystallinity, for example, microcrystalline silicon, polycrystalline silicon, or single crystal silicon is preferably used. In particular, polycrystalline silicon can be formed at a lower temperature than single crystal silicon and has higher field-effect mobility and higher reliability than amorphous silicon. When such a polycrystalline semiconductor is used for a pixel, the aperture ratio of the pixel can be improved. Even in an extremely high-resolution display device, a gate driver circuit and a source driver circuit can be formed over a substrate over which pixels are formed, and the number of components of an electronic device can be reduced.

Alternatively, the semiconductor film 219 preferably includes a film of an In-M-Zn oxide which contains at least indium, zinc, and M (metal such as aluminum, titanium, gallium, yttrium, zirconium, lanthanum, cerium, tin, or hafnium). In order to reduce variation in the electrical characteristics of the transistor including the oxide semiconductor, the oxide semiconductor preferably contains a stabilizer.

Examples of the stabilizer, including metals that can be used as M, are gallium, tin, hafnium, aluminum, and zirconium. As another stabilizer, lanthanoid such as lanthanum, cerium, praseodymium, neodymium, samarium, europium, gadolinium, terbium, dysprosium, holmium, erbium, thulium, ytterbium, or lutetium can be given.

As an oxide semiconductor included in the semiconductor film 219, for example, the following oxide can be used: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that here, an "In—Ga—Zn-based oxide" means an oxide containing In, Ga, and Zn as its main components, and there is no limitation on the ratio of In to Ga and Zn. The "In—Ga—Zn-based oxide" may contain another metal element in addition to In, Ga, and Zn.

The semiconductor film 219 and the conductive film 220 may contain the same metal element selected from metal elements contained in the above oxides. The use of the same metal element for the semiconductor film 219 and the conductive film 220 can reduce the manufacturing cost. For example, when metal oxide targets with the same metal composition are used, the manufacturing cost can be reduced, and the same etching gas or the same etchant can be used in processing the semiconductor film 219 and the conductive film 220. Even when the semiconductor film 219 and the conductive film 220 contain the same metal element, they have different compositions in some cases. For example, a metal element in a film may be released in the manufacturing process of the transistor and the capacitor, which results in different metal compositions.

In the case where the semiconductor film 219 includes an In-M-Zn oxide, the proportions of In and M, the sum of which is assumed to be 100 atomic %, are preferably as follows: the proportion of In is higher than 25 atomic % and the proportion of M is lower than 75 atomic %, further preferably, the proportion of In is higher than 34 atomic % and the proportion of M is lower than 66 atomic %.

The energy gap of the semiconductor film 219 is 2 eV or more, preferably 2.5 eV or more, further preferably 3 eV or more. With the use of an oxide semiconductor having such a wide energy gap, the off-state current of the transistor 252 can be reduced.

The thickness of the semiconductor film 219 is greater than or equal to 3 nm and less than or equal to 200 nm, preferably greater than or equal to 3 nm and less than or equal to 100 nm, further preferably greater than or equal to 3 nm and less than or equal to 50 nm.

In the case where the semiconductor film 219 includes an In-M-Zn oxide (M represents Al, Ga, Y, Zr, La, Ce, or Nd), the atomic ratio of metal elements in a sputtering target used for depositing the In-M-Zn oxide preferably satisfies In≥M and Zn≥M. As the atomic ratio of metal elements in such a sputtering target, InM:Zn=1:1:1, 1:1:1.2, or 3:1:2 is preferable. Note that the proportion of each metal element in the atomic ratio of the deposited semiconductor film 219 varies within a range of error of ±40% of that in the above atomic ratio of the sputtering target.

An oxide semiconductor film with low carrier density is used as the semiconductor film 219. For example, an oxide semiconductor film whose carrier density is $1\times10^{17}/cm^3$ or lower, preferably $1\times10^{15}/cm^3$ or lower, further preferably $1\times10^{13}/cm^3$ or lower, still further preferably $1\times10^{11}/cm^3$ or lower is used as the semiconductor film 219.

Without being limited to the above examples, a material with an appropriate composition may be used in accordance with required semiconductor characteristics and electrical characteristics (e.g., field-effect mobility and threshold voltage) of a transistor. To obtain required semiconductor characteristics of a transistor, it is preferable that the carrier density, the impurity concentration, the defect density, the atomic ratio of a metal element to oxygen, the interatomic distance, the density, and the like of the semiconductor film 219 be set as appropriate.

If silicon or carbon, which are elements belonging to Group 14, is contained in the semiconductor film 219, the number of oxygen vacancies is increased in the semiconductor film 219, and the semiconductor film 219 becomes an n-type film. To prevent this, the concentration of silicon or carbon (the concentration is measured by secondary ion mass spectrometry (SIMS)) in the semiconductor film 219 is set to $2\times10^{18}$ atoms/cm$^3$ or lower, preferably $2\times10^{17}$ atoms/cm$^3$ or lower.

Furthermore, the concentration of alkali metal or alkaline earth metal in the semiconductor film 219, which is measured by SIMS, is set to $1\times10^{18}$ atoms/cm$^3$ or lower, preferably $2\times10^{16}$ atoms/cm$^3$ or lower. Alkali metal and alkaline earth metal might generate carriers when bonded to an oxide semiconductor, in which case the off-state current of the transistor might increase. Therefore, it is preferable to reduce the concentration of alkali metal or alkaline earth metal in the semiconductor film 219.

If nitrogen is contained in the semiconductor film 219, electrons serving as carriers are generated and the carrier density increases, so that the semiconductor film 219 easily becomes an n-type film. Thus, a transistor formed using an oxide semiconductor containing nitrogen is likely to be normally on. For this reason, nitrogen in the oxide semiconductor film is preferably reduced as much as possible; the nitrogen concentration measured by SIMS is preferably, for example, $5\times10^{18}$ atoms/cm$^3$ or lower.

The semiconductor film 219 may have a non-single-crystal structure, for example. Examples of the non-single-crystal structure include a c-axis aligned crystalline oxide semiconductor (CAAC-OS) which is described later, a polycrystalline structure, a microcrystalline structure which is described later, and an amorphous structure. Among the non-single-crystal structures, the amorphous structure has the highest density of defect states, whereas CAAC-OS has the lowest density of defect states.

The semiconductor film 219 may have an amorphous structure, for example. An oxide semiconductor film with an amorphous structure has disordered atomic arrangement and no crystalline component, for example. Alternatively, an amorphous oxide film has, for example, an absolutely amorphous structure and no crystal part.

Note that the semiconductor film 219 may be a mixed film including two or more of the following regions: a region having an amorphous structure, a region having a microcrystalline structure, a region having a polycrystalline structure, a CAAC-OS region, and a region having a single crystal structure. The mixed film includes, for example, two or more of the following regions in some cases: a region having an amorphous structure, a region having a microcrystalline structure, a region having a polycrystalline structure, a CAAC-OS region, and a region having a single crystal structure. Furthermore, for example, the mixed film has a stacked-layer structure of two or more of the following regions in some cases: a region having an amorphous structure, a region having a microcrystalline structure, a region having a polycrystalline structure, a CAAC-OS region, and a region having a single crystal structure.

The bottom-gate transistor described in this embodiment is preferable because the number of manufacturing steps can be reduced. When an oxide semiconductor or amorphous silicon, which can be formed at a lower temperature than polycrystalline silicon, is used for the semiconductor film 219, materials with low heat resistance can be used for an electrode and a substrate below the semiconductor film 219, so that the range of choices of materials can be widened. For example, the above-mentioned large glass substrate can be favorably used.

<Insulating Film>

As each of the insulating films 215 and 217 functioning as a gate insulating film of the transistor 252, an insulating film including at least one of the following films formed by a plasma-enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Instead of the stacked insulating films 215 and 217, a single-layer insulating film selected from the above films may be used.

In the case where an oxide semiconductor is used for the semiconductor film 219, the insulating film 215 functions as a blocking film that inhibits permeation of oxygen. For example, in the case where excess oxygen is supplied to the insulating films 217, the insulating film 223, the insulating film 225, and/or the semiconductor film 219, oxygen can be prevented from permeating the insulating film 215.

In the case where an oxide semiconductor is used for the semiconductor film 219, the insulating film 217 that is in contact with the semiconductor film 219 functioning as a channel region of the transistor 252 is preferably an oxide insulating film and further preferably includes a region containing oxygen in excess of that in the stoichiometric composition (oxygen-excess region). In other words, the insulating film 217 is an insulating film capable of releasing oxygen. To provide the oxygen-excess region in the insulating film 217, the insulating film 217 may be formed in an oxygen atmosphere, for example. Alternatively, the oxygen excess region may be formed by introduction of oxygen into the deposited insulating film 217. As a method for introducing oxygen, an ion implantation method, an ion doping method, a plasma immersion ion implantation method, plasma treatment, or the like can be employed.

In the case where hafnium oxide is used for the insulating films 215 and 217, the following effect is attained. Hafnium oxide has a higher dielectric constant than silicon oxide and silicon oxynitride. Therefore, the thickness of the insulating films can be made large compared with the case where silicon oxide is used; as a result, leakage current due to tunnel current can be reduced. That is, it is possible to provide a transistor with low off-state current. Moreover, hafnium oxide with a crystalline structure has a higher dielectric constant than hafnium oxide with an amorphous structure. Therefore, it is preferable to use hafnium oxide with a crystalline structure in order to provide a transistor with low off-state current. Examples of the crystalline structure include a monoclinic crystal structure and a cubic crystal structure. Note that one embodiment of the present invention is not limited to these examples.

In this embodiment, a silicon nitride film is formed as the insulating film 215, and a silicon oxide film is formed as the insulating film 217. A silicon nitride film has a higher dielectric constant than a silicon oxide film and needs a larger thickness for capacitance equivalent to that of the silicon oxide film. Thus, when the gate insulating film of the transistor 252 includes a silicon nitride film, the physical thickness of the gate insulating film can be increased. This makes it possible to suppress a decrease in the withstand voltage of the transistor 252 and rather to increase the withstand voltage, thereby inhibiting electrostatic discharge damage of the transistor 252.

The insulating film 228 can be formed using a heat-resistant organic material such as a polyimide resin, an acrylic resin, a polyimide amide resin, a benzocyclobutene resin, a polyamide resin, or an epoxy resin, for example. For example, the insulating film 228 is formed by forming an organic resin film over the insulating film 227, patterning the organic resin film into a desired region, and etching the patterned organic resin film to remove unnecessary regions.

<Gate Electrode, Source Electrode, and Drain Electrode>

The conductive film 213, the conductive film 221a, and the conductive film 221b can each have a single-layer structure or a stacked-layer structure formed using a metal such as aluminum, titanium, chromium, nickel, copper, yttrium, zirconium, molybdenum, silver, tantalum, or tungsten, or an alloy containing the metal as its main component. For example, a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over an alloy film containing copper, magnesium, and aluminum; a three-layer structure in which titanium film or a titanium nitride film, an aluminum film or a copper film, and a titanium film or a titanium nitride film are stacked in this order; or a three-layer structure in which a molybdenum film or a molybdenum nitride film, an aluminum film or a copper film, and a molybdenum film or a molybdenum nitride film are stacked in this order can be employed. In the case where the conductive film 221a and the conductive film 221b each have a three-layer structure, it is preferable that a film of titanium, titanium nitride, molybdenum, tungsten, an alloy containing molybdenum and tungsten, an alloy containing molybdenum and zirconium, or molybdenum nitride be formed as each of the first and third layers and that a film of a low-resistance material such as copper, aluminum, gold, silver, or an alloy containing copper and manganese be formed as the second layer. Note that it is also possible to use a light-transmitting conductive material such as indium thin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. The materials that can be used for the conductive film 213, the conductive film 221a, and the conductive film 221b can be deposited by a sputtering method, for example.

<Conductive Film>

The conductive film 229 functions as a common electrode. A material which transmits visible light may be used for the conductive film 229, for example. Specifically, a material containing one of indium (In), zinc (Zn), and tin (Sn) is preferably used. For the conductive film 229, for example, a light-transmitting conductive material such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide to which silicon oxide is added can be used. The conductive film 229 can be formed by a sputtering method, for example.

The conductive film 220 functions as a pixel electrode. For the conductive film 220, a material similar to that of the conductive film 229 can be used.

Alternatively, for the conductive film 220, an oxide semiconductor similar to that of the semiconductor film 219 is preferably used. In this case, it is preferable that the conductive film 220 be formed to have a lower electrical resistance than a region of the semiconductor film 219 in which a channel is formed.

<Method for Controlling Resistivity of Oxide Semiconductor>

Oxide semiconductor films which can be used as the semiconductor film 219 and the conductive film 220 include a semiconductor material whose resistivity can be controlled by the number of oxygen vacancies in the film and/or the concentration of impurities such as hydrogen or water in the film. Thus, to control the resistivity of each of the oxide semiconductor films, treatment to be performed on the semiconductor film 219 and the conductive film 220 is selected from treatment for increasing oxygen vacancies and/or impurity concentration and treatment for reducing oxygen vacancies and/or impurity concentration.

Specifically, plasma treatment is performed on the oxide semiconductor film that is used as the conductive film 220 functioning as an electrode of the capacitor 255 to increase oxygen vacancies and/or impurities such as hydrogen or water in the oxide semiconductor film; thus, the oxide semiconductor film can have a high carrier density and a low resistivity. Furthermore, an insulating film containing hydrogen is formed, for example, as the insulating film 227 in contact with the oxide semiconductor film so that hydrogen may be diffused from the insulating film containing hydrogen into the oxide semiconductor film; thus, the oxide semiconductor film can have a high carrier density and a low resistivity.

The semiconductor film 219 functioning as a channel region of the transistor 252 is not in contact with the insulating films 215 and 227 containing hydrogen because the insulating films 217, 223, and 225 are provided. With the use of an insulating film containing oxygen, that is, an insulating film capable of releasing oxygen for at least one of the insulating films 217, 223, and 225, oxygen can be supplied to the semiconductor film 219. The semiconductor film 219 to which oxygen is supplied has a high resistivity film because oxygen vacancies in the film or at the interface are filled. As the insulating film capable of releasing oxygen, a silicon oxide film or a silicon oxynitride film can be used, for example.

To obtain an oxide semiconductor film with a low resistivity, hydrogen, boron, phosphorus, or nitrogen may be introduced into the oxide semiconductor film by an ion implantation method, an ion doping method, a plasma immersion ion implantation method, or the like.

In order to reduce the resistivity of the oxide semiconductor film, plasma treatment may be performed on the oxide semiconductor film. A typical example of the plasma treatment is plasma treatment using a gas containing at least one of a rare gas (He, Ne, Ar, Kr, or Xe), hydrogen, and nitrogen. Specifically, plasma treatment in an argon atmosphere, plasma treatment in a mixed gas atmosphere of argon and hydrogen, plasma treatment in an ammonia atmosphere, plasma treatment in a mixed gas atmosphere of argon and ammonia, plasma treatment in a nitrogen atmosphere, or the like can be employed.

In the oxide semiconductor film subjected to the plasma treatment, an oxygen vacancy is formed in a lattice from which oxygen is released (or in a portion from which oxygen is released). This oxygen vacancy can cause carrier generation. Furthermore, hydrogen supplied from an insulating film in the vicinity of the oxide semiconductor film, specifically, an insulating film in contact with the lower surface or the upper surface of the oxide semiconductor film might be bonded to the oxygen vacancy, so that an electron serving as a carrier might be generated.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}/cm^3$, preferably lower than $1 \times 10^{11}/cm^3$, further preferably lower than $1 \times 10^{10}/cm^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, the highly purified intrinsic or substantially highly purified intrinsic oxide semiconductor film has extremely low off-state current; even when an element has a channel width of $1 \times 10^6$ μm and a channel length L of 10 μm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V. Accordingly, the transistor 252 in which a channel region is formed in the semiconductor film 219 that is a highly purified intrinsic or substantially highly purified intrinsic oxide semiconductor film can have a small change in electrical characteristics and high reliability.

For example, an insulating film containing hydrogen, that is, an insulating film capable of releasing hydrogen, typically, a silicon nitride film, is used as the insulating film 227, whereby hydrogen can be supplied to the conductive film 220. The insulating film capable of releasing hydrogen preferably has a hydrogen concentration of $1\times10^{22}$ atoms/cm$^3$ or higher. Such an insulating film is formed in contact with the conductive film 220, whereby hydrogen can be effectively contained in the conductive film 220. Thus, the resistivity of the oxide semiconductor film can be controlled by changing the structure of insulating films in contact with the semiconductor film 219 and the conductive film 220. Note that a material of the insulating film 215 may be similar to the material of the insulating film 227. When silicon nitride is used for the insulating film 215, oxygen released from the insulating film 217 can be prevented from being supplied to the conductive film 213, so that oxidation of the conductive film 213 can be inhibited.

Hydrogen contained in the oxide semiconductor film reacts with oxygen bonded to a metal atom to form water and also causes an oxygen vacancy in a lattice from which oxygen is released (or a portion from which oxygen is released). Entry of hydrogen into the oxygen vacancy may generate an electron serving as a carrier. In some cases, bonding of part of hydrogen to oxygen bonded to a metal element generates an electron serving as a carrier. Accordingly, the conductive film 220 provided in contact with the insulating film containing hydrogen is an oxide semiconductor film that has a higher carrier density than the semiconductor film 219.

Hydrogen in the semiconductor film 219 of the transistor 252 in which a channel region is formed is preferably reduced as much as possible. Specifically, the hydrogen concentration in the semiconductor film 219, which is measured by SIMS, is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, lower than $5\times10^{18}$ atoms/cm$^3$, further preferably lower than or equal to $1\times10^{18}$ atoms/cm$^3$, still further preferably lower than or equal to $5\times10^{17}$ atoms/cm$^3$, still further preferably lower than or equal to $1\times10^{16}$ atoms/cm$^3$.

The conductive film 220 functioning as an electrode of the capacitor 255 is an oxide semiconductor film that has a higher hydrogen concentration and/or a larger number of oxygen vacancies (i.e., a lower resistivity) than the semiconductor film 219. The concentration of hydrogen contained in the conductive film 220 is higher than or equal to $8\times10^{19}$ atoms/cm$^3$, preferably higher than or equal to $1\times10^{20}$ atoms/cm$^3$, further preferably higher than or equal to $5\times10^{20}$ atoms/cm$^3$. The concentration of hydrogen contained in the conductive film 220 is twice or more, preferably 10 times or more that in the semiconductor film 219. In addition, the resistivity of the conductive film 220 is preferably greater than or equal to $1\times10^{-8}$ times and less than $1\times10^{-1}$ times the resistivity of the semiconductor film 219. The resistivity of the conductive film 220 is typically higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm.

<Protective Insulating Film>

As each of the insulating films 223, 225 and 227 functioning as a protective insulating film of the transistor 252, an insulating film including at least one of the following films formed by a PECVD method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

In the case where an oxide semiconductor is used for the semiconductor film 219, the insulating film 223 that is in contact with the semiconductor film 219 functioning as a channel region of the transistor 252 is preferably an oxide insulating film capable of releasing oxygen. In other words, the insulating film capable of releasing oxygen is an insulating film which includes a region containing oxygen in excess of that in the stoichiometric composition (oxygen-excess region). To provide the oxygen-excess region in the insulating film 223, the insulating film 223 may be formed in an oxygen atmosphere, for example. Alternatively, the oxygen excess region may be formed by introduction of oxygen into the deposited insulating film 223. As a method for introducing oxygen, an ion implantation method, an ion doping method, a plasma immersion ion implantation method, plasma treatment, or the like can be employed.

The use of the insulating film capable of releasing oxygen as the insulating film 223 enables oxygen to move to the semiconductor film 219 functioning as a channel region of the transistor 252, so that the number of oxygen vacancies in the semiconductor film 219 can be reduced. For example, the number of oxygen vacancies in the semiconductor film 219 can be reduced by using an insulating film having the following feature: the number of oxygen molecules released from the insulating film at a film surface temperature higher than or equal to 100° C. and lower or equal to 700° C. or higher than or equal to 100° C. and lower than or equal to 500° C. is greater than or equal to $1.0\times10^{18}$ molecules/cm$^3$ when measured by thermal desorption spectroscopy (hereinafter referred to as TDS).

In addition, the number of defects in the insulating film 223 is preferably small; typically, in ESR measurement, the spin density of a signal that appears at g=2.001 due to a dangling bond of silicon is preferably lower than or equal to $3\times10^{17}$ spins/cm$^3$. This is because a high density of defects in the insulating film 223 causes oxygen to be bonded to the defects and decreases the amount of oxygen that permeates the insulating film 223. Furthermore, the number of defects at the interface between the insulating film 223 and the semiconductor film 219 is preferably small; typically, in ESR measurement, the spin density of a signal that appears at g=1.89 or more and 1.96 or less due to a defect in the semiconductor film 219 is preferably lower than or equal to $1\times10^{17}$ spins/cm$^3$, further preferably lower than or equal to the lower limit of detection.

Note that all oxygen having entered the insulating film 223 from the outside moves to the outside of the insulating film 223 in some cases. Alternatively, part of oxygen having entered the insulating film 223 from the outside remains in the insulating film 223 in some cases. In some cases, movement of oxygen occurs in the insulating film 223 in such a manner that oxygen enters the insulating film 223 from the outside and oxygen contained in the insulating film 223 moves to the outside of the insulating film 223. When an oxide insulating film which is permeable to oxygen is formed as the insulating film 223, oxygen released from the insulating film 225 over the insulating film 223 can be moved to the semiconductor film 219 through the insulating film 223.

The insulating film 223 can be formed using an oxide insulating film having a low density of states due to nitrogen oxide. Note that the density of states due to nitrogen oxide can be formed between the energy of the valence band maximum (Ec_os) and the energy of the conduction band minimum (Ec_os) of the oxide semiconductor film. A silicon oxynitride film that releases only a small amount of nitrogen oxide, an aluminum oxynitride film that releases only a small amount of nitrogen oxide, or the like can be used as the above oxide insulating film.

Note that a silicon oxynitride film that releases only a small amount of nitrogen oxide is a film which releases more ammonia than nitrogen oxide in TDS; the number of ammonia molecules released from the silicon oxynitride film is typically greater than or equal to $1 \times 10^{18}$ molecules/cm$^3$ and less than or equal to $5 \times 10^{19}$ molecules/cm$^3$. Note that the amount of released ammonia is the amount of ammonia released by heat treatment at a film surface temperature higher than or equal to 50° C. and lower than or equal to 650° C., preferably higher than or equal to 50° C. and lower than or equal to 550° C.

Nitrogen oxide (NO$_x$; x is more than 0 and 2 or less, preferably 1 or more and 2 or less), typically NO$_2$ or NO, forms states in the insulating film 223, for example. The state is positioned in the energy gap of the semiconductor film 219. Therefore, when nitrogen oxide is diffused into the interface between the insulating film 223 and the semiconductor film 219, an electron is trapped by the state on the insulating film 223 side in some cases. As a result, the trapped electron remains in the vicinity of the interface between the insulating film 223 and the semiconductor film 219; thus, the threshold voltage of the transistor shifts in the positive direction.

Nitrogen oxide reacts with ammonia and oxygen in heat treatment. Since nitrogen oxide contained in the insulating film 223 reacts with ammonia contained in the insulating film 225 in heat treatment, the amount of nitrogen oxide contained in the insulating film 223 is reduced. Therefore, an electron is hardly trapped at the interface between the insulating film 223 and the semiconductor film 219.

By using the above oxide insulating film as the insulating film 223, a shift of the threshold voltage of the transistor can be reduced, which leads to a reduced change in the electrical characteristics of the transistor.

In an ESR spectrum at 100 K or lower of the insulating film 223 subjected to heat treatment in a manufacturing process of the transistor, typically heat treatment at a temperature lower than 400° C. or lower than 375° C. (preferably higher than or equal to 340° C. and lower than or equal to 360° C.), a first signal that appears at a g-factor greater than or equal to 2.037 and less than or equal to 2.039, a second signal that appears at a g-factor greater than or equal to 2.001 and less than or equal to 2.003, and a third signal that appears at a g-factor greater than or equal to 1.964 and less than or equal to 1.966 are observed. The split width of the first and second signals and the split width of the second and third signals which are obtained by ESR measurement using an X-band are each approximately 5 mT. The sum of the spin densities of the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 is lower than $1 \times 10^{18}$ spins/cm$^3$, typically higher than or equal to $1 \times 10^{17}$ spins/cm$^3$ and lower than $1 \times 10^{18}$ spins/cm$^3$.

In the ESR spectrum at 100 K or lower, the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 correspond to signals attributed to nitrogen oxide (NO$_x$; x is more than 0 and 2 or less, preferably 1 or more and 2 or less). Typical examples of nitrogen oxide include nitrogen monoxide and nitrogen dioxide. Accordingly, the smaller the sum of the spin densities of the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 is, the lower the content of nitrogen oxide in the oxide insulating film is.

The nitrogen concentration in the above oxide insulating film measured by SIMS is lower than or equal to $6 \times 10^{20}$ atoms/cm$^3$.

The above oxide insulating film is formed by a PECVD method at a substrate temperature higher than or equal to 220° C. and lower than or equal to 350° C. with the use of silane and dinitrogen monoxide, whereby a dense and hard film can be formed.

The insulating film 225 in contact with the insulating film 223 is formed using an oxide insulating film whose oxygen content is higher than that in the stoichiometric composition. Part of oxygen is released by heating from the oxide insulating film whose oxygen content is higher than that in the stoichiometric composition. The oxide insulating film whose oxygen content is higher than that in the stoichiometric composition is an oxide insulating film in which the amount of released oxygen converted into oxygen atoms is greater than or equal to $1.0 \times 10^{19}$ atoms/cm$^3$, preferably greater than or equal to $3.0 \times 10^{20}$ atoms/cm$^3$ in TDS. Note that the film surface temperature in TDS is preferably higher than or equal to 100° C. and lower than or equal to 700° C., or higher than or equal to 100° C. and lower than or equal to 500° C.

In addition, the number of defects in the insulating film 225 is preferably small; typically, in ESR measurement, the spin density of a signal that appears at g=2.001 due to a dangling bond of silicon is preferably lower than $1.5 \times 10^{18}$ spins/cm$^3$, further preferably lower than or equal to $1 \times 10^{18}$ spins/cm$^3$. Note that the insulating film 225 is provided more apart from the semiconductor film 219 than the insulating film 223; thus, the insulating film 225 may have a higher density of defects than the insulating film 223.

The thickness of the insulating film 223 can be greater than or equal to 5 nm and less than or equal to 150 nm, preferably greater than or equal to 5 nm and less than or equal to 50 nm, further preferably greater than or equal to 10 nm and less than or equal to 30 nm. The thickness of the insulating film 225 can be greater than or equal to 30 nm and less than or equal to 500 nm, preferably greater than or equal to 150 nm and less than or equal to 400 nm.

Furthermore, the insulating films 223 and 225 can be formed using the same kinds of materials; thus, an interface between the insulating films 223 and 225 cannot be clearly observed in some cases. Therefore, in this embodiment, the interface between the insulating films 223 and 225 is shown by a dashed line. Although the two-layer structure of the insulating films 223 and 225 is described in this embodiment, one embodiment of the present invention is not limited thereto. For example, a single-layer structure of the insulating film 223, a single-layer structure of the insulating film 225, or a stacked-layer structure including three or more layers may be used.

The insulating film 227 functioning as a dielectric film of the capacitor 255 is preferably a nitride insulating film. In particular, a silicon nitride film has a higher dielectric constant than a silicon oxide film and needs a larger thickness for capacitance equivalent to that of the silicon oxide film. Thus, when a silicon nitride film is provided as the insulating film 227 functioning as a dielectric film of the capacitor 255, the physical thickness of the insulating film can be increased. This makes it possible to suppress a decrease in the withstand voltage of the capacitor 255 and rather to increase the withstand voltage, thereby inhibiting electrostatic discharge damage of the capacitor 255. Note that the insulating film 227 also has a function of decreasing the resistivity of the conductive film 220 that functions as an electrode of the capacitor 255.

The insulating film 227 also has a function of blocking oxygen, hydrogen, water, alkali metal, alkaline earth metal, and the like. The insulating film 227 can prevent outward diffusion of oxygen from the semiconductor film 219, outward diffusion of oxygen contained in the insulating films 223 and 225, and entry of hydrogen, water, and the like into the semiconductor film 219 from the outside. Instead of the nitride insulating film having a blocking effect against oxygen, hydrogen, water, alkali metal, alkaline earth metal, and the like, an oxide insulating film having a blocking effect against oxygen, hydrogen, water, and the like may be provided. As examples of the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

At least part of this embodiment can be implemented in appropriate combination with any of the other embodiments described in this specification.

Embodiment 3

In this embodiment, other structural examples of a display device that can be used for the display system described in the above embodiment will be described.

Figure 32A:
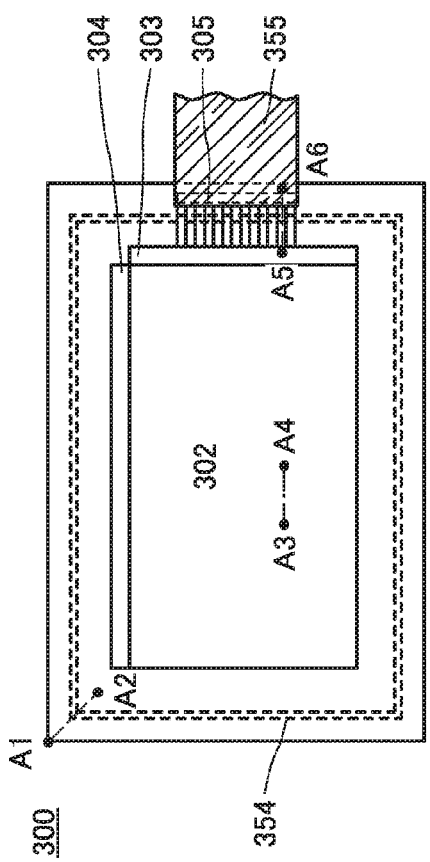
FIGS. 32A and 32B illustrate a structure example of a display device according to an embodiment.
Figure 32B:
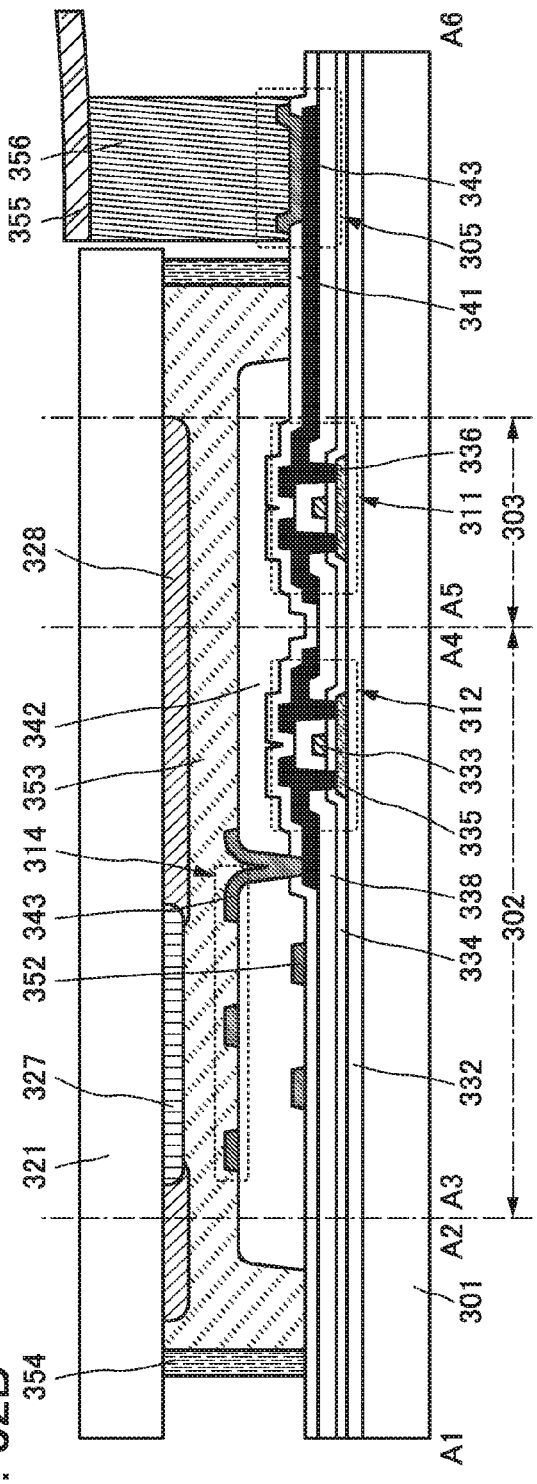

FIG. 32A is a schematic top view of a display device 300. FIG. 32B is a schematic cross-sectional view taken along lines A1-A2, A3-A4, and A5-A6 in FIG. 32A. Note that some components are not illustrated in FIG. 32A for clarity.

The display device 300 includes, over a top surface of a substrate 301, a display portion 302, a signal line driver circuit 303, a scan line driver circuit 304, and an external connection terminal 305. A flexible printed circuit (FPC) 355 is connected to the external connection terminal 305 through a connection layer 356.

The display portion 302 includes a liquid crystal element 314. In the liquid crystal element 314, the alignment of liquid crystal is controlled by an electric field generated in a direction parallel to the substrate surface.

The display device 300 includes the substrate 301, a substrate 321, an insulating layer 332, an insulating layer 334, an insulating layer 338, an insulating layer 341, an insulating layer 342, a transistor 311, a transistor 312, the liquid crystal element 314, a first electrode 343, a second electrode 352, a liquid crystal 353, a color filter 327, a light-blocking layer 328, and the like. The substrate 301 and the substrate 321 are attached to each other with an adhesive layer 354.

A pixel includes at least one switching transistor 312 and a storage capacitor (not illustrated). The comb-shaped second electrode 352 and the comb-shaped first electrode 343 which is electrically connected to one of a source electrode and a drain electrode of the transistor 312 are provided apart from each other over the insulating layer 341.

For the first electrode 343 and/or the second electrode 352, a light-transmitting conductive material is used. It is preferable to use a light-transmitting conductive material for both of the electrodes because the aperture ratio of the pixel can be increased.

The color filter 327 is provided in a position overlapping with the first electrode 343 and the second electrode 352. The light-blocking layer 328 is provided to cover a side surface of the color filter 327. Although being provided on the substrate 321 in FIG. 32B, the position of the color filter 327 is not limited to this position.

The liquid crystal 353 is provided between the substrate 301 and the substrate 321. An image can be displayed in the following manner: voltage is applied between the first electrode 343 and the second electrode 352 to generate an electric field substantially in the horizontal direction, the alignment of the liquid crystal 353 is controlled by the electric field, and polarization of light from a backlight provided outside the display device is controlled in each pixel.

Alignment films for controlling the alignment of the liquid crystal 353 are preferably provided on surfaces in contact with the liquid crystal 353. A light-transmitting material is used for the alignment films. Although not illustrated here, polarizing plates are provided on an outer surface of the substrate 321 and an outer surface of the substrate 301 with respect to the liquid crystal element 314.

As the liquid crystal 353, thermotropic liquid crystal, low-molecular liquid crystal, high-molecular liquid crystal, ferroelectric liquid crystal, anti-ferroelectric liquid crystal, or the like can be used. Moreover, liquid crystal exhibiting a blue phase is preferably used because an alignment film is not needed and a wide viewing angle is obtained.

A high-viscosity and low-fluidity material is preferably used for the liquid crystal 353.

Although an IPS mode is applied to the liquid crystal element 314 in this structural example, the mode of the liquid crystal element is not limited to this, and a TN mode, an FFS mode, an ASM mode, an OCB mode, an FLC mode, an AFLC mode, or the like can be used.

The transistors (e.g., the transistor 311 and the transistor 312) provided in the display device 300 are top-gate transistors. Each of the transistors includes a semiconductor layer 335, the insulating layer 334 functioning as a gate insulating layer, and a gate electrode 333. In addition, the insulating layer 338 is provided to cover the gate electrode 333. A pair of electrodes 336 is provided in contact with the semiconductor layer 335 through openings in the insulating layer 334 and the insulating layer 338.

Here, an oxide semiconductor is preferably used for the semiconductor layer 335. As the oxide semiconductor, for example, the oxide semiconductor described in the above embodiment can be used.

The semiconductor layer 335 may include a region functioning as a source region or a drain region which has lower resistance than a region functioning as a channel. For example, the source region and the drain region can be provided such that the source region and the drain region are in contact with the pair of electrodes 336 or that the region functioning as a channel is positioned between the source region and the drain region. For example, the source region and the drain region may be regions whose resistivity is controlled by the method described in the above embodiment.

Transistors with little variation can be formed at a low temperature in a large area by using an oxide semiconductor for the semiconductor layer 335 compared with the case of using polycrystalline silicon, for example.

Figure 33A:
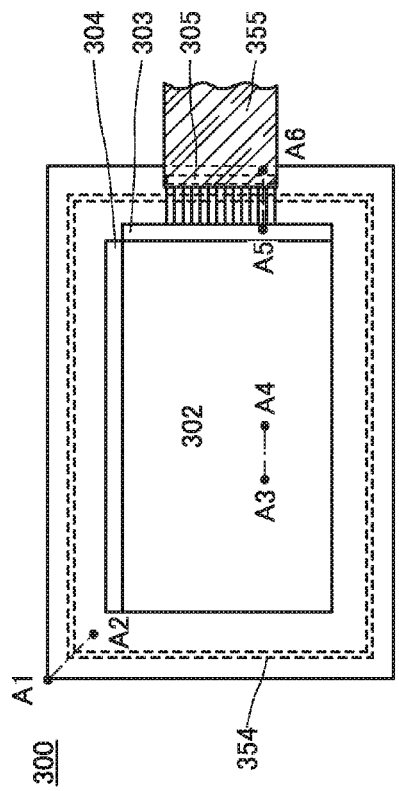
FIGS. 33A and 33B illustrate a structure example of a display device according to an embodiment.
Figure 33B:
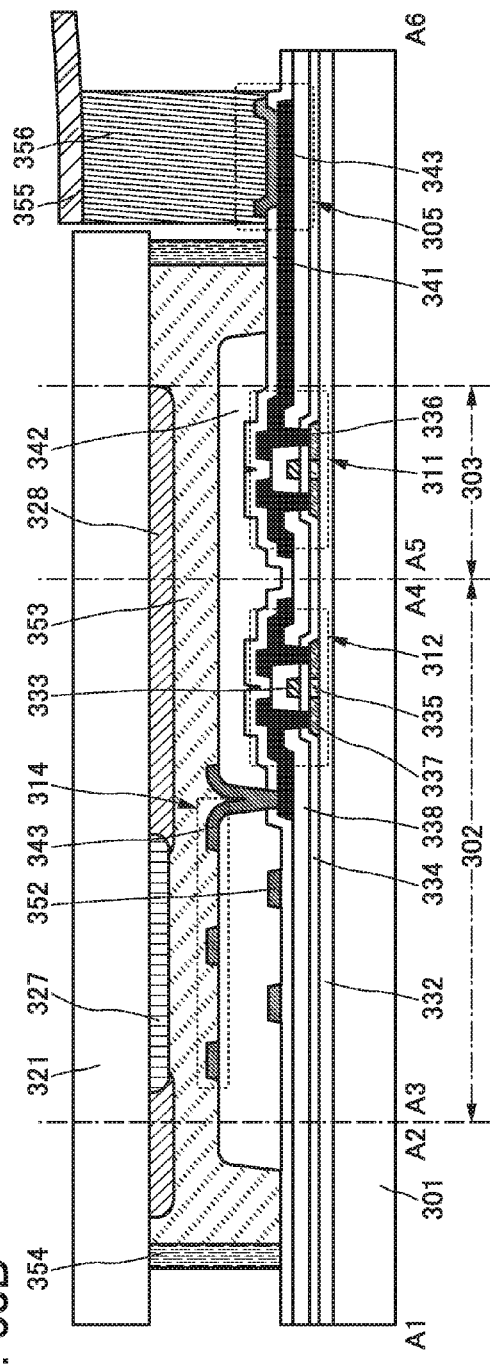

FIGS. 33A and 33B illustrate an example in which the semiconductor layer 335 includes a source region and a drain region.

Each transistor includes the semiconductor layer 335 having impurity regions 337 functioning as a source region and a drain region, the insulating layer 334 functioning as a gate insulating layer, and the gate electrode 333. In addition, the insulating layer 338 is provided to cover the gate electrode 333. The pair of electrodes 336 is provided in contact with the source region and the drain region of the semiconductor layer 335 through openings in the insulating layer 334 and the insulating layer 338.

Here, silicon is preferably used for the semiconductor layer 335. Silicon is preferably used also for semiconductor devices such as transistors used for pixels in display regions or driver circuits of the display device 300.

Although amorphous silicon may be used as silicon, silicon having crystallinity is particularly preferable. For example, microcrystalline silicon, polycrystalline silicon, or single crystal silicon is preferably used. In particular, polycrystalline silicon can be formed at a lower temperature than single crystal silicon and has higher field-effect mobility and higher reliability than amorphous silicon. When such a polycrystalline semiconductor is used for a pixel, the aperture ratio of the pixel can be improved. Even in an extremely high-resolution display device, a gate driver circuit and a source driver circuit can be formed over a substrate over which pixels are formed, and the number of components of an electronic device can be reduced.

In particular, when polycrystalline silicon or single crystal silicon transferred to an insulating layer is used for a semiconductor layer, a top-gate transistor is preferably employed. In this case, a low heat-resistance material can be used for a wiring or an electrode over the semiconductor layer, and a range of choices of the material can be widened. In the case where a high heat-resistance material is used for the gate electrode or in the case where polycrystalline silicon is formed at a very low temperature (e.g., lower than 450° C.), the bottom-gate structure described in the above embodiment is preferably employed because the number of manufacturing steps can be reduced.

In one embodiment of the present invention, an active matrix method in which a pixel includes an active element or a passive matrix method in which a pixel does not include an active element can be used.

As an active element (a non-linear element) in an active matrix method, not only a transistor but also various active elements (non-linear elements) can be used. For example, a metal insulator metal (MIM) or a thin film diode (TFD) can also be used. Since such an element can be manufactured with a small number of steps, manufacturing cost can be reduced or yield can be improved. Since the size of the element is small, the aperture ratio can be improved, so that power consumption can be reduced or higher luminance can be achieved.

Besides the active matrix method, a passive matrix method in which no active element (non-linear element) is used may be employed. Since no active element (non-linear element) is used, the number of manufacturing steps is small, so that manufacturing cost can be reduced or yield can be improved. Since no active element (non-linear element) is used, the aperture ratio can be improved, so that power consumption can be reduced or higher luminance can be achieved, for example.

At least part of this embodiment can be implemented in appropriate combination with any of the other embodiments described in this specification.

Embodiment 4

In this embodiment, the configuration of a pixel that can be used for a display device applicable to the display system of one embodiment of the present invention will be described with reference to FIGS. 34A to 34C.

Figure 34A:
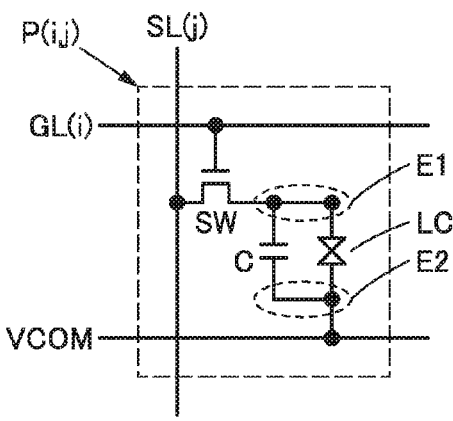
FIGS. 34A to 34C each illustrate a pixel structure according to an embodiment.

FIG. 34A is a circuit diagram illustrating an example of a pixel circuit P(i,j) for a pixel including a liquid crystal display element.

Figure 34B:
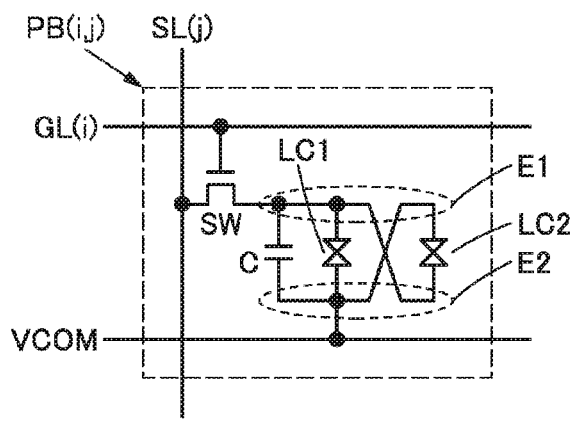
Figure 34C:
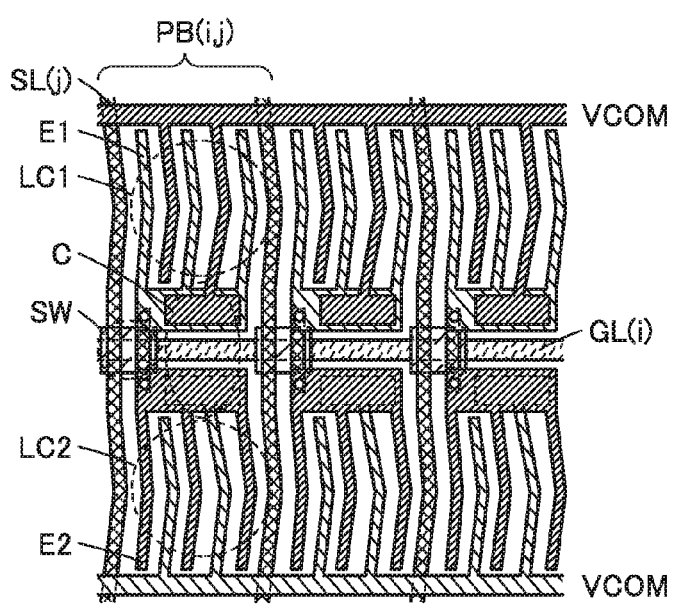

FIG. 34B is a circuit diagram illustrating an example of a pixel circuit PB(i,j) that has a configuration different from that of the pixel circuit P(i,j) in FIG. 34A. FIG. 34C is a top view illustrating an example of the layout of pixel circuits PB(i,j) in FIG. 34B.

<Configuration Example 1 of Pixel Circuit>

The pixel circuit P(i,j) is electrically connected to a control line GL(i), a signal line SL(j), and a wiring VCOM and includes a transistor SW, a liquid crystal element LC, and a capacitor C (see FIG. 34A).

A gate of the transistor SW is electrically connected to the control line GL(i), and a first electrode of the transistor SW is electrically connected to the signal line SL(j).

A first electrode of the liquid crystal element LC is electrically connected to a second electrode of the transistor SW, and a second electrode of the liquid crystal element LC is electrically connected to the wiring VCOM.

A first electrode of the capacitor C is electrically connected to the second electrode of the transistor SW, and a second electrode of the capacitor C is electrically connected to the wiring VCOM.

The pixel circuit P(i,j) is provided over a substrate and includes the substrate, a second conductive film E2, and a first conductive film E1 between the substrate and the second conductive film E2.

For example, a light-transmitting conductive film can be used as the first conductive film and/or the second conductive film.

For example, the first conductive film E1 can be used for the first electrode of the liquid crystal element LC, and the second conductive film E2 can be used for the second electrode of the liquid crystal element LC.

For example, the first conductive film E1 can be used for the first electrode of the capacitor C, and the second conductive film E2 can be used for the second electrode of the capacitor C.

<Configuration Example 2 of Pixel Circuit>

The pixel circuit PB(i,j) is different from the pixel circuit P(i,j) in FIG. 34A in that a liquid crystal element LC1 and a liquid crystal element LC2 connected in parallel are provided instead of the liquid crystal element LC (see FIG. 34B). Different structures will be described in detail below, and the above description is referred to for other similar structures.

A first electrode of the liquid crystal element LC1 is electrically connected to the second electrode of the transistor SW, and a second electrode of the liquid crystal element LC1 is electrically connected to the wiring VCOM.

A second electrode of the liquid crystal element LC2 is electrically connected to the second electrode of the transistor SW, and a first electrode of the liquid crystal element LC2 is electrically connected to the wiring VCOM.

For example, the first conductive film E1 can be used for the first electrode of the liquid crystal element LC1, and the second conductive film E2 can be used for the second electrode of the liquid crystal element LC1. In addition, the first conductive film E1 can be used for the first electrode of the liquid crystal element LC2, and the second conductive film E2 can be used for the second electrode of the liquid crystal element LC2 (see FIG. 34C).

The pixel circuit PB(i,j) includes the liquid crystal element LC1 and the liquid crystal element LC2. The first electrode of the liquid crystal element LC1 includes the first conductive film E1 connected to the second electrode of the transistor SW, and the second electrode of the liquid crystal element LC1 includes the second conductive film E2 electrically connected to the wiring VCOM. The second electrode of the liquid crystal element LC2 includes the second conductive film E2 connected to the second electrode of the transistor SW, and the first electrode of the liquid crystal element LC2 includes the first conductive film E1 electrically connected to the wiring VCOM.

The liquid crystal element LC1 and the liquid crystal element LC2 are connected in parallel as described above. Accordingly, characteristics of the liquid crystal elements can be prevented from being asymmetric due to the positions of the first conductive film E1 and the second conductive film E2 even in the case where the liquid crystal elements are driven with the applied voltage inverted.

At least part of this embodiment can be implemented in appropriate combination with any of the other embodiments described in this specification.

Embodiment 5

In this embodiment, examples of a method for driving an input device or input/output device of one embodiment of the present invention will be described with reference to drawings.

[Example of Sensing Method of Sensor]

Figure 35A:
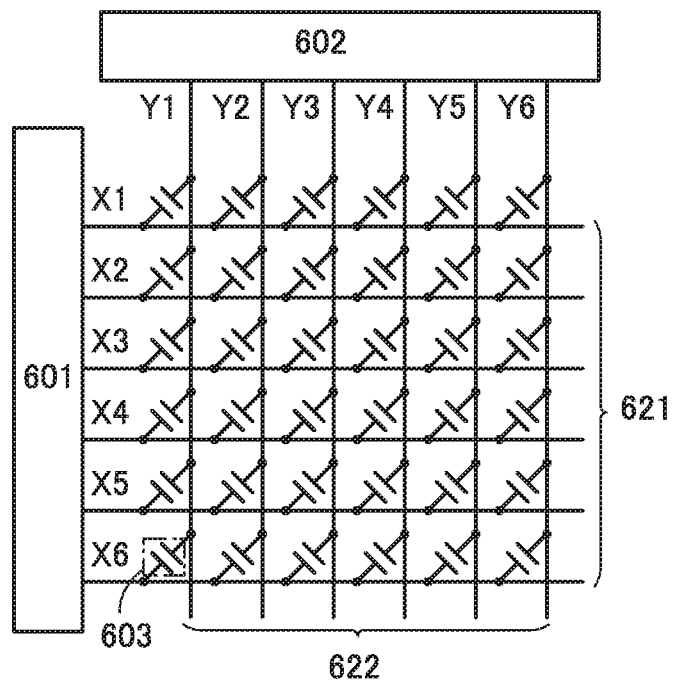
FIGS. 35A and 35B are a block diagram and a timing chart, respectively, of a touch sensor according to an embodiment.

FIG. 35A is a block diagram illustrating the configuration of a mutual capacitive touch sensor. FIG. 35A illustrates a pulse voltage output circuit 601 and a current sensing circuit 602. In FIG. 35A, six wirings X1 to X6 represent electrodes 621 to which pulse voltage is applied, and six wirings Y1 to Y6 represent electrodes 622 which sense changes in current. FIG. 35A also illustrates a capacitor 603 in which the electrode 621 and the electrode 622 overlap with each other. Note that functional replacement between the electrode 621 and the electrode 622 is possible.

The pulse voltage output circuit 601 is a circuit for sequentially applying pulse voltage to the wirings X1 to X6. By application of pulse voltage to one of the wirings X1 to X6, an electric field is generated between the electrode 621 and the electrode 622 of the capacitor 603. For example, when the electric field between the electrodes is shielded, a change occurs in the capacitance of the capacitor 603. The approach or contact of an object can be detected by utilizing this change.

The current sensing circuit 602 is a circuit for sensing changes in current flowing through the wirings Y1 to Y6 which are caused by the capacitance change in the capacitor 603. No change in current value is sensed in the wirings Y1 to Y6 when there is no approach or contact of an object, whereas a decrease in current value is sensed when capacitance decreases owing to the approach or contact of an object. Note that an integrator circuit or the like may be used for sensing current.

Figure 35B:
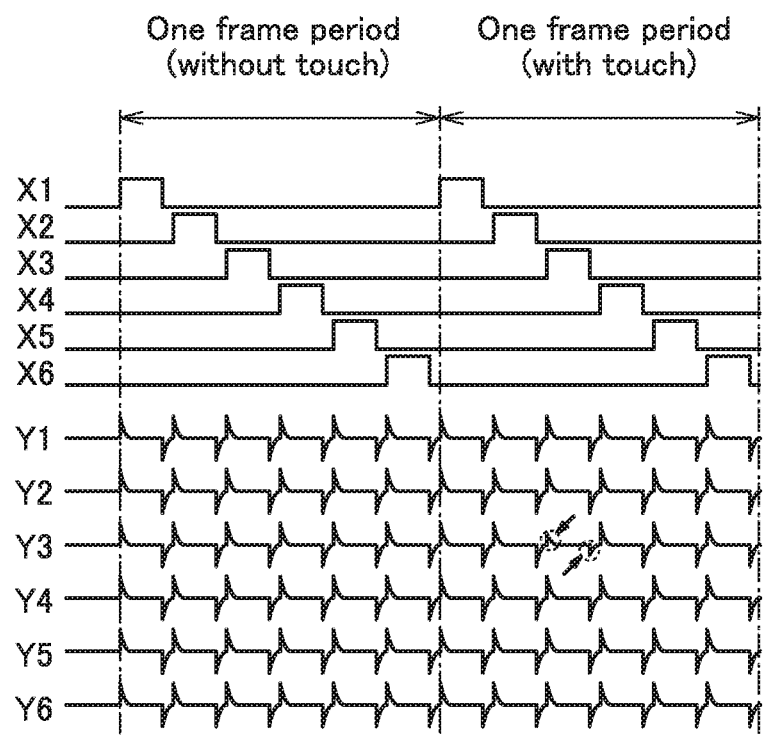

FIG. 35B is a timing chart illustrating input and output waveforms in the mutual capacitive touch sensor in FIG. 35A. In FIG. 35B, detection of an object is performed in all the rows and columns in one frame period. FIG. 35B illustrates a period in which no object is detected (without touch) and a period in which an object is detected (with touch). Current values sensed in the wirings Y1 to Y6 are illustrated as waveforms of voltage values.

Pulse voltage is sequentially applied to the wirings X1 to X6, and waveforms of the wirings Y1 to Y6 change in accordance with the pulse voltage. When there is no approach or contact of an object, the waveforms of the wirings Y1 to Y6 uniformly change in accordance with changes in the voltage of the wirings X1 to X6. As indicated by arrows in FIG. 35B, the current value decreases at the point of the approach or contact of the object; accordingly, the waveform of the voltage value also changes.

By sensing a capacitance change in this manner, the approach or contact of an object can be detected.

It is preferable that the pulse voltage output circuit 601 and the current sensing circuit 602 be mounted on a substrate in a housing of an electronic device or on a touch panel in the form of an IC. In the case where the touch panel has flexibility, parasitic capacitance might increase in a bent portion of the touch panel, and the influence of noise might increase. Therefore, it is preferable to use an IC driven by a method which is less likely to be influenced by noise. For example, it is preferable to use an IC driven by a method capable of increasing the signal-noise ratio (S/N ratio).

Figure 36:
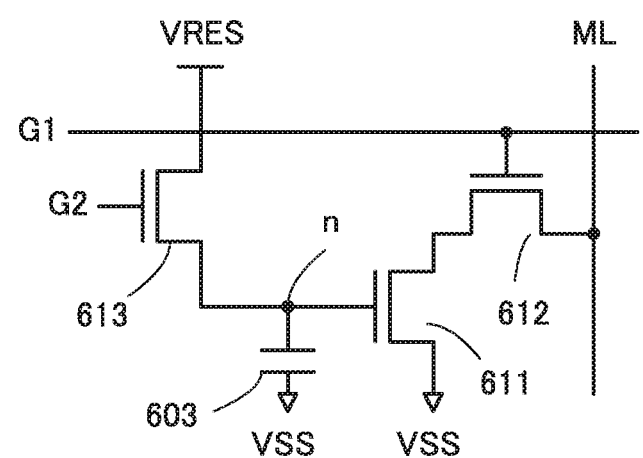
FIG. 36 is a circuit diagram of a touch sensor according to an embodiment.

Although FIG. 35A illustrates a passive matrix touch sensor in which only the capacitor 603 is provided at the intersection of wirings as a touch sensor, an active matrix touch sensor including a transistor and a capacitor may also be used. FIG. 36 illustrates an example of a sensor circuit included in an active matrix touch sensor.

The sensor circuit includes the capacitor 603 and transistors 611, 612, and 613. A signal G2 is input to a gate of the transistor 613. Voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and voltage VSS is applied to the other of the source and the drain of the transistor 611. A signal G1 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential corresponding to the voltage VRES is supplied to a node n connected to the gate of the transistor 611. Then, a potential for turning off the transistor 613 is supplied as the signal G2, whereby the potential of the node n is held.

Then, the capacitance of the capacitor 603 changes owing to the approach or contact of an object such as a finger, and accordingly, the potential of the node n changes from VRES.

In a reading operation, a potential for turning on the transistor 612 is supplied as the signal G1. Current flowing through the transistor 611, that is, current flowing through the wiring ML changes in accordance with the potential of the node n. By sensing this current, the approach or contact of an object can be detected.

It is preferable that the transistors 611, 612, and 613 each include an oxide semiconductor in a semiconductor layer in which a channel is formed. In particular, with the transistor 613 having such a structure, the potential of the node n can be held for a long time and the frequency of operation of resupplying VRES to the node n (refresh operation) can be reduced.

[Configuration Example of in-Cell Touch Panel]

In the above-described examples, the electrodes in the touch sensor are formed over a substrate different from a substrate over which the display element and the like are provided; however, one or both of the pair of electrodes in the touch sensor may be provided over the substrate over which the display element and the like are provided.

A configuration example of a touch panel in which a touch sensor is incorporated in a display portion including a plurality of pixels will be described below. In an example shown here, a liquid crystal element is used as a display element provided in the pixel.

Figure 37A:
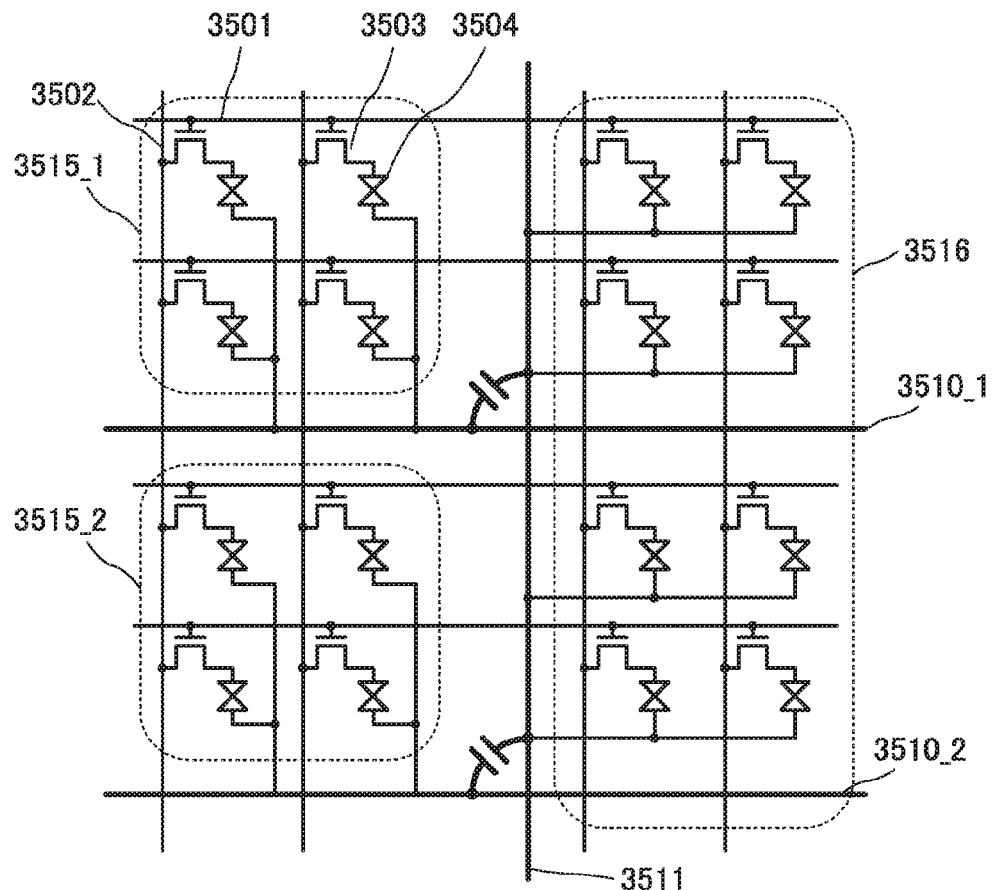
FIGS. 37A and 37B illustrate pixels provided with touch sensors according to an embodiment.

FIG. 37A is an equivalent circuit diagram of part of a pixel circuit provided in the display portion of the touch panel described in this configuration example.

Each pixel includes at least a transistor 3503 and a liquid crystal element 3504. A gate of the transistor 3503 is electrically connected to a wiring 3501, and one of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511). These wirings intersect with each other, so that capacitance is formed therebetween.

Some adjacent pixels of the pixels provided in the pixel circuit form a block as follows: one electrode of the liquid crystal element in a pixel is electrically connected to one electrode of the liquid crystal element in an adjacent pixel. The block is classified into two types: an island-shaped block (e.g., a block 3515_1 or a block 3515_2) and a linear block (e.g., a block 3516) extending in the Y direction. Note that only part of the pixel circuit is illustrated in FIG. 37A; actually, these two kinds of blocks are repeatedly arranged in the X direction and the Y direction.

The wiring 3510_1 (or 3510_2) extending in the X direction is electrically connected to the island-shaped block 3515_1 (or 35152). Although not illustrated, the wiring 3510_1 extending in the X direction is electrically connected to a plurality of island-shaped blocks 3515_1 which are provided discontinuously along the X direction with the linear blocks positioned therebetween. The wiring 3511 extending in the Y direction is electrically connected to the linear block 3516.

Figure 37B:
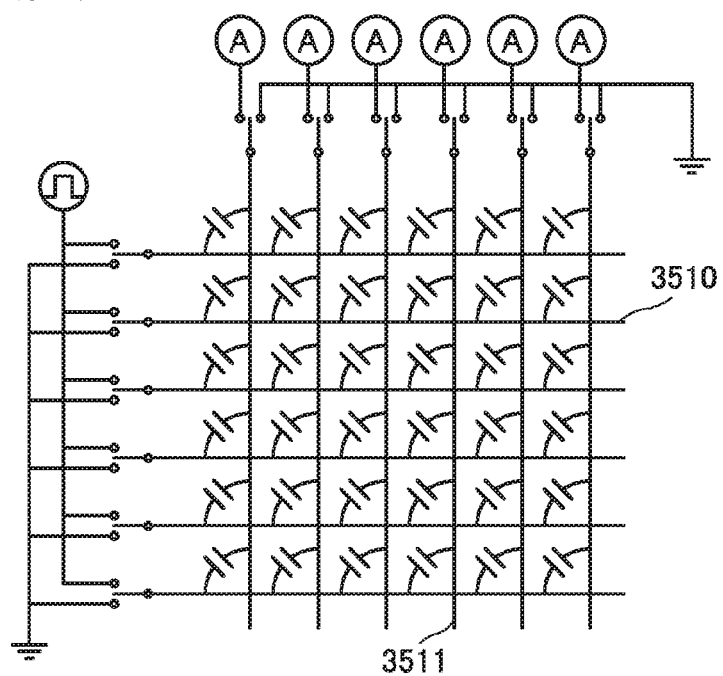

FIG. 37B is an equivalent circuit diagram illustrating the connection between a plurality of wirings 3510 extending in the X direction and the plurality of wirings 3511 extending in the Y direction. Input voltage or a common potential can be input to each of the wirings 3510 extending in the X direction. Furthermore, a ground potential can be input to each of the wirings 3511 extending in the Y direction, or the wirings 3511 can be electrically connected to a sensing circuit.

The operation of the above-described touch panel will be described below with reference to FIGS. 38A and 38B.

Here, one frame period is divided into a writing period and a sensing period. In the writing period, in which image data is written to a pixel, the wirings 3501 (also referred to as gate lines or scan lines) in FIG. 37A are sequentially selected. On the other hand, in the sensing period, in which sensing is performed by a touch sensor, the wirings 3510 extending in the X direction are sequentially selected and input voltage is input.

Figure 38A:
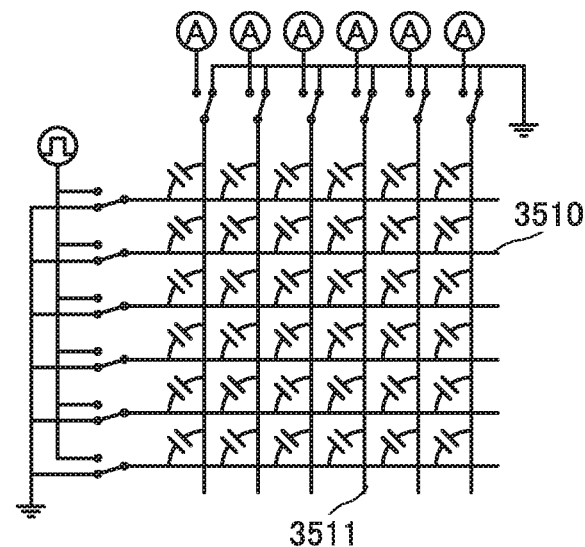
FIGS. 38A and 38B illustrate the operation of touch sensors and pixels according to an embodiment.

FIG. 38A is an equivalent circuit diagram in the writing period. In the writing period, a common potential is input to both the wiring 3510 extending in the X direction and the wiring 3511 extending in the Y direction.

Figure 38B:
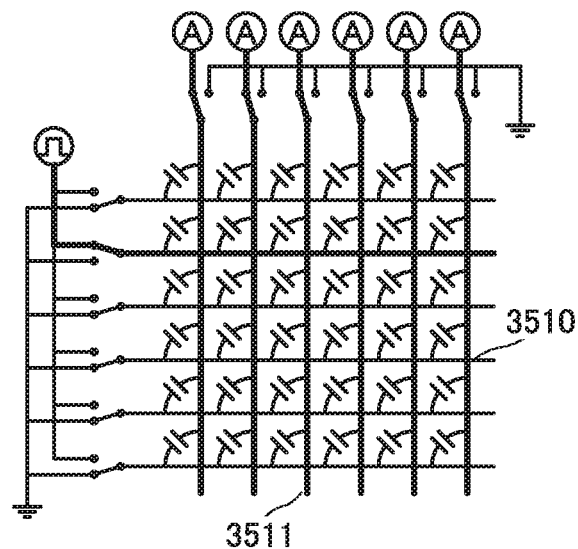

FIG. 38B is an equivalent circuit diagram at a certain point in time in the sensing period. In the sensing period, each of the wirings 3511 extending in the Y direction is electrically connected to the sensing circuit. Input voltage is input to selected one of the wirings 3510 extending in the X direction, and a common potential is input to the others of the wirings 3510.

Note that the driving method described here can be applied to not only an in-cell touch panel but also the above-described touch panels and can be used in combination with the driving method described above as an example.

It is preferable that a period in which an image is written and a period in which sensing is performed by a touch sensor be separately provided as described above. This configuration can suppress a decrease in sensitivity of the touch sensor caused by noise generated when an image is written to a pixel.

At least part of this embodiment can be implemented in appropriate combination with any of the other embodiments described in this specification.

Embodiment 6

In this embodiment, a display module and electronic devices which include a display device or display system of one embodiment of the present invention will be described with reference to FIG. 39 and FIGS. 40A to 40G.

Figure 39:
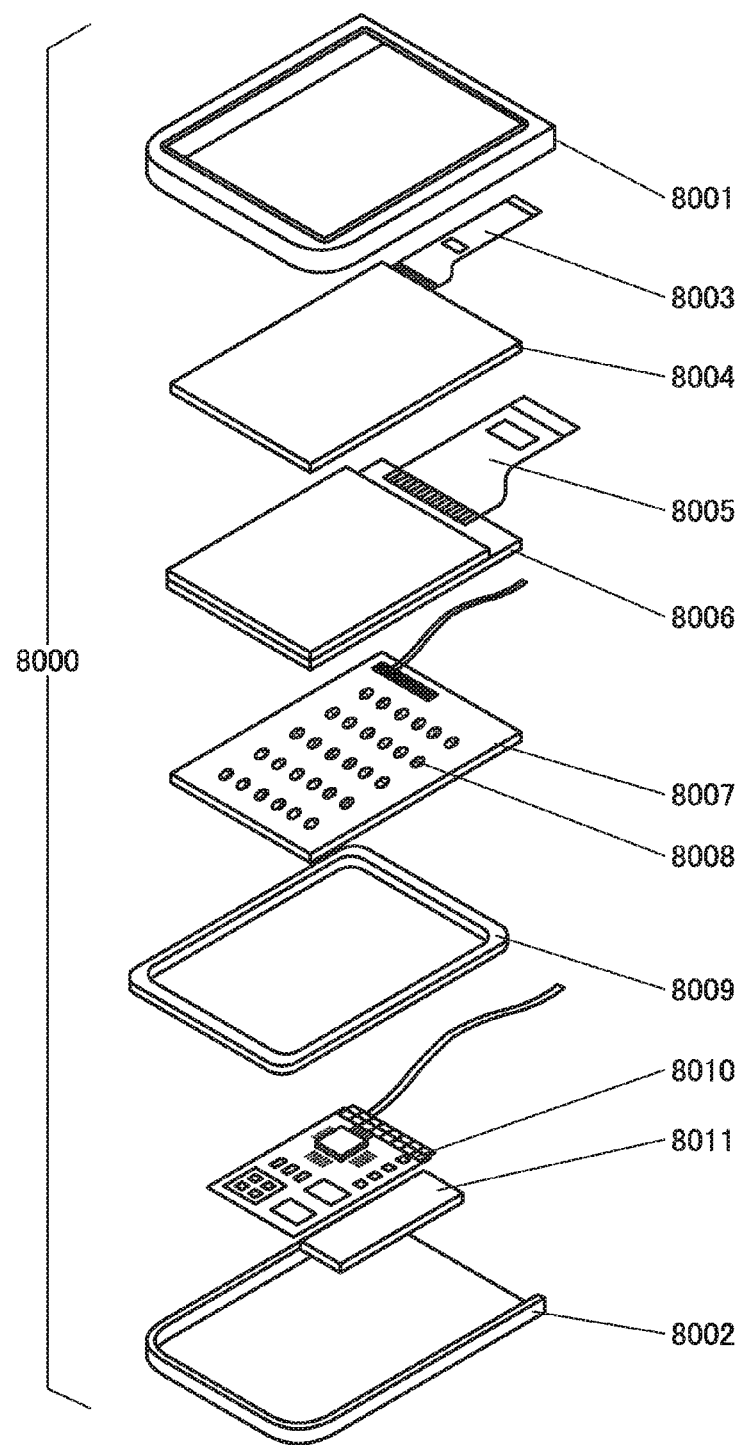
FIG. 39 illustrates a display module according to an embodiment.

In a display module 8000 illustrated in FIG. 39, a touch panel 8004 connected to an FPC 8003, a display panel 8006 connected to an FPC 8005, a backlight 8007, a frame 8009, a printed board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and overlap with the display panel 8006. Alternatively, a counter substrate (sealing substrate) of the display panel 8006 can have a touch panel function. Further alternatively, a photosensor can be provided in each pixel of the display panel 8006 to form an optical touch panel.

The backlight 8007 includes light sources 8008. Although the light sources 8008 are provided over the backlight 8007 in FIG. 39, one embodiment of the present invention is not limited to this structure. For example, a structure in which the light source 8008 is provided at an end portion of the backlight 8007 and a light diffusion plate is further used may be employed. Note that the backlight 8007 need not be provided in the case where a self-luminous light-emitting element such as an organic EL element is used or in the case where a reflective panel or the like is employed.

The frame 8009 protects the display panel 8006 and functions as an electromagnetic shield for blocking electromagnetic waves generated by the operation of the printed board 8010. The frame 8009 can also function as a radiator plate.

The printed board 8010 is provided with a power supply circuit and a signal processing circuit for outputting a video signal and a clock signal. As a power source for supplying power to the power supply circuit, an external commercial power source or the separate battery 8011 may be used. The battery 8011 can be omitted in the case where a commercial power source is used.

The display module 8000 may be provided with an additional member such as a polarizing plate, a retardation plate, or a prism sheet.

FIGS. 40A to 40G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 40A:
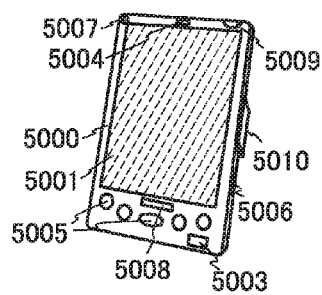
FIGS. 40A to 40G each illustrate an electronic device according to an embodiment.
Figure 40B:
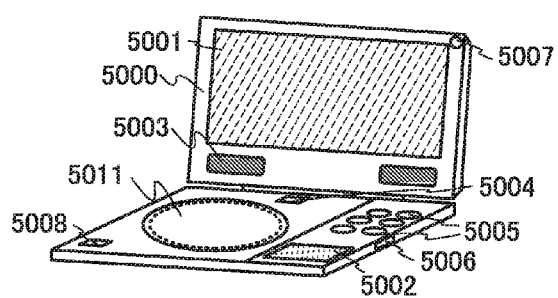
Figure 40C:
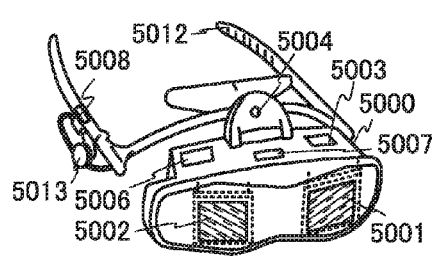
Figure 40D:
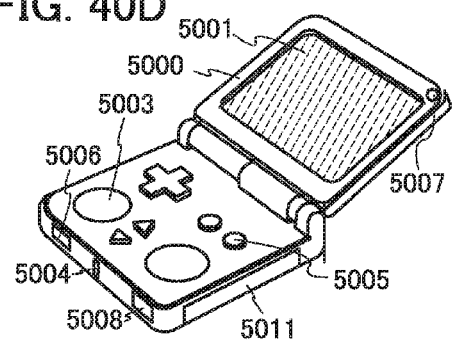
Figure 40E:
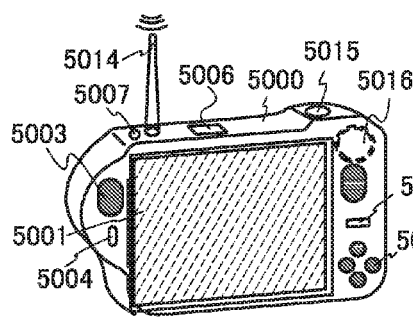
Figure 40F:
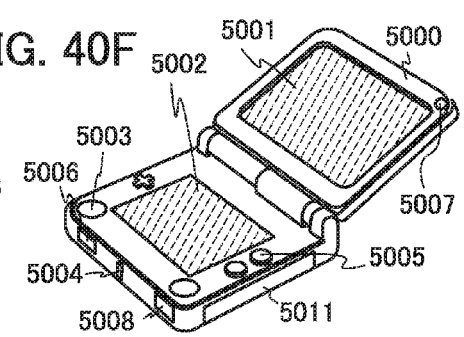
Figure 40G:
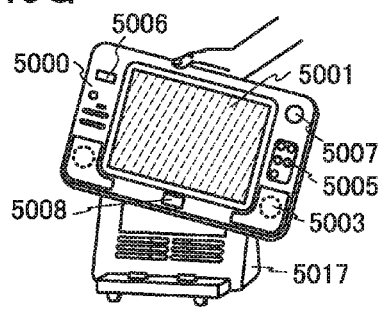

FIG. 40A illustrates a mobile computer which can include a switch 5009, an infrared port 5010, and the like in addition to the above components. FIG. 40B illustrates a portable image reproducing device (e.g., a DVD reproducing device) provided with a recording medium, and the portable image reproducing device can include a second display portion 5002, a recording medium reading portion 5011, and the like in addition to the above components. FIG. 40C illustrates a goggle-type display which can include the second display portion 5002, a support portion 5012, an earphone 5013, and the like in addition to the above components. FIG. 40D illustrates a portable game console which can include the recording medium reading portion 5011 and the like in addition to the above components. FIG. 40E illustrates a digital camera with a television reception function, and the digital camera can include an antenna 5014, a shutter button 5015, an image receiving portion 5016, and the like in addition to the above components. FIG. 40F illustrates a portable game console which can include the second display portion 5002, the recording medium reading portion 5011, and the like in addition to the above components. FIG. 40G illustrates a portable television receiver which can include a charger 5017 capable of transmitting and receiving signals, and the like in addition to the above components.

The electronic devices in FIGS. 40A to 40G can have a variety of functions such as a function of displaying a variety of information (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image information mainly on one display portion while displaying text information mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 40A to 40G are not limited thereto, and the electronic devices can have a variety of functions.

Electronic devices described in this embodiment are characterized by a display portion for displaying some sort of information. The display device described in the above embodiment can be used for the display portion.

At least part of this embodiment can be implemented in appropriate combination with any of the other embodiments described in this specification.

Example

In this example, a display system of one embodiment of the present invention will be described with reference to FIGS. 41A to 41C, FIGS. 42A to 42C, and FIGS. 43A and 43B.

Figure 41A:
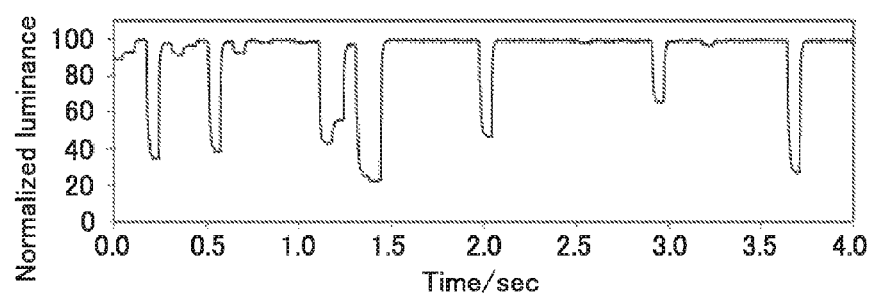
FIGS. 41A to 41C show changes in display luminance according to Example.
Figure 41B:
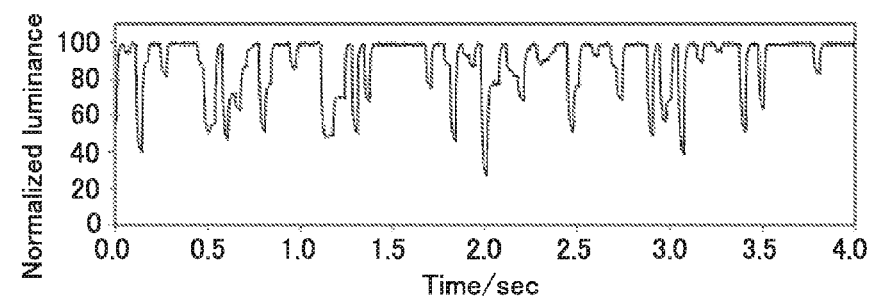
Figure 41C:
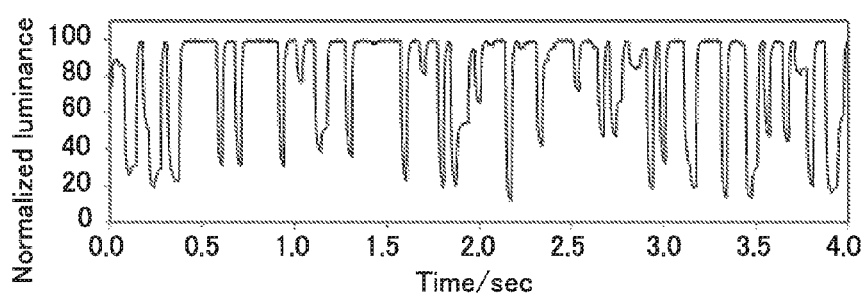

FIGS. 41A to 41C show the measurement results of luminance changes in a 100-μm-diameter region of a display device. Note that a text image was displayed on the display device while being scrolled. The text image includes 25 lines per page. Each line includes 49 letters with a font size of 20 points.

FIG. 41A shows a change in luminance observed when the text image was displayed while being scrolled at a speed of 2.5 pages/sec.

FIG. 41B shows a change in luminance observed when the letters in the text image were displayed with a higher gray level than those in FIG. 41A (specifically, the luminance of the letters was approximately 50% of that of the background image) while the text image was scrolled at a speed of 5 pages/sec.

FIG. 41C shows a change in luminance observed when the letters in the text image were displayed with the same gray level as those in FIG. 41A while the text image was scrolled at a speed of 5 pages/sec.

Figure 42A:
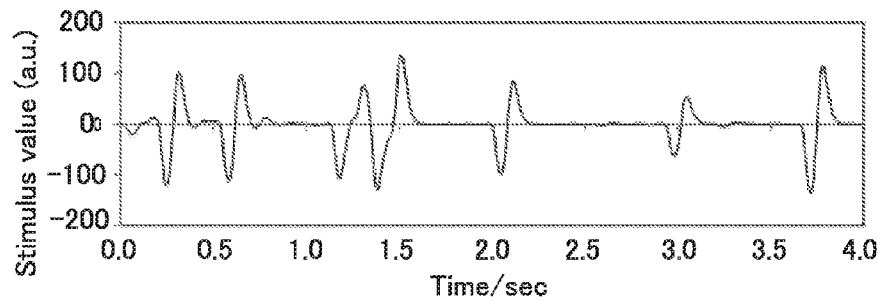
FIGS. 42A to 42C show the calculation results of changes in visual stimulation according to Example.
Figure 42B:
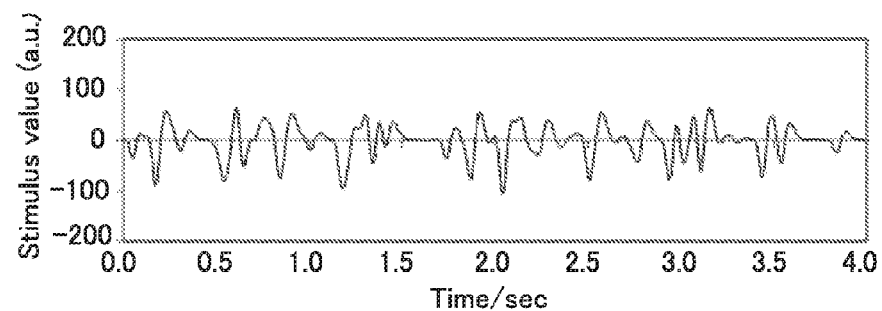
Figure 42C:
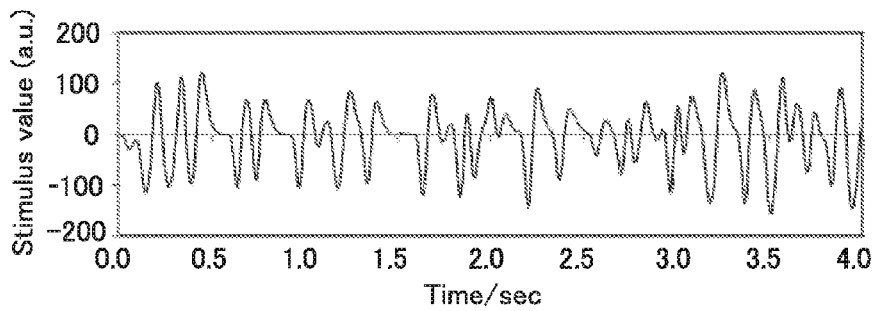

FIGS. 42A to 42C show the calculation results of changes in visual stimulation based on the luminance changes shown in FIGS. 41A to 41C. The calculation was performed using the Barten model, which agrees well with results of previous sensitivity evaluation. The Barten model is expressed by the following equation (1).

[Formula 1]

$$S(u, w) = \frac{\frac{M_{opt}(u)}{k}}{\sqrt{\frac{2}{T}\left(\frac{1}{X_0^2} + \frac{1}{X_{max}^2} + \frac{u^2}{N_{max}^2}\right)\left(\frac{1}{\eta p E} + \frac{\Phi_0}{[H_1(w)\{1 - H_2(w)F(u)\}]^2}\right)}} \quad (1)$$

In the equation, u and w are a parameter of the frequency of spatial modulation and a parameter of the frequency of temporal modulation, respectively. In addition, k represents a signal-noise ratio, T represents visual integration time, $X_0$ represents the size of an object, $X_{max}$ represents the upper limit of integration, $N_{max}$ represents the maximum number of integration cycles of bright and dark, η represents quantum efficiency, p represents a quantum conversion factor, E represents retinal illuminance, $\Phi_0$ represents the spectral density of neural noise, and $u_0$ represents the spatial frequency of lateral inhibition.

In the equation (1), $M_{opt}(u)$ represents a visual transfer function relating to spatial luminance modulation and is expressed by the following equation (2). In the equation (2), σ depends on the pupil diameter as a parameter and corresponds to the standard deviation of a line-spread function, where the structures of visual organs such as the ocular media and the retina are taken into consideration.

[Formula 2]

$$M_{opt}(u)=e^{-2\pi^2\sigma^2 u^2} \quad (2)$$

In the equation (1), $H_1(w)$ and $H_2(w)$ each represent a transfer function relating to temporal modulation and are expressed by the following equation (3), where τ represents a time constant. The solution of the equation (1) agrees with the results of sensitivity evaluation in the case where 7 and 4 are substituted for n in $H_1(w)$ and $H_2(w)$, respectively.

[Formula 3]

$$H(w) = \frac{1}{\{1+(2\pi w\tau)^2\}^{n/2}} \quad (3)$$

In addition, F(u) in the equation (1) represents a function of lateral inhibition and is expressed by the following equation (4). In the equation (4), $u_0$ represents the spatial frequency of lateral inhibition.

[Formula 4]

$$F(u)=1-\sqrt{1-e^{-(u/u_0)^2}} \quad (4)$$

FIG. 42A shows the calculation result of the change in visual stimulation based on the luminance change shown in FIG. 41A, which was obtained using the Barten model.

FIG. 42B shows the calculation result of the change in visual stimulation based on the luminance change shown in FIG. 41B, which was obtained using the Barten model.

FIG. 42C shows the calculation result of the change in visual stimulation based on the luminance change shown in FIG. 41C, which was obtained using the Barten model.

Figure 43A:
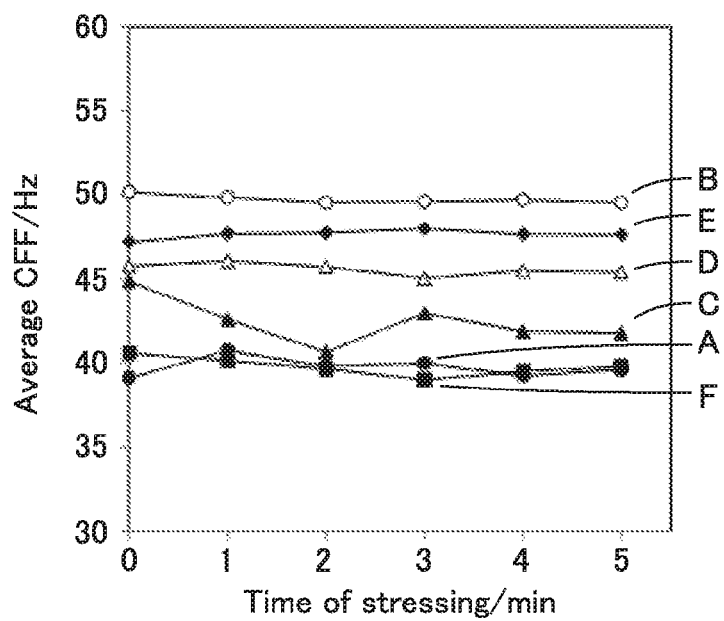
FIGS. 43A and 43B show the measurement results of critical fusion frequencies according to Example.
Figure 43B:
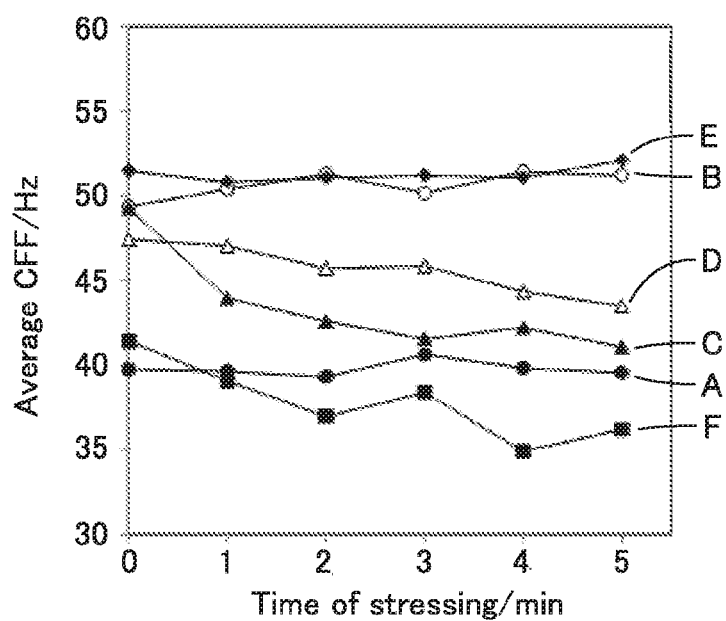

FIGS. 43A and 43B show the measurement results of the critical fusion frequencies (CFF) of six subjects (A to F) who observed the text images of FIGS. 41A to 41C. Specifically, the text image was observed for a minute while being scrolled, and then, the CFF was measured ten times, and the measurement values were averaged. This process was repeated five times, and added time was counted as time of stressing.

FIG. 43A shows the measurement results of the CFFs of the six subjects who observed the text image of FIG. 41B.

FIG. 43B shows the measurement results of the CFFs of the six subjects who observed the text image of FIG. 41C.

For the measurement, AQUOS PAD SH-06F produced by Sharp Corporation was used. The screen diagonal of the display panel was 7.0 inches, the pixel density was 323 ppi, and each pixel includes a VA-mode liquid crystal element and a transistor including an oxide semiconductor.

For the CFF measurement, a Roken-type digital flicker value tester, model RDF-1 produced by SIBATA SCIENTIFIC TECHNOLOGY LTD. was used.

<Result>

When compared in the same period, a luminance change at a low scroll speed (FIG. 41A and FIG. 42A) was smaller than that at a high scroll speed (FIG. 41C and FIG. 42C); accordingly, visual stimulation was suppressed when the scroll speed was low.

Comparison between luminance changes at a high scroll speed in the same period (FIGS. 41B and 41C and FIGS. 42B and 42C) showed that a luminance change in the text image displaying letters with a high gray level (i.e., the contrast is low) (FIG. 41B and FIG. 42B) was smaller, and thus, visual stimulation was suppressed.

In addition, decreases in the CFFs of the subjects who repeatedly observed the text image scrolled at a high speed were suppressed when the letters in the text image were displayed with a high gray level (i.e., when the contrast was low) (see FIGS. 43A and 43B).

Therefore, eye strain on the subject accumulated by high-speed scrolling can be reduced by displaying letters with a high gray level (i.e., displaying a low-contrast text image).

Specifically, when the letters with a high gray level (i.e., the low-contrast text image) were displayed, no decrease was observed in the CFFs of the subjects (see FIG. 43A).

On the other hand, when the gray level of the letters in the text image was not changed (i.e., the contrast was high), the CFFs of the subject A, the subject C, the subject D, the subject F were decreased (see FIG. 43B).

This application is based on Japanese Patent Application serial no. 2015-040869 filed with Japan Patent Office on Mar. 3, 2015, and Japanese Patent Application serial no. 2015-040870 filed with Japan Patent Office on Mar. 3, 2015, the entire contents of which are hereby incorporated by reference.

What is claimed is:

1. A semiconductor device comprising:
   a display portion configured to display an image in a first mode in which the image is displayed on the display portion by an interlace method and a second mode in which the image is displayed on the display portion by a progressive method;
   an input portion configured to sense an input from a user and output a signal; and
   a control portion electrically connected to the display portion and the input portion,
   wherein the control portion is configured to select the first mode when the signal output from the input portion corresponds to screen switching or screen scrolling.

2. The semiconductor device according to claim 1,
   wherein the control portion is configured to select the second mode when there is no input from the input portion or the signal output from the input portion does not correspond to screen switching or screen scrolling.

3. The semiconductor device according to claim 1,
   wherein the control portion comprises an arithmetic portion and a memory portion,
   wherein the memory portion is configured to temporarily store image data every time the image data is input, and
   wherein the image data comprises data of one frame including 2n lines (n is a natural number).

4. The semiconductor device according to claim 3,
   wherein, in the second mode, the arithmetic portion is configured to sequentially read out data from first to 2n-th lines of first image data and output the data to the display portion in a first frame period, and sequentially read out data from first to 2n-th lines of second image data and output the data to the display portion in a second frame period following the first frame period.

5. The semiconductor device according to claim 4,
   wherein, in the first mode, a third frame period comprises a first field period and a second field period, and
   wherein the arithmetic portion is configured to sequentially read out data from odd-numbered lines of third image data and output the data to the display portion in the first field period, and sequentially read out data from even-numbered lines of fourth image data and output the data to the display portion in the second field period.

6. The semiconductor device according to claim 4,
wherein, in the first mode, a third frame period comprises a field periods (a is an integer of 2 or more and 2n or less), and
wherein when k-th image data (k is an integer of 1 or more and a or less) is stored in the memory portion, the arithmetic portion is configured to sequentially read out data from {a×(m−1)+k}-th lines (m is an integer of 1 or more and 2n/a or less) of the k-th image data in ascending order of m.

7. The semiconductor device according to claim 1, wherein the display portion comprises a liquid crystal element or a light-emitting element.

8. The semiconductor device according to claim 1,
wherein the display portion comprises a plurality of pixels, each pixel comprising a transistor, and
wherein a semiconductor of the transistor in which a channel is formed comprises an oxide semiconductor.

9. The semiconductor device according to claim 1,
wherein the display portion comprises a plurality of pixels, each pixel comprising a transistor, and
wherein a semiconductor of the transistor in which a channel is formed comprises silicon.

10. The semiconductor device according to claim 9, wherein the semiconductor is amorphous silicon or polycrystalline silicon.

11. The semiconductor device according to claim 1, wherein the input portion comprises at least one of a keyboard, a hardware button, a pointing device, a touch sensor, an imaging device, an audio input device, a viewpoint input device, and a pose detection device.

12. The semiconductor device according to claim 1, wherein the display portion and the input portion form a touch panel.

13. A non-transitory computer-readable storage medium storing program instructions for controlling a display portion, which, when executed, cause a processing system to perform a method comprising:
a first step in which a setting is initialized;
a second step in which interrupt processing is allowed;
a third step in which image information is displayed in a predetermined mode selected in the first step or in the interrupt processing;
a fourth step in which processing proceeds to the third step when a termination instruction is not supplied in the interrupt processing; and
a fifth step in which the processing is terminated when the termination instruction is supplied in the interrupt processing,
wherein the interrupt processing comprises sixth to eleventh steps,
wherein, in the sixth step, the processing proceeds to the seventh step when a predetermined event is supplied, whereas the processing proceeds to the eleventh step when the predetermined event is not supplied,
wherein, in the seventh step, the processing proceeds to the eighth step when image information to be displayed next has a predetermined contrast, whereas the processing proceeds to the tenth step when the image information to be displayed next does not have the predetermined contrast,
wherein, in the eighth step, the processing proceeds to the ninth step when a proportion of an area of a dark portion in the image information to be displayed next is higher than or equal to a predetermined proportion, whereas the processing proceeds to the tenth step when the proportion of the area of the dark portion is lower than the predetermined proportion,
wherein a first mode in which the image information is displayed by an interlace method is selected in the ninth step,
wherein a second mode in which the image information is displayed by a progressive method is selected in the tenth step, and
wherein the processing returns from the interrupt processing in the eleventh step.

14. A non-transitory computer-readable storage medium storing program instructions for controlling a display portion, which, when executed, cause a processing system to perform a method comprising the steps of:
initializing a setting;
allowing interrupt processing;
displaying image information in a predetermined mode selected in the initialized setting or in the interrupt processing until a termination instruction is supplied in the interrupt processing; and
terminating the interrupt processing when the termination instruction is supplied,
wherein the interrupt processing comprises the steps of:
judging whether a predetermined event is supplied;
judging whether image information to be displayed next has a predetermined contrast when the predetermined event is supplied;
judging whether a proportion of an area of a dark portion in the image information is higher than or equal to a predetermined proportion when the image information has the predetermined contrast;
selecting a first mode in which the image information is displayed by an interlace method when the proportion of the area of the dark portion in the image information is higher than or equal to the predetermined proportion;
selecting a second mode in which the image information is displayed by a progressive method when the image information does not have the predetermined contrast and the proportion of the area of the dark portion in the image information is lower than the predetermined proportion; and
returning from the interrupt processing.

* * * * *